United States Patent
Maeda

[11] Patent Number: 5,995,665
[45] Date of Patent: Nov. 30, 1999

[54] IMAGE PROCESSING APPARATUS AND METHOD

[75] Inventor: Mitsuru Maeda, Yokohama, Japan

[73] Assignee: Canon Kabushiki Kaisha, Tokyo, Japan

[21] Appl. No.: 08/654,638

[22] Filed: May 29, 1996

[30] Foreign Application Priority Data

May 31, 1995 [JP] Japan .................................... 7-134228
May 31, 1995 [JP] Japan .................................... 7-134229
Jul. 5, 1995 [JP] Japan .................................... 7-169779

[51] Int. Cl.$^6$ ........................................................ G06K 9/36
[52] U.S. Cl. ............................................................ 382/232
[58] Field of Search ..................................... 382/232, 233, 382/234, 239, 240, 243; 358/426, 261.1, 261.2, 261.3, 429, 430, 432, 433

[56] References Cited

U.S. PATENT DOCUMENTS

| | | | |
|---|---|---|---|
| 5,321,522 | 6/1994 | Eschbach ................................ | 358/433 |
| 5,345,317 | 9/1994 | Katsuno et al. ........................ | 358/433 |
| 5,361,147 | 11/1994 | Katayama et al. ...................... | 358/532 |
| 5,379,122 | 1/1995 | Eschbach ................................ | 358/426 |
| 5,392,362 | 2/1995 | Kimura et al. .......................... | 382/239 |
| 5,416,606 | 5/1995 | Katayama et al. ...................... | 358/467 |
| 5,432,870 | 7/1995 | Schwartz ................................ | 382/232 |
| 5,436,981 | 7/1995 | Ishikawa ................................ | 382/173 |

FOREIGN PATENT DOCUMENTS

| | | |
|---|---|---|
| 62-226770 | 10/1987 | Japan . |
| 3-126181 | 5/1991 | Japan . |
| 4-248766 | 9/1992 | Japan . |

OTHER PUBLICATIONS

Tetsutani, et al., "Method of Binarizing a Document of Mixed Bi–Level Images and Grayscale", Denshi Tsushin Gakkai Ronbunshi, vol. J67–B, No. 7 (1984), pp. 781–788.

*Primary Examiner*—Jose L. Couso
*Attorney, Agent, or Firm*—Fitzpatrick, Cella, Harper & Scinto

[57] ABSTRACT

A background discriminating unit for discriminating the state of background of an input image. An adaptive quantizer quantizes the input image based upon the state of the background to form a bi-level image of the background. An area partitioning unit partitions the input image into areas based upon the bi-level image of the background. Each area resulting from partitioning is coded by a multivalued image coder or bi-level image coder in dependence upon the characteristic of the area. Accordingly, an input image can be partitioned into areas correctly based upon the characteristics of the area and the areas obtained by partitioning can be coded in conformity with the characteristic of the area.

34 Claims, 33 Drawing Sheets

FIG. 16A

| No. | POSITION COORDINATES | AREA SIZE | CODE |
|---|---|---|---|
| 1 | 0, 0 | 3072, 4096 | UNSEPARATED |
|  |  |  |  |
|  |  |  |  |
|  |  |  |  |
|  |  |  |  |
|  |  |  |  |
|  |  |  |  |

FIG. 16B

| No. | POSITION COORDINATES | AREA SIZE | CODE |
|---|---|---|---|
| 1 | 0, 0 | 3072, 4096 | UNSEPARATED |
| 2 | 64, 344 | 444, 364 | TABLE |
| 3 | 943, 956 | 1548, 208 | CHARACTER |
| 4 | 7 80, 1808 | 1884, 1664 | PHOTOGRAPH |
| 5 | 40, 3868 | 2670, 8 | SEPARATOR |
| 6 | 1800, 202 | 512, 496 | LINE DRAWING |
|  |  |  |  |

FIG. 16C

| No. | POSITION COORDINATES | AREA SIZE | CODE |
|---|---|---|---|
| 1 | 0, 0 | 3072, 4096 | UNSEPARATED |
| 2 | 64, 344 | 444, 364 | TABLE |
| 3 | 943, 956 | 1548, 208 | CHARACTER |
| 4 | 780, 1808 | 1884, 1664 | UNSEPARATED |
| 5 | 40, 3868 | 2670, 8 | SEPARATOR |
| 6 | 1800, 202 | 512, 496 | LINE DRAWING |
|   |   |   |   |

FIG. 16D

| No. | POSITION COORDINATES | AREA SIZE | CODE |
|---|---|---|---|
| 1 | 780, 1808 | 1884, 1664 | UNSEPARATED |
| 2 |   |   |   |
| 3 |   |   |   |
| 4 |   |   |   |
| 5 |   |   |   |
| 6 |   |   |   |
|   |   |   |   |

IMAGE PROCESSING APPARATUS AND METHOD

BACKGROUND OF THE INVENTION

1. Field of the Invention

This invention relates to an image processing method and apparatus. For example, the invention relates to an image processing apparatus method for coding an image upon dividing the image into areas, and an image processing apparatus and method for recognizing a background area from image data.

2. Description of the Related Art

The rapid progress that has been made in image coding techniques in recent years has been accompanied by progress in international standardization. The JPEG (Joint Photographic Experts Group) scheme has been adopted as the standard for non-reversible coding of multivalued color images, and the JBIG (Joint Bi-level Image Group) scheme has been adopted as the standard for reversible coding of monochromatic bi-level images. The standardization of new coding methods is proceeding.

FIG. 1 is a block diagram showing the architecture of an image coding apparatus. The apparatus includes a scanner 1001 for entering an image, a selector 1002 for selecting the destination of the input image in accordance with a command entered by the user, a JPEG coder 1003 for coding the input image according to the JPEG standard, a binarizer 1004 for binarizing the input image, a JBIG coder 1005 for coding the bi-level image from the binarizer 1004, a selector 1006 for selecting the source of an input code in accordance with a command entered by the user, a communication interface 1007 and a communication line 1008 such as a telephone line or LAN. It should be noted that the selectors 1002 and 1006 operate in synchronism so that the image coded via the selector 1002 will be sent to the communication interface 1007 via the selector 1006.

When the user wishes to transmit a color image using this apparatus, the JPEG coder 1003 is selected as the destination of the output from the selector 1002 and as the source of the input to the selector 1006. Next, the scanner 1001 is operated to enter the image data, and the image data are entered into the JPEG coder 1003 via the selector 1002, whereby code data coded according to the JPEG standard are obtained. These code data are entered into the communication interface 1007 via the selector 1006, after which the data are sent to the communication line 1008 by the communication interface 1007 in accordance with a predetermined protocol.

When the user wishes to transmit a monochromatic bi-level image using this apparatus, the binarizer 1004 is selected as the destination of the output from the selector 1002 and the JBIG coder 1005 is selected as the source of the input to the selector 1006. Next, the scanner 1001 is operated to enter the image data, and the image data are entered into the binarizer 1004 via the selector 1002. The binarizer 1004 compares the entered image data with a preset threshold value to binarize the image data. The binarized image data enter the JBIG coder 1005, whereby the data are converted to code data in accordance with the JBIG standard. These code data are entered into the communication interface 1007 via the selector 1006, after which the data are sent to the communication line 1008 by the communication interface 1007 in accordance with a predetermined protocol.

However, the technique described above has certain shortcomings. Specifically, in the above-described image coding apparatus in which the coding method is changed over on an image-by-image basis, characters and line-image portions contained in an image are subjected to multivalued coding as by the JPEG scheme. As a consequence, edges, which are the characterizing features of a character or line drawing, become blurred. This results in a decline in the quality of the appearance of the characters and line drawings. Further, when bi-level binarization is performed according to the JBIG standard, grayscale portions contained in the image are flattened by binarization.

According to a proposed improvement in the JPEG standard, the features of an image are judged on a coding unit basis (i.e., in blocks of 8×8 pixels) and either the quantization coefficient or the coding table is changed over (see U.S. application Ser. No. 736,740, filed on Jul. 26, 1991). With this method, however, referential pixels for judging the features of an image are too few to obtain correct results.

It has also been contemplated to change over the coding scheme upon judging image areas in large zones using a method of binarizing a multivalued image to separate the image into areas such as character/line-image areas and photographic areas (see U.S. application Ser. No. 524,409, filed on Sep. 6, 1995). However, with a method of extracting image areas whose density is greater than a predetermined density using a fixed or variable threshold value, it is not possible to accommodate low-contrast characters and line drawings or outline characters.

Furthermore, when a multivalued image is binarized and the edge of a character or line drawing is indistinct at the start, the binarized image develops thickening that can cause judgment errors when the image is-separated into areas. In particular, when there is no longer white space between characters and a character area is erroneously judged to be a grayscale area, character/line-drawing areas undergo multivalued coding. This problem is similar to that encountered with the image coding apparatus, which changes over the coding method on an image-by-image basis.

Recent progress in the development of image processing apparatus has been accompanied by proposals relating to an image processing apparatus having an image-area partitioning function according to which a multivalued image containing character areas and pattern areas is divided into areas conforming to the features of the areas and the coding method is changed over area by area to improve the efficiency of coding, or according to which areas containing characters are extracted and the characters are read optically (generally referred to as "OCR").

As described in the specifications of Japanese Patent Application Laid-Open No. 62-226770 (entitled "Image Area Discriminating Apparatus") and Japanese Patent Application Laid-Open No. 3-126181 (entitled "Method of Partitioning Document Image into Areas"), for example, image processing apparatus which execute image-area partitioning processing are mostly apparatus which binarize a multivalued image in dependence upon a predetermined threshold value and discriminate whether an area is a character area, photographic area or table, etc., based upon the bi-level image. Further, as described in the specification of Japanese Patent Application Laid-Open No. 4-248766 (entitled "Image Area Separation"), for example, a method has been proposed in which an image is separated into character areas and pattern areas using background as a "white" area.

Further, the recent rapid popularity of DTP has been accompanied by increasing diversification of documents and other images, and methods of performing area partitioning processing are not limited to that mentioned above but are themselves becoming increasingly diverse.

However, processing for partitioning image areas in the above-described image processing apparatus largely entails subjecting a multivalued image to binarization processing. When such binarization processing is executed, the entire image is binarized at a fixed threshold value without taking the density of the image background into consideration. Depending upon the background color, therefore, appropriate binarization is not always carried out and the results of area partitioning can develop an error. This means that it is not possible to deal suitably with a document printed on paper whose background is colored or exhibits a density other than white.

The fact that the above-described processing for partitioning image areas binarizes the entire image at a single threshold value leads to other problems as well. For example, when each cell in a table is given meaning as by changing its density or color, or when the ruled lines of a table are deleted as by changing the density or color of rows or columns, the differences in density or color are ignored, the cells of the table can no longer be recognized.

Though a technique for separating the background portion from a color image has been proposed in the specification of U.S. application Ser. No. 08/579,358, filed on Dec. 27, 1995, there is still room for improvement.

SUMMARY OF THE INVENTION

Accordingly, an object of the present invention is to provide an image processing method and apparatus for correctly dividing an input image into areas based upon the characteristics of the image and subjecting each resulting area to coding conforming to the particular characteristic.

According to a preferred embodiment of the present invention, the foregoing object is attained by providing an image processing apparatus comprising discriminating means for discriminating state of background of an input image, quantizing means for quantizing the input image based upon results of discrimination from the discriminating means, partitioning means for partitioning the input image into areas based upon results of quantization from the quantizing means, and coding means for coding each partitioned area in conformity with characteristics of the area.

Another object of the present invention is to provide an image processing method and apparatus in which background information of the entire image and small background areas constructing sub-areas can each be extracted appropriately.

According to a preferred embodiment of the present invention, the foregoing object is attained by providing an image processing apparatus for detecting background information from image data, comprising flatness extracting means for extracting a flat pixel forming flatness from the image data, background extracting means for extracting background information from the image data based upon information of the flat pixel, pixel-value extracting means for extracting a principal pixel value, which constitutes the image data, as a representative-pixel value based upon the information of the flat pixel, and background-area extracting means for extracting information of a partial background area contained in the image data based upon a distribution of extracted representative-pixel values.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 16A through 16D are diagrams showing examples of the contents of area information tables;

DESCRIPTION OF THE PREFERRED EMBODIMENTS

Embodiments of the present invention will now be described in detail with reference to the drawings.

First Embodiment

[Architecture]

Figure 1:
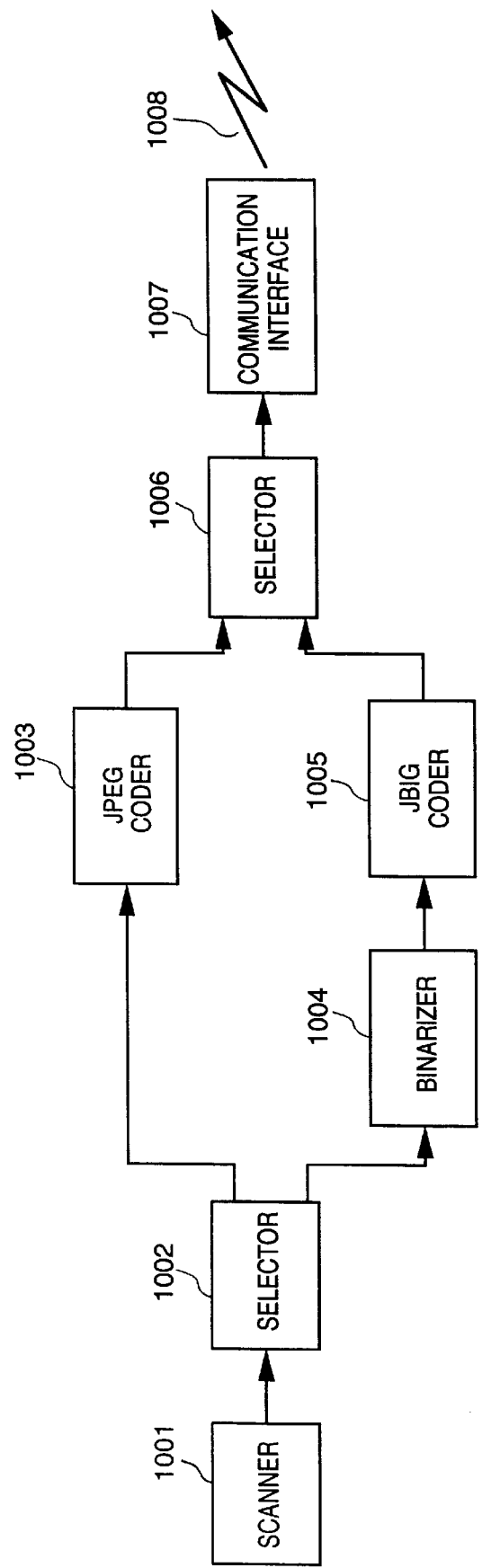
FIG. 1 is a block diagram illustrating the architecture of an image coding apparatus.
Figure 2:
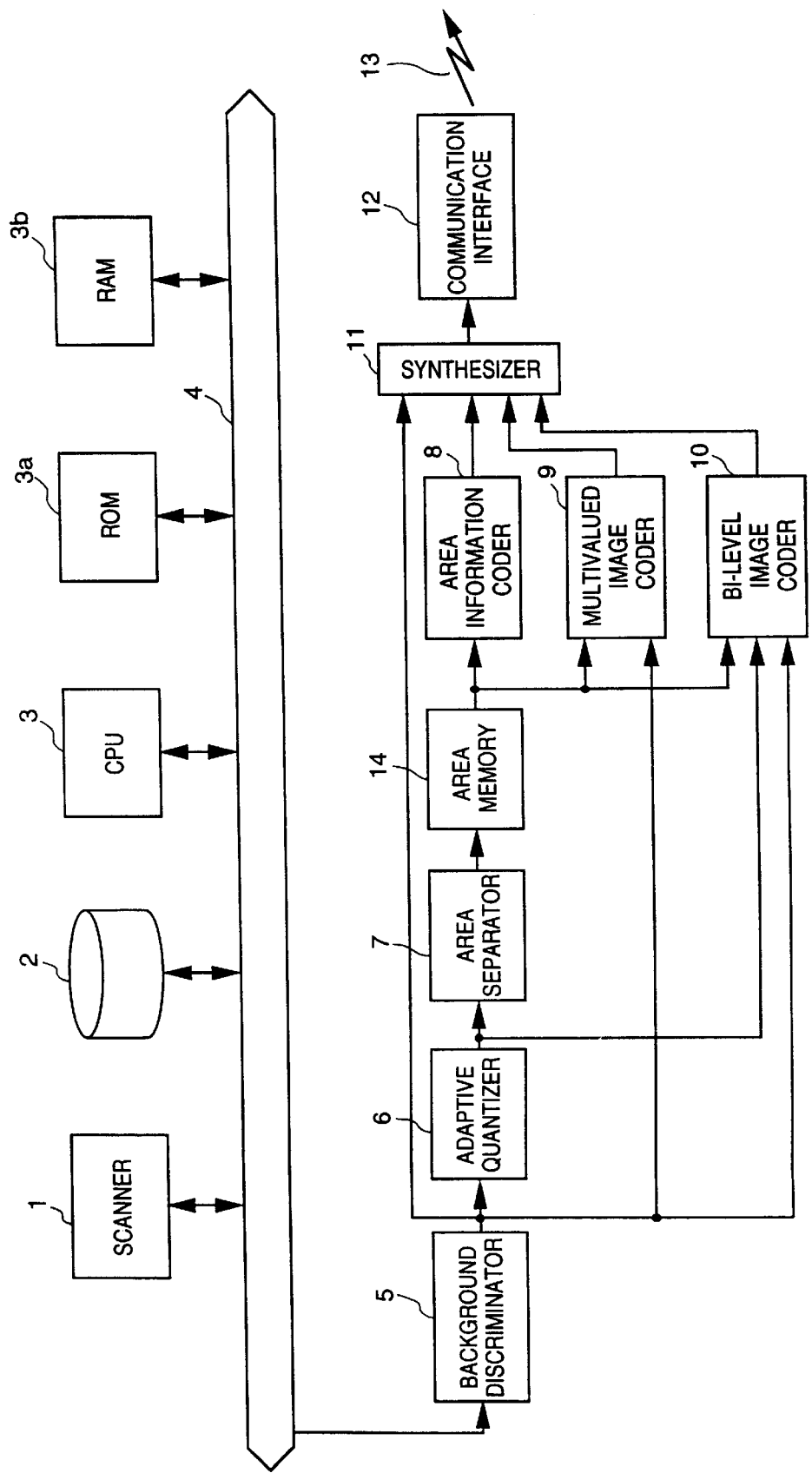
FIG. 2 is a block diagram illustrating the architecture of an image coding apparatus having equipped with the image processing according to this embodiment of the invention.

FIG. 2 is a block diagram illustrating an example in which an image processor according to the first embodiment of the invention is applied to an image transmitting apparatus.

As shown in FIG. 2, the apparatus includes a CPU 3 for controlling the overall apparatus via a bus 4 in accordance with a program stored in a ROM 3a or storage unit 2, etc. The RAM 3b serves as the working memory of the CPU 3 and is used to exchange image data and control signals via the bus 4.

The apparatus further includes a scanner 1 for entering an image, a background discriminator 5 for judging the state of background in the input image and outputting information indicative of the background, an adaptive quantizer 6 for adaptively quantizing the input image, an area separator 7 which, on the basis of results of quantization, separates the input image into areas whose image characteristics resemble one another, an area memory 14 for storing the results of area separation outputted by the area separator 7, an area information coder 8 for coding the results of area separation, a multivalued image coder 9 for coding a multivalued image such as a photograph contained in the input image, a bi-level image coder 10 for binarizing and coding a bi-level image such as a character or line drawing contained in the input image, a synthesizer 11 for combining and outputting code data outputted by each of the coders, a communication interface (IF) 12 and a communication line 13 such as a telephone line or LAN.

It will be assumed in the description below that the input image is a monochromatic multivalued (grayscale) image of eight bits per pixel, that the coding method used by the multivalued image coder 9 is the JPEG coding method, and that the coding method used by the bi-level image coder 10 is the JBIG coding method. However, the present invention is not limited to such an arrangement.

[Background Discriminator]

Figure 3:
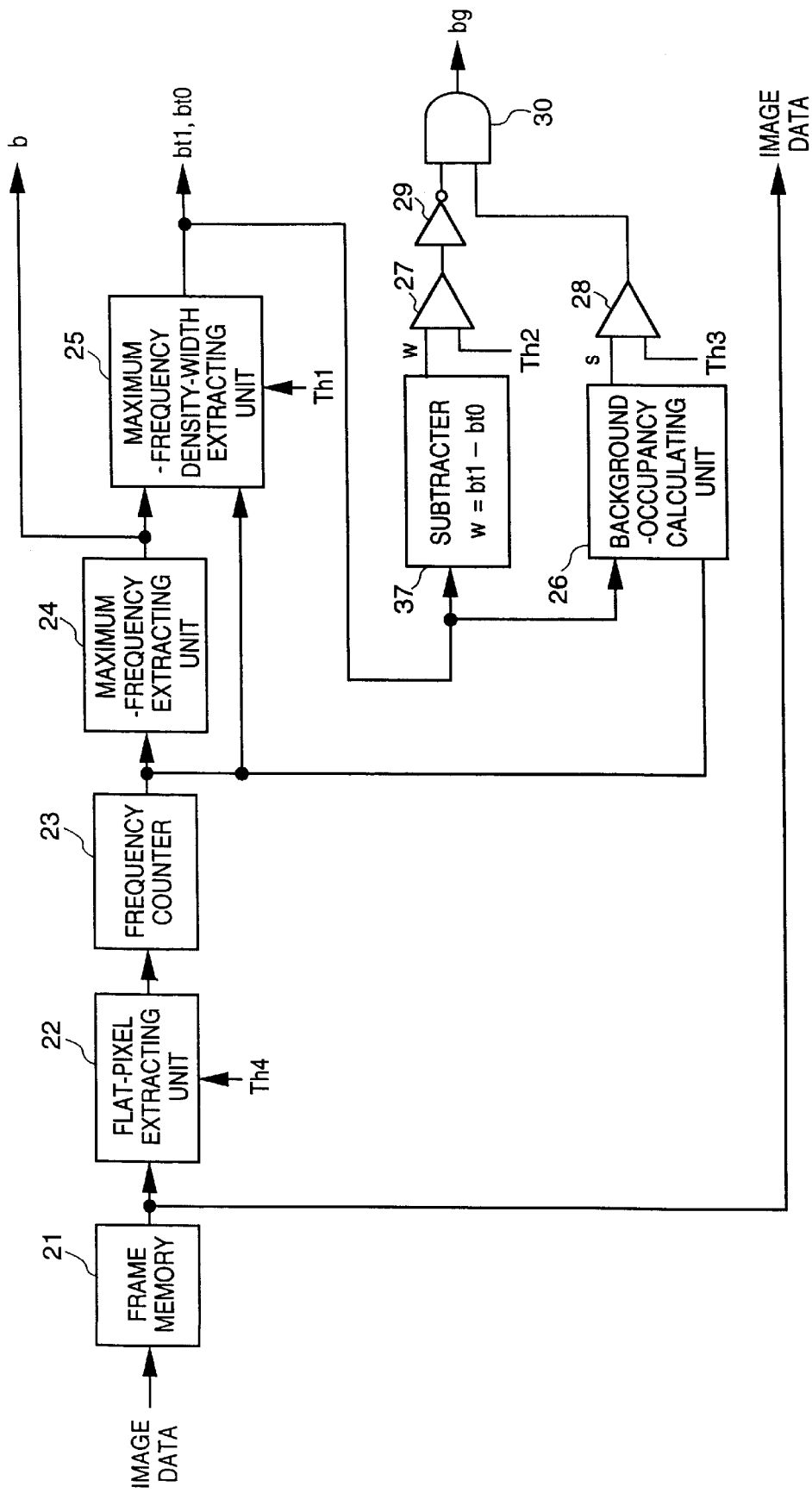
FIG. 3 is a block diagram showing the architecture of a background discriminator depicted in FIG. 2.

FIG. 3 is a block diagram showing the architecture of the background discriminator 5.

As shown in FIG. 3, the background discriminator 5 includes a frame memory 21 for storing one frame of entered image data, and a flat-pixel extracting unit 22 for successively reading a pixel of interest and its neighboring pixels out of the frame memory 21 and, when the pixel of interest is a pixel forming a flat portion of the image, for outputting the value of this pixel. Known methods used by the flat-pixel extracting unit 22 to determine whether a pixel is a flat pixel include a method of extracting maximum and minimum values and a method disclosed by Tetsutani and Koshiji in "Method of Binarizing a Document of Mixed Bi-level Images and Grayscale Images", *Denshi Tsushin Gakkai Ronbunshi*, 1984/7 Vol. J67-B, No. 7, pp. 781–788.

Figure 4:
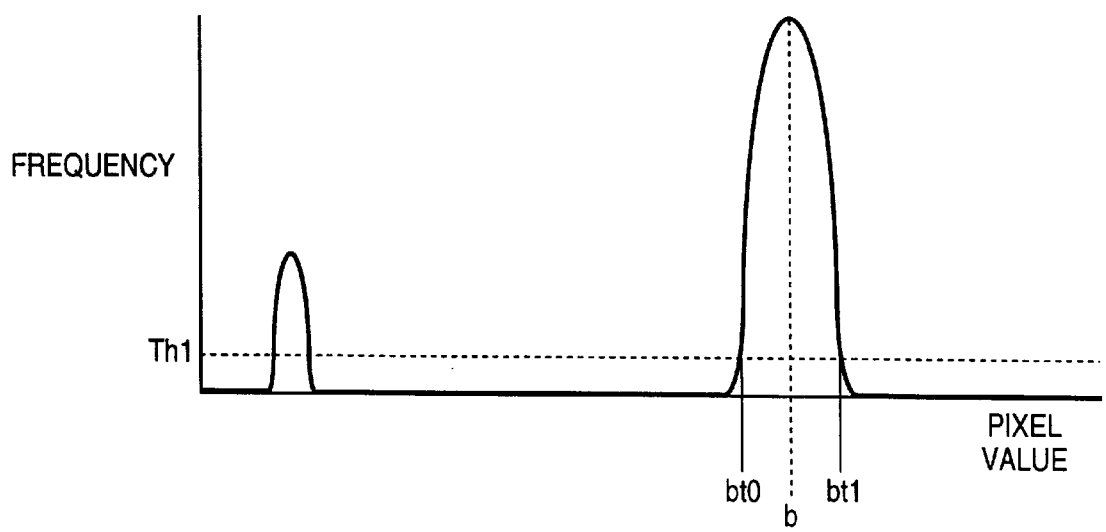
FIG. 4 is a diagram for describing a method of extracting a density width having the maximum frequency of occurrence.

A frequency counter 23 is composed of 256 counters, each of which corresponds to an input value. The counter that corresponds to the pixel value outputted by the flat-pixel extracting unit 22 is counted up. A maximum-frequency extracting unit 24 outputs a value (0~255) that corresponds to the counter exhibiting the maximum count (frequency) among the counters constructing the frequency counter 23. Numeral 25 denotes a unit for extracting a density width having the maximum frequency of occurrence. Specifically, let hist[i] (i=0~255) represent the count of each counter in the frequency counter 23, and let b represent the value (referred to as a "background-candidate value" below) outputted by the maximum-frequency extracting unit 24. The unit 25 obtains a pixel value bt1 (upper-limit value of the background candidate) and a pixel value bt0 (lower-limit value of the background candidate) which, as shown in FIG. 4, are values in the vicinity of the background-candidate value b that have a density less than a preset threshold value Th1 and are closest to the background-candidate value b. It should be noted that the lower-limit value bt0 of the background candidate and the upper-limit value bt1 of the background candidate can be obtained from the points of intersection between the straight line at the level of threshold value Th1 and the frequency curve in the vicinity of the background-candidate value b.

A subtractor 37 obtains the difference (background density width) w between the lower-limit value bt0 of the background candidate and the upper-limit value bt1 of the background candidate. A background-occupancy calculating unit 26 divides the sum of the counts from the frequency counters 23 corresponding to the pixel values bracketed by the lower-limit value bt0 of the background candidate and upper-limit value bt1 of the background candidate, by the number of pixels in the overall image, thereby obtaining the occupancy s of the background. A comparator 27 compares the background density width w with a threshold value Th2, and a comparator 28 compares the background occupancy s with a threshold value Th3. These comparators output "1" if the input value is greater than the threshold value and "0" otherwise. An inverter 29 inverts the output of the comparator 27, and an AND gate 30 takes the logical product between the output of inverter 29 and the output of comparator 28.

The operation of the background discriminator 5 will now be described.

Before processing starts, the CPU 3 clears the frame memory 21 and the frequency counter 23. Next, in accordance with a command from the user, a monochromatic multivalued image read in from the scanner 1 or storage unit 2 is stored in the frame memory 21. When one frame of an image has been stored in the frame memory 21, the flat-pixel extracting unit 22 reads a pixel of interest and its eight surrounding pixels (referential pixels) out of the frame memory 21 in succession, obtains the maximum difference between the value of the pixel of interest and each of the referential pixels and, if the value of this difference is less than a threshold value Th4, outputs the pixel of interest as a pixel forming a flat portion. The frequency counter 23 counts up the counter corresponding to the outputted pixel value.

When processing for extracting the flat pixel ends with regard to all pixels of the image stored in the frame memory 21, the maximum-frequency extracting unit 24 outputs the value (the background-candidate value b) corresponding to the counter having the maximum count among the counters in frequency counter 23. Next, the density-width extracting unit 25 obtains the lower-limit value bt0 of the background candidate and the upper-limit value bt1 of the background candidate from the counts recorded by the frequency counter 23. The subtractor 37 obtains the background density width w from the lower-limit value bt0 of the background candidate and the upper-limit value bt1 of the background candidate that have been obtained, and the background density width w is compared with the threshold value Th2 by the comparator 27.

The background-occupancy calculating unit 26 obtains the background occupancy s from the lower-limit value bt0 of the background candidate and the upper-limit value bt1 of the background candidate, and the background occupancy s is compared with the threshold value Th3 by the comparator 28.

The output of the comparator 27 is inverted by the inverter 29 and is applied to the AND gate 30 together with the output of the comparator 28. The AND gate 30 outputs a background discrimination flag bg, which is the logical product of two inputs.

When the background density width w is less than the threshold value Th2 and the background occupancy s is greater than the threshold value Th3, the flag bg becomes logical "1", which represents solid (plain) background. When these conditions are not satisfied, the flag bg becomes logical "0", which represents background having a pattern.

[Adaptive Quantizer]

Figure 5:
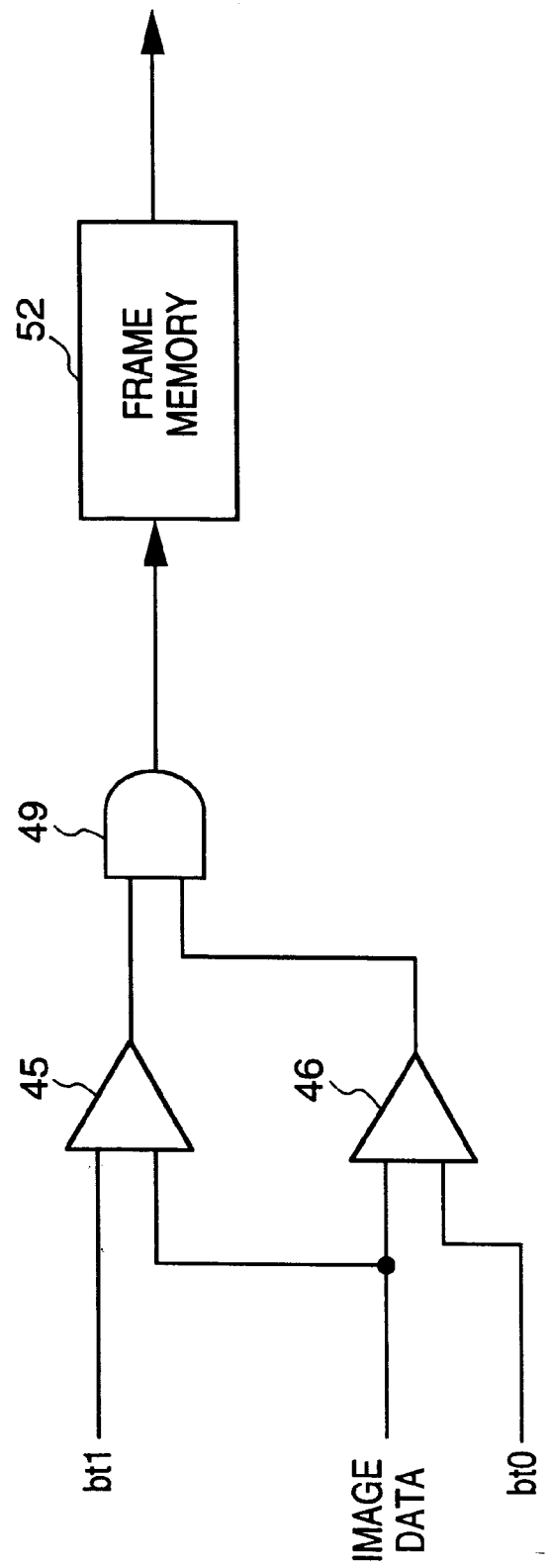
FIG. 5 is a block diagram showing the architecture of an adaptive quantizer depicted in FIG. 2.

FIG. 5 is a block diagram showing the architecture of the adaptive quantizer 6.

As shown in FIG. 5, a comparator 45 compares an entered pixel of interest D with the upper-limit value bt1 of the background candidate provided by the background discriminator 5, outputs "1" if bt1>D holds and "0" otherwise. A comparator 46 compares the entered pixel of interest D with the lower-limit value bt0 of the background candidate provided by the background discriminator 5, outputs "1" if D>bt0 holds and "0" otherwise. The outputs of the comparators 45 and 46 are applied to an AND gate 49. A frame memory 52 stores the output of the AND gate 49.

The operation of the adaptive quantizer 6 will now be described.

When processing by the background discriminator 5 ends, the CPU 3 reads pixels of interest out of the frame memory 21 of background discriminator 5 successively and applies them to the adaptive quantizer 6, whereupon the comparators 45 and 46 perform the above-mentioned comparison operations. The AND between the outputs of the two comparators 45, 46 is obtained by the AND gate 49. The output of the AND gate 49 is "1" if the pixel of interest D is between the upper-limit value bt1 of the background candidate and the lower-limit value bt0 of the background candidate and "0" otherwise. Accordingly, a bi-level image whose background is represented by data "1" is stored in the frame memory 52.

[Area Separator]

When the processing executed by the adaptive quantizer 6 ends for all pixels that have been stored in the frame memory 21, the CPU 3 actuates the area separator 7 when the background discrimination flag bg is "1" (solid background). The area separator 7 reads out the data stored in the frame memory 52, extracts a rectangular area which, based upon the feature of the image, is a character area, photographic area, line-drawing area or separator, and outputs area information which includes the positional coordinates of the area (e.g., the xy coordinates of the upper-left corner of the rectangular area), the size of the rectangular area and a code representing the result of area discrimination. This area information is stored in the area memory 14.

When the background discrimination flag bg is "0" (patterned background), the CPU 3 does not actuate the area separator 7 and stores area information, in the area memory 14, that includes (x,y)=(0,0) (origin) as the positional coordinates of the rectangular area, the size of the overall image as the size of the rectangular area and the code of the photographic area as the code representing the result of area discrimination. In other words, area separation is not carried out with regard to an image whose background has a pattern.

Examples of methods of separating an image into areas are a method, described in Japanese Patent Application Laid-Open No. 62-226770 entitled "Image Area Discriminating Apparatus" and Japanese Patent Application Laid-Open No. 3-126181 entitled "Method of Partitioning Document Image into Areas"), of binarizing an image at a threshold value and discriminating areas such as character areas, photographic areas and tables from clusters of pixels, and a method, described in Japanese Patent Application Laid-Open No. 4-248766 (entitled "Image Area Separation"), of separating an image into characters and pattern areas with background serving as a white area.

[Transmission of Image Data]

When storage of the area information in the area memory 14 ends, the CPU 3 sends the background candidate value b to the communication line 13 via the synthesizer 11 and communication interface 12.

Next, the CPU 3 reads the area information out of the area memory 14 successively, enters the read area information into the area information coder 8 and sends the coded area information to the synthesizer 11. If the rectangular area represented by the area information is a photographic area, the image data of the area read out of the frame memory 21 of the background discriminator 5 are entered into the multivalued image coder 9 and the JPEG-coded image data are sent to the synthesizer 11. If the read area information is indicative of a character area, line-drawing area or separator, the image data (represented by "0") of the area read out of the frame memory 52 of the adaptive quantizer 6 are entered into the bi-level image coder 10 and the JBIG-coded data are sent to the synthesizer 11.

The synthesizer 11 combines the coded area information and the code data obtained by coding the image data of the rectangular area represented by the area information and sends the resulting signal to the communication line 13 via the communication interface 12.

[Summary]

Thus, according to this embodiment, background is discriminated based upon the frequency distribution of pixel values in an input image to be coded, the background is extracted and it is determined whether the background is solid background or patterned background. If the background of the input image is solid background, a bi-level image is formed from the input image based upon the density of the extracted background, areas such as character/line-drawing areas and photographic areas are separated from the bi-level image and image data in these separated areas are coded using a coding method suited to the area. If the background of the input image is patterned, the entire image is coded by multivalued-image coding without partitioning the image into areas. In accordance with this embodiment, therefore, the following effects can be obtained:

(1) Background is extracted from a distribution of pixel values. If the density of the background is low, therefore, it is possible to suppress the effects of "see-thru", in which matter on the reverse side of a document can be seen through the document.

(2) A bi-level image is formed from the input image based upon the density of the extracted background, and the bi-level image is separated into areas. As a result, even low-contrast characters/line drawings and outline characters can be separated correctly.

(3) The image data in an area are coded using the coding method suited to the area. As a result, edges that distinguish characters and line drawings are not made indistinct, the quality of characters is not sacrificed and flattening of grayscale portions is not brought about by binarization.

(4) If background exhibits a pattern, the entire image is coded using multivalued-image coding. This means that optimum coding that takes the background pattern into account can be carried out.

Thus, the method of extracting areas according to this embodiment of the invention makes it possible to discriminate areas with a high degree of precision and to extract character/line-drawing areas even in images that have undergone a negative/positive reversal.

Second Embodiment

An image processing apparatus according to a second embodiment of the present invention will now be described. Elements in the second embodiment identical with those of the first embodiment are designated by like reference characters and need not be described again.

[Architecture]

Figure 6:
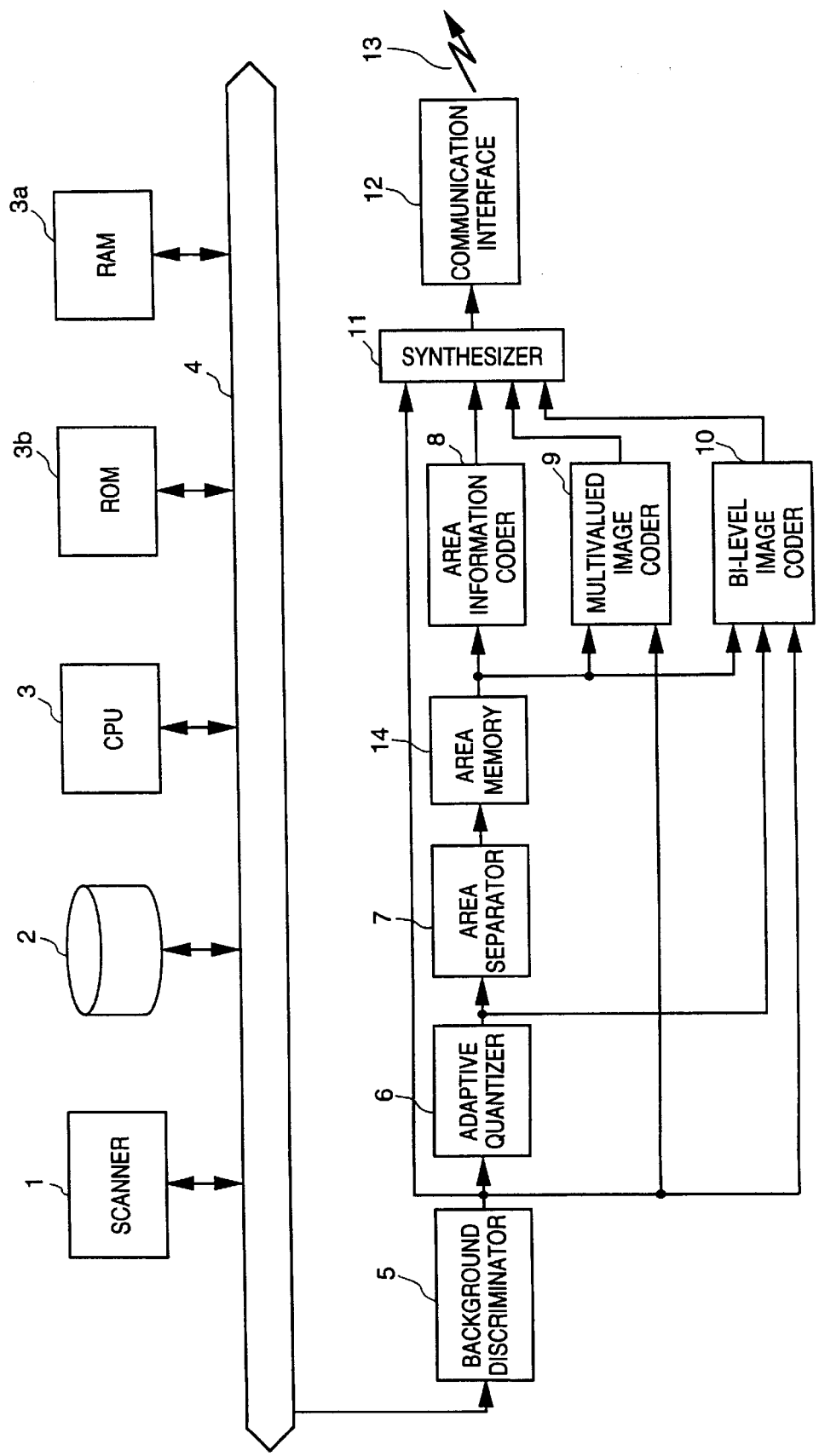
FIG. 6 is a block diagram illustrating the architecture of an image coding apparatus having equipped with the image processing according to a second embodiment of the invention.

FIG. 6 is a block diagram illustrating an example in which an image processor according to the second embodiment of the invention is applied to an image transmitting apparatus. This embodiment differs from the first embodiment shown in FIG. 2 in that a multivalued image enters the bi-level image coder 10 along with the results of area separation and the bi-level image.

It will be assumed in the description below that the input image is an RGB color multivalued image of eight bits per pixel for each of the colors R, G, B, that the coding method used by the multivalued image coder 9 is DPCM (differential pulse-code modulation) coding, and that the coding method used by the bi-level image coder 10 is MMR (modified modified READ) coding. However, the present invention is not limited to such an arrangement.

[Background Discriminator]

Figure 7:
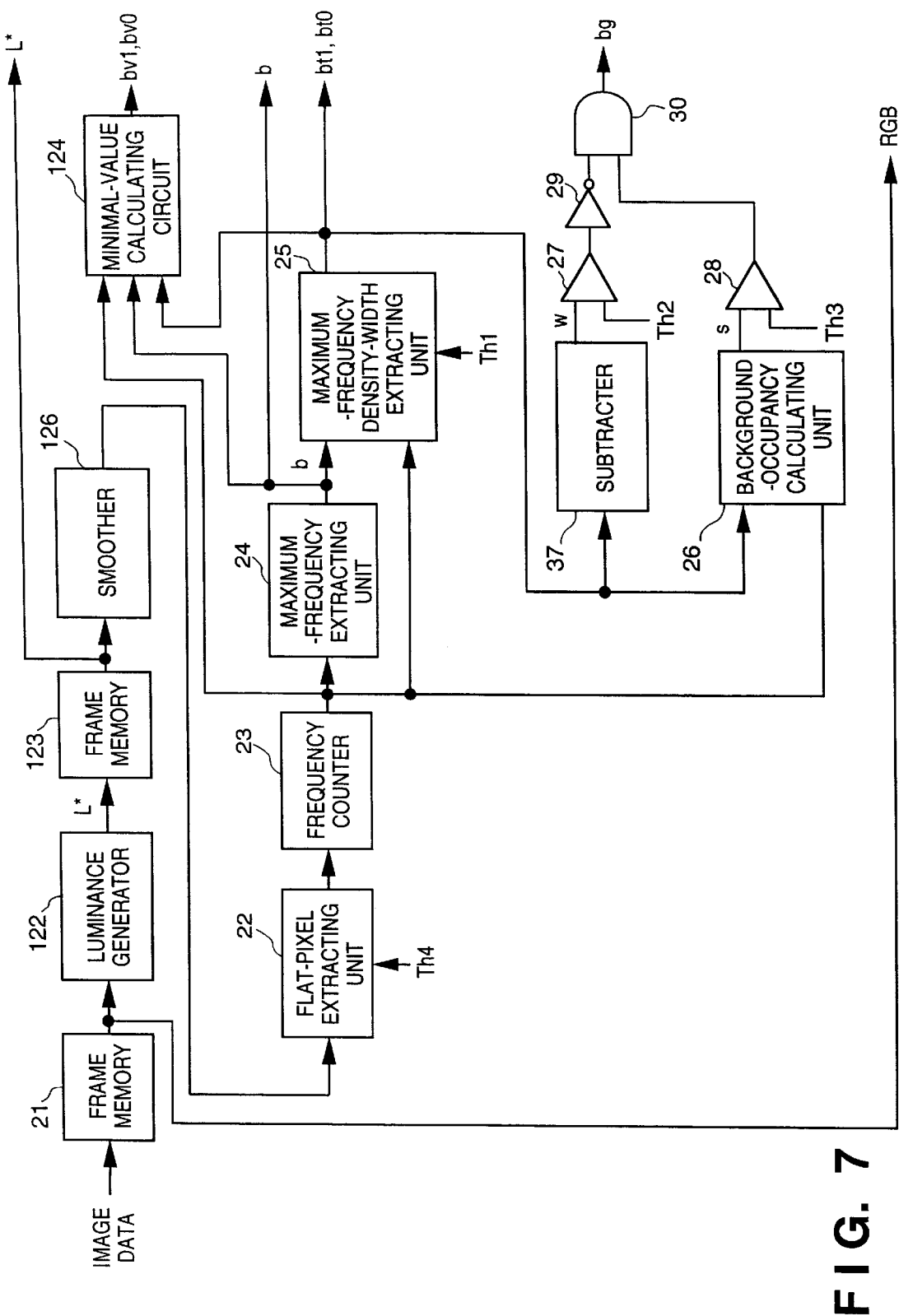
FIG. 7 is a block diagram showing the architecture of a background discriminator depicted in FIG. 6.

FIG. 7 is a block diagram showing the architecture of the background discriminator 7.

As shown in FIG. 7, the background discriminator 5 includes a luminance generator 122 for converting entered RGB image data into a luminance signal L* in CIE1976 L*a*b* uniform color space, a frame memory 123 for storing one frame of L* image data, a smoother 126 for reading in the image data from the frame memory 123 and performing 3×3 pixel smoothing, and a minimal-value calculating unit 124. As exemplified in FIGS. 8A, 8B, the minimal-value calculating unit 124 obtains a pixel value bv1 (second upper-limit value of a background candidate) and a pixel value bv0 (second lower-limit value of a background candidate) which are values in the vicinity of the background-candidate value b that exhibit minima and are closest to the background-candidate value b. It should be noted that the outputs bt0, bt1 from the density-width extracting unit 25 shall be referred to as first and second upper-limit values of the background candidate, respectively.

The operation of the background discriminator 5 will now be described mainly with regard to the features that distinguish it from that of the first embodiment.

Before processing starts, the CPU 3 clears the frame memory 21 and the frequency counter 23. Next, in accordance with a command from the user, a color multivalued image read in from the scanner 1 or storage unit 2 is stored in the frame memory 21. When one frame of an image has been stored in the frame memory 21, the luminance generator 122 reads the RGB image data out of the frame memory 21 in succession, makes the conversion to L* image data and writes these data in the frame memory 123.

When one frame of the L* image data has been stored in the frame memory 123, the smoother 126 reads the pixel of interest and its surrounding pixels (for a total of 3×3 pixels) out of the frame memory 123 and smoothes the pixel of interest. The flat-pixel extracting unit 22 in this embodiment determines whether the pixel of interest is a pixel forming a flat portion based upon the smoothed pixel of interest and its eight surrounding referential pixels, and the number of flat pixels is counted by the frequency counter 23.

Upon conclusion of smoothing processing, processing for extracting flat pixels and counting executed with regard to all pixels stored in the frame memory 123, the maximum-frequency extracting unit 24 outputs the background-candidate value b, the density-width extracting unit 25 outputs the first lower-limit value bt0 of the background candidate and the first upper-limit value bt1 of the background candidate, and the minimal-value calculating unit 124 outputs the second lower-limit value bv0 of the background candidate and the second upper-limit value bv1 of the background candidate.

[Adaptive Quantizer]

Figure 9:
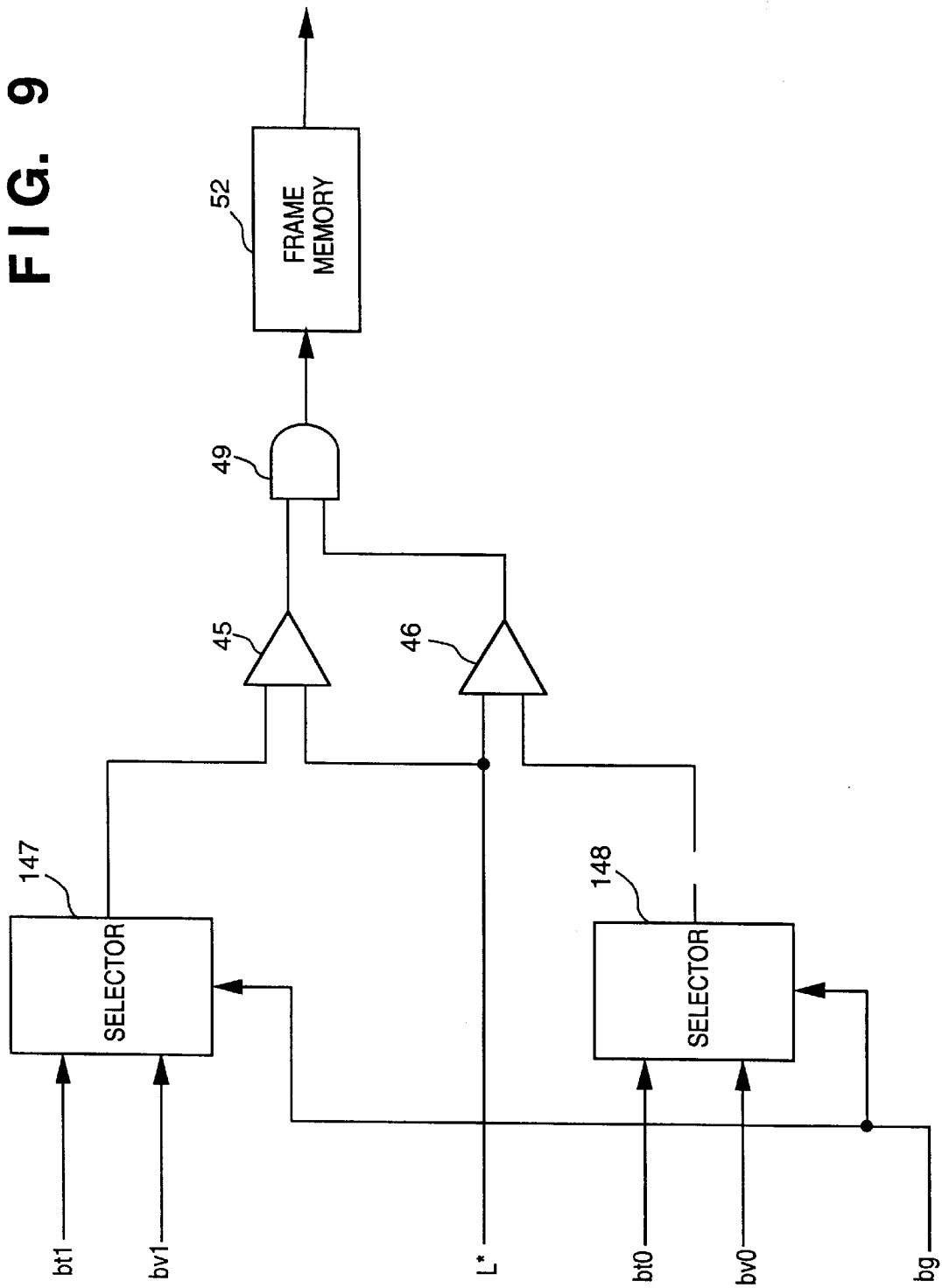
FIG. 9 is a block diagram showing the architecture of an adaptive quantizer depicted in FIG. 6.

FIG. 9 is a block diagram showing the architecture of the adaptive quantizer 6.

The adaptive quantizer 6 includes selectors 147 and 148 for selecting and outputting inputs in accordance with the background discriminating flag bg. The selector 148 selects either the first or second lower-limit value of the background candidate and enters the selected lower-limit value of the background candidate into the comparator 46. The selector 147 selects either the first or second upper-limit value of the background candidate and enters the selected upper-limit value of the background candidate into the selector comparator 45.

The operation of the adaptive quantizer 6 will now be described mainly with regard to the features that distinguish it from that of the first embodiment.

When processing by the background discriminator 5 ends, the CPU 3 reads pixels of interest out of the frame memory 21 of background discriminator 5 successively and applies them to the adaptive quantizer 6, whereupon the comparators 45 and 46 perform the above-mentioned comparison operations. The AND between the outputs of the two comparators 45, 46 is obtained by the AND gate 49, whose output is written in the frame memory 52.

When the background discrimination flag bg is "1" (which represents solid background), the selector 147 selects the first upper-limit value bt1 of the background candidate and the selector 148 selects the first lower-limit value bt0 of the background candidate. The operations of the comparators 45 and 46 are as described in the first embodiment. That is, if the pixel of interest D is between the first upper-limit value bt1 of the background candidate and the first lower-limit value bt0 of the background candidate, the output of the AND gate 49 is "1"; otherwise, the output of the AND gate 49 is "0".

When the background discrimination flag bg is "0" (which represents patterned background), the selector 147 selects the second upper-limit value bv1 of the background candidate and the selector 148 selects the second lower-limit value bv0 of the background candidate. Accordingly, if the pixel of interest D is between the second upper-limit value bv1 of the background candidate and the second lower-limit value bv0 of the background candidate, the output of the AND gate 49 is "1"; otherwise, the output of the AND gate 49 is "0".

Accordingly, a bi-level image whose background is represented by data "1" is stored in the frame memory 52. In case of a patterned background, however, it is more difficult for a definite difference in frequency to be produced than in the case of solid background. When the minimum value is used, however, extraction of background can be carried out in optimum fashion even if the background is patterned.

[Area Separator]

When the processing executed by the adaptive quantizer 6 ends for all pixels that have been stored in the frame memory 123, the CPU 3 actuates the area separator 7 irrespective of the logical value of background discrimination flag bg, unlike in the first embodiment. The area separator 7 reads out the data stored in the frame memory 52, extracts a rectangular area which, based upon the feature of the image, is a character area, photographic area, line-drawing area or separator, and outputs area information which includes the positional coordinates of the area (e.g., the xy coordinates of the upper-left corner of the rectangular area), the size of the rectangular area and a code representing the result of area discrimination. This area information is stored in the area memory 14.

[Transmission of Image Data]

When processing executed by the adaptive quantizer 6 ends with regard to all pixels stored in the frame memory 123 and storage of the area information in the area memory 14 ends, the CPU 3 sends the background candidate value b, which has been outputted by the background discriminator 5, to the communication line 13 via the synthesizer 11 and communication interface 12.

Next, the CPU 3 reads the area information out of the area memory 14 successively, enters the read area information into the area information coder 8 and sends the coded area information to the synthesizer 11. If the rectangular area represented by the area information is a photographic area, the image data of the area read out of the frame memory 21 of the background discriminator 5 are entered into the multivalued image coder 9 and the DPCM-coded image data are sent to the synthesizer 11. If the read area information is indicative of a character area, line-drawing area or separator, the image data of the area read out of the frame memory 52 of the adaptive quantizer 6 and the image data of the area read out of the frame memory 21 of the background discriminator 5 are entered into the bi-level image coder 10 and the MMR-coded data and foreground color information (described in detail later) are sent to the synthesizer 11.

The synthesizer 11 combines the coded area information, the code data obtained by coding the image data of the rectangular area represented by the area information and the foreground information and sends the resulting signal to the communication line 13 via the communication interface 12.

[Bi-level Image coder]

Figure 10:
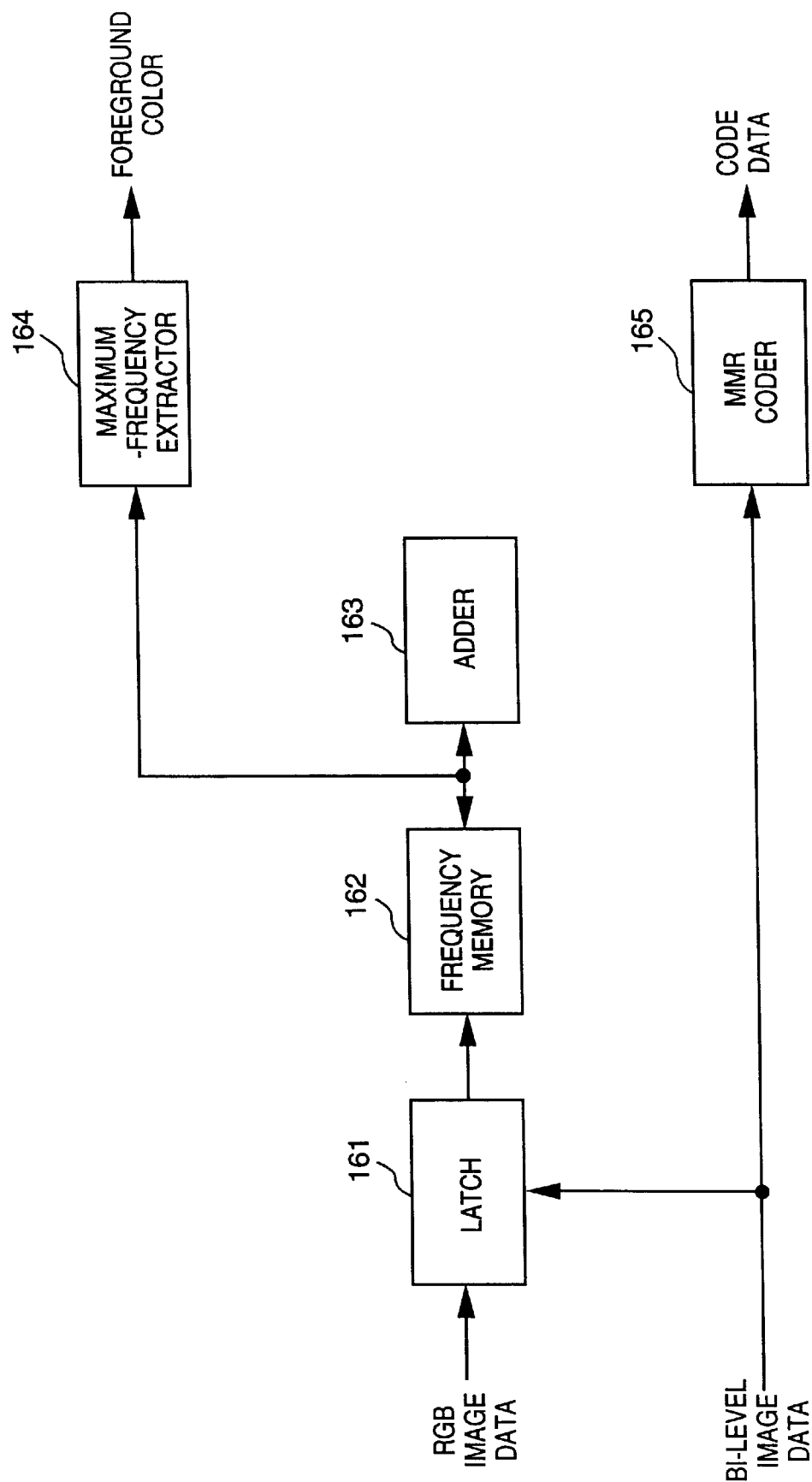
FIG. 10 is a block diagram showing the architecture of a bi-level image coder depicted in FIG. 6.

FIG. 10 is a block diagram showing the architecture of a bi-level image coder 10.

As shown in FIG. 10, the bi-level image coder 10 includes a latch 161 for latching the RGB image data that have entered successively from the frame memory 21 of the background discriminator 5. When bi-level image data that have entered from the frame memory 52 of the adaptive quantizer 6 in sync with the RGB image data indicate "0" (a portion of the image other than background), the latch 161 outputs the latched data.

A frequency memory 162 is composed of memories for each of the R, G, B color components and has address terminals to which the R (red), G (green) and B (blue) data from the latch 161 are applied. An adder 163 adds 1 to its input data and outputs the result. More specifically, when RGB image data enter the frequency memory 162, the R, G, B values serves as addresses and the data stored in the respective memories are outputted. The data outputted by the frequency memory 162 has 1 added to it by the adder 163, after which the data are stored in the frequency memory 162 again. In other words, distributions of the R, G, B data representing image data from which background has been excluded are stored in the frequency memory 162. It should be noted that the frequency memory 162 is cleared by the CPU 3 before coding is performed.

A maximum-frequency extractor 164 outputs, as RGB data, each address for which each RGB frequency stored in the frequency memory 162 indicates the maximum value. The RGB data for which the frequency is indicated as being maximum shall be referred to as the "foreground color" of the input image. An MMR coder 165 applies MMR coding to the bi-level image data that have entered from the frame memory 52 of the adaptive quantizer 6.

If the read area information is indicative of a character area, photographic area, line-drawing area or separator, the CPU 3 reads the bi-level image data of this area out of the frame memory 52 of the adaptive quantizer 6 and the RGB multivalued image data out of the frame memory 21 of the background discriminator 5 synchronously and enters these data into the bi-level image coder 10.

When frequency counting processing ends for all pixels in the area, the maximum-frequency extractor 164 extracts the foreground color information from the results of counting stored in the frequency memory 162 and outputs the foreground color to the synthesizer 11. Next, the CPU 3 reads the bi-level image data in the area out of the frame memory 52, causes the MMR coder 165 to apply MMR coding and outputs the coded data to the synthesizer 11.

[Summary]

In accordance with this embodiment, effects similar to those of the first embodiment can be obtained. Moreover, two sets of lower-limit values and upper-limit values of background densities are set. As a result, even if the background of an input image exhibits a pattern, the areas of the image can be discriminated precisely and coding suited to the characteristics of each separated area can be applied to each area.

An example has been described in which a luminance signal is generated from a color image, after which the image is separated into areas. However, this does not impose a limitation upon the invention. A G (green) signal may be used instead of the luminance signal, and a similar operation may be applied for each of the colors R, G, B. Further, CIE1976 L*u*v* or YIQ may be used as the uniform color space. Furthermore, an arrangement may be adopted in which areas are discriminated by prescanning, after which the color image is read in.

Third Embodiment

An image processing apparatus according to a third embodiment of the present invention will now be described. Elements in the third embodiment identical with those of the first embodiment are designated by like reference characters and need not be described again.

[Architecture]

Figure 11:
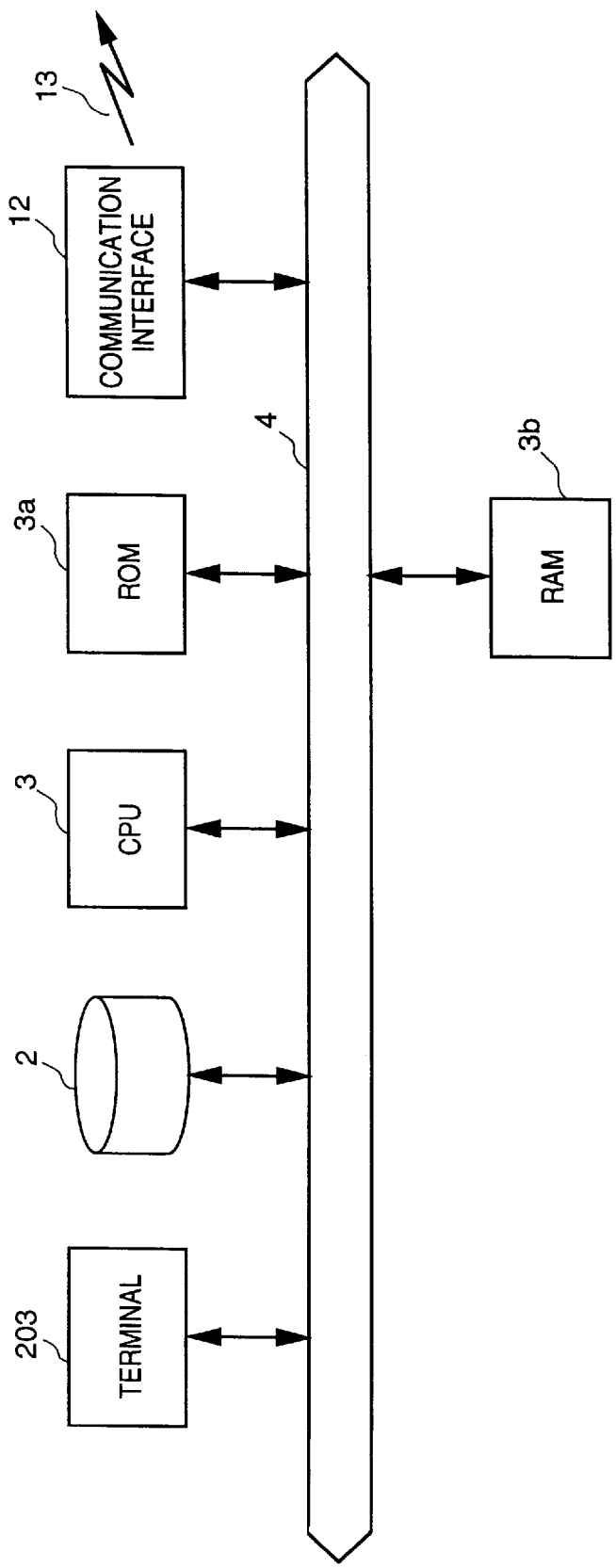
FIG. 11 is a block diagram illustrating the architecture of an image coding apparatus having equipped with the image processing according to a third embodiment of the invention.
Figure 12:
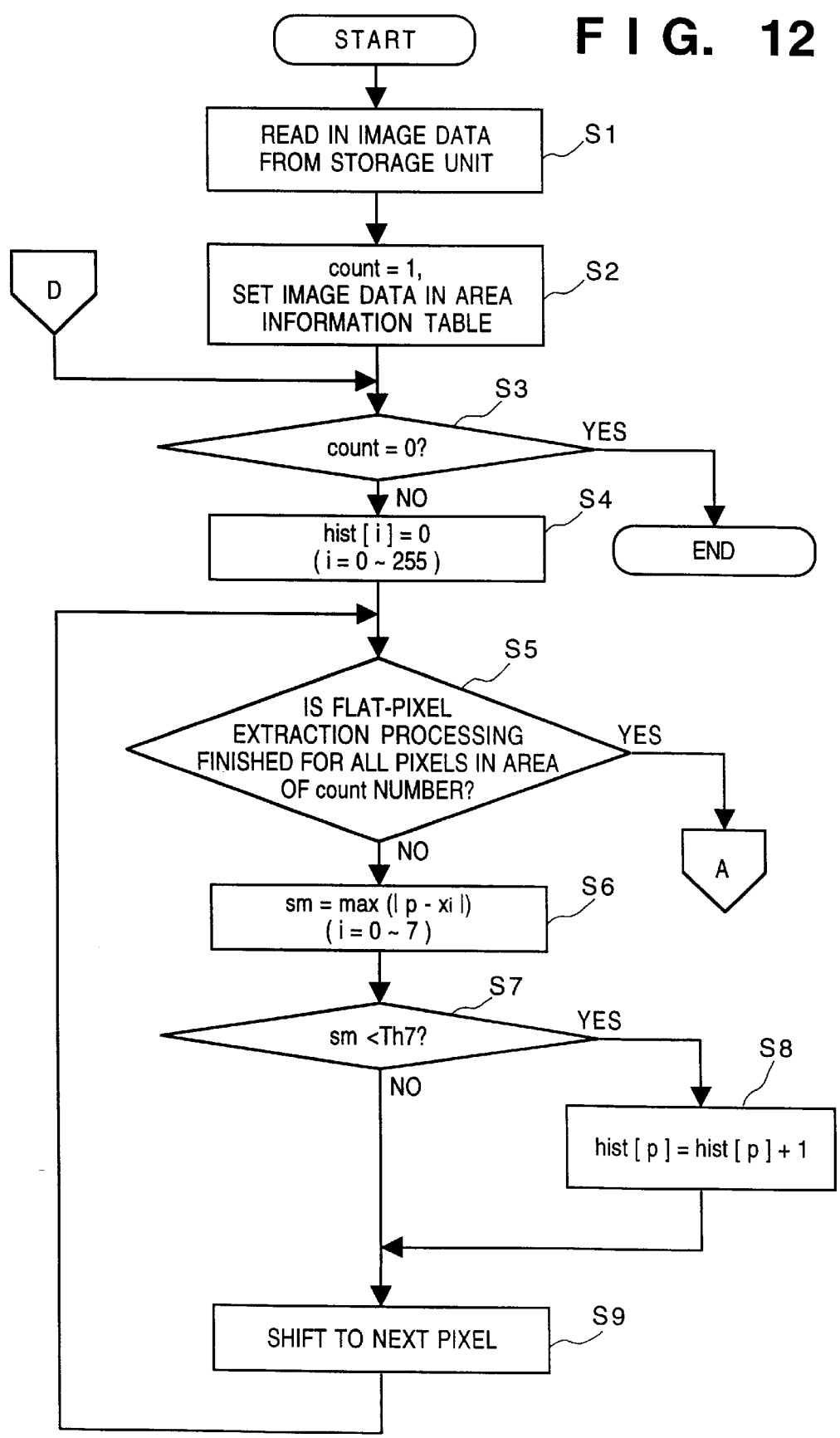
FIGS. 12 through 15 are flowcharts showing coding processing according to the third embodiment.
Figure 13:
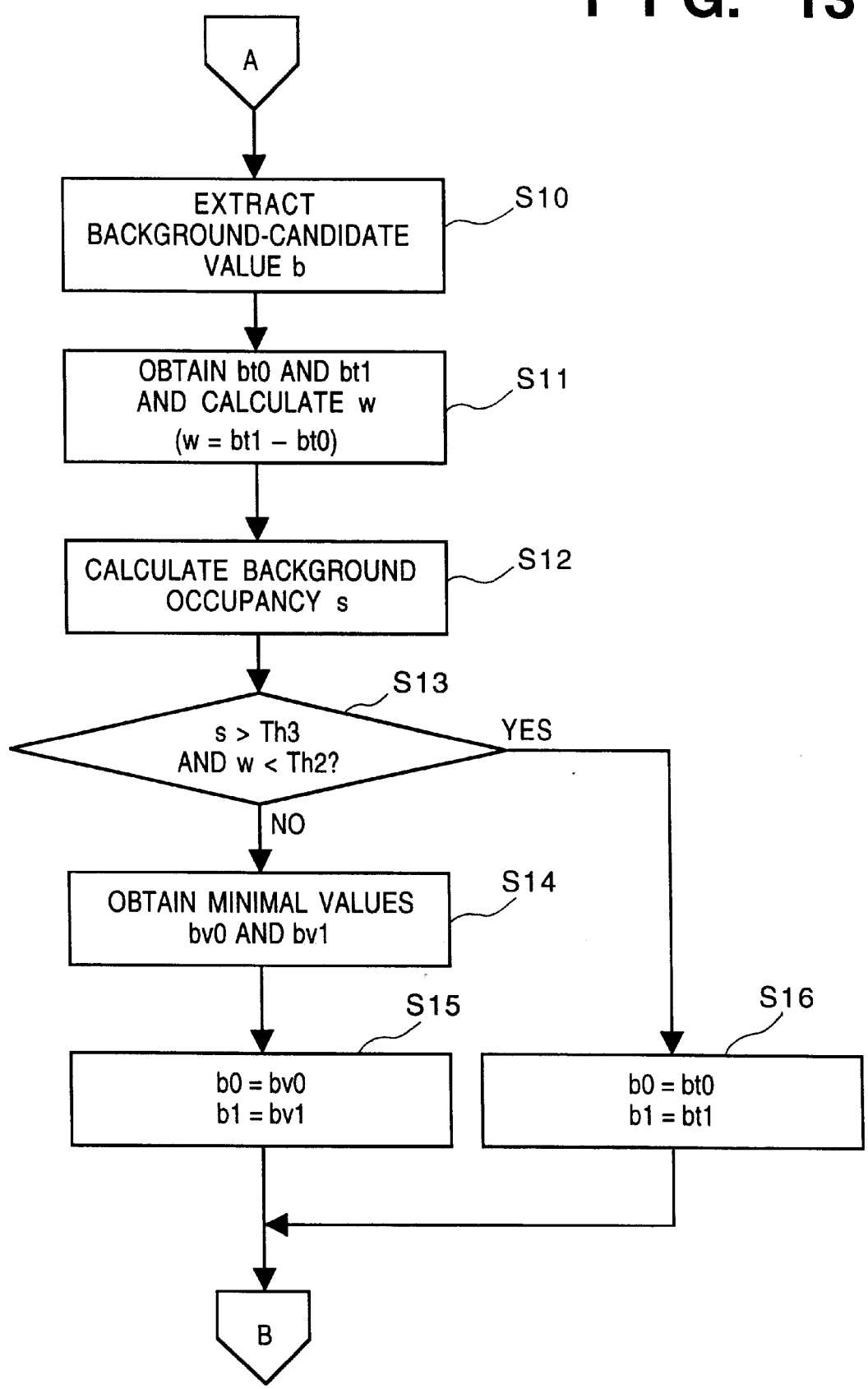
Figure 14:
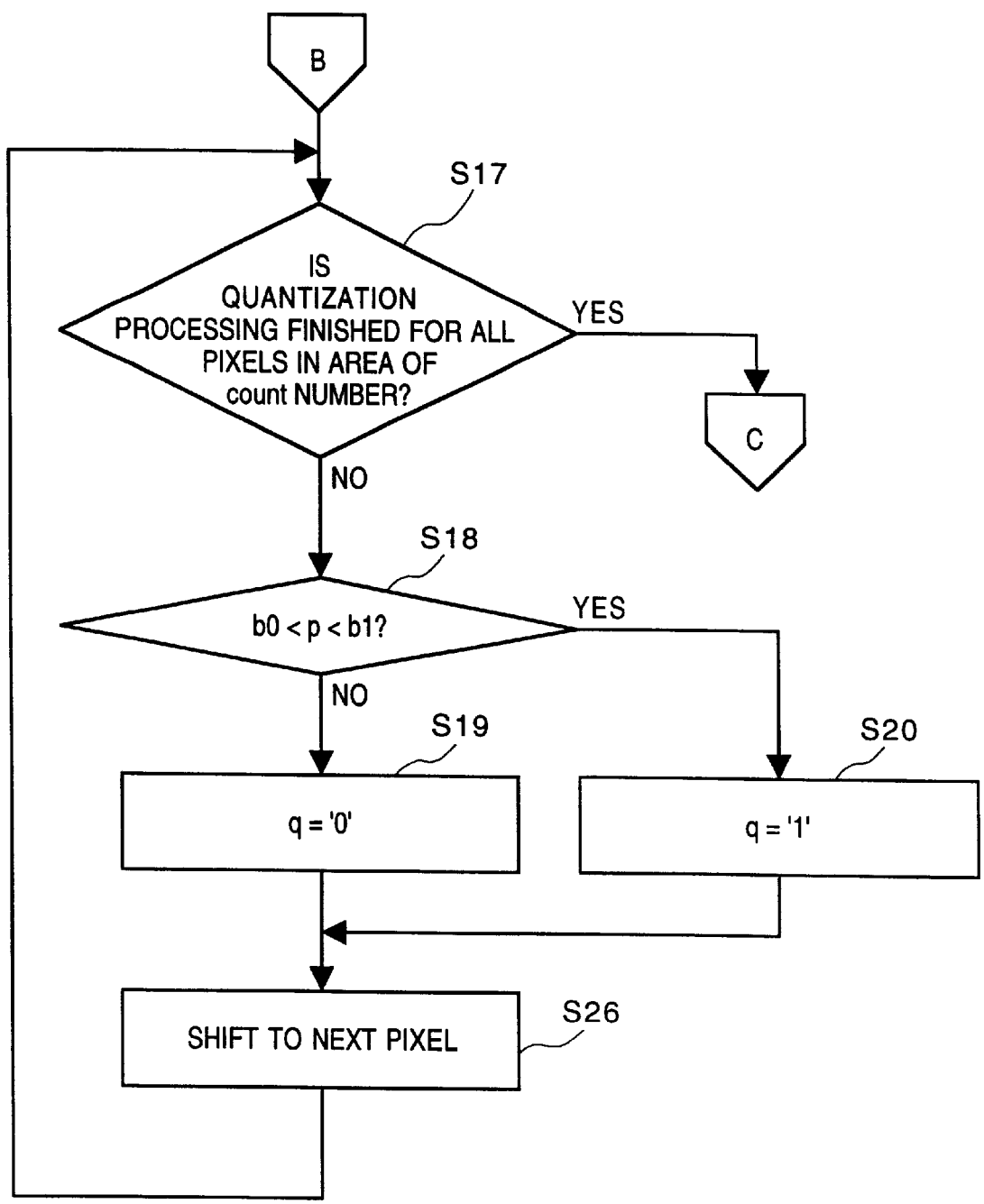
Figure 15:
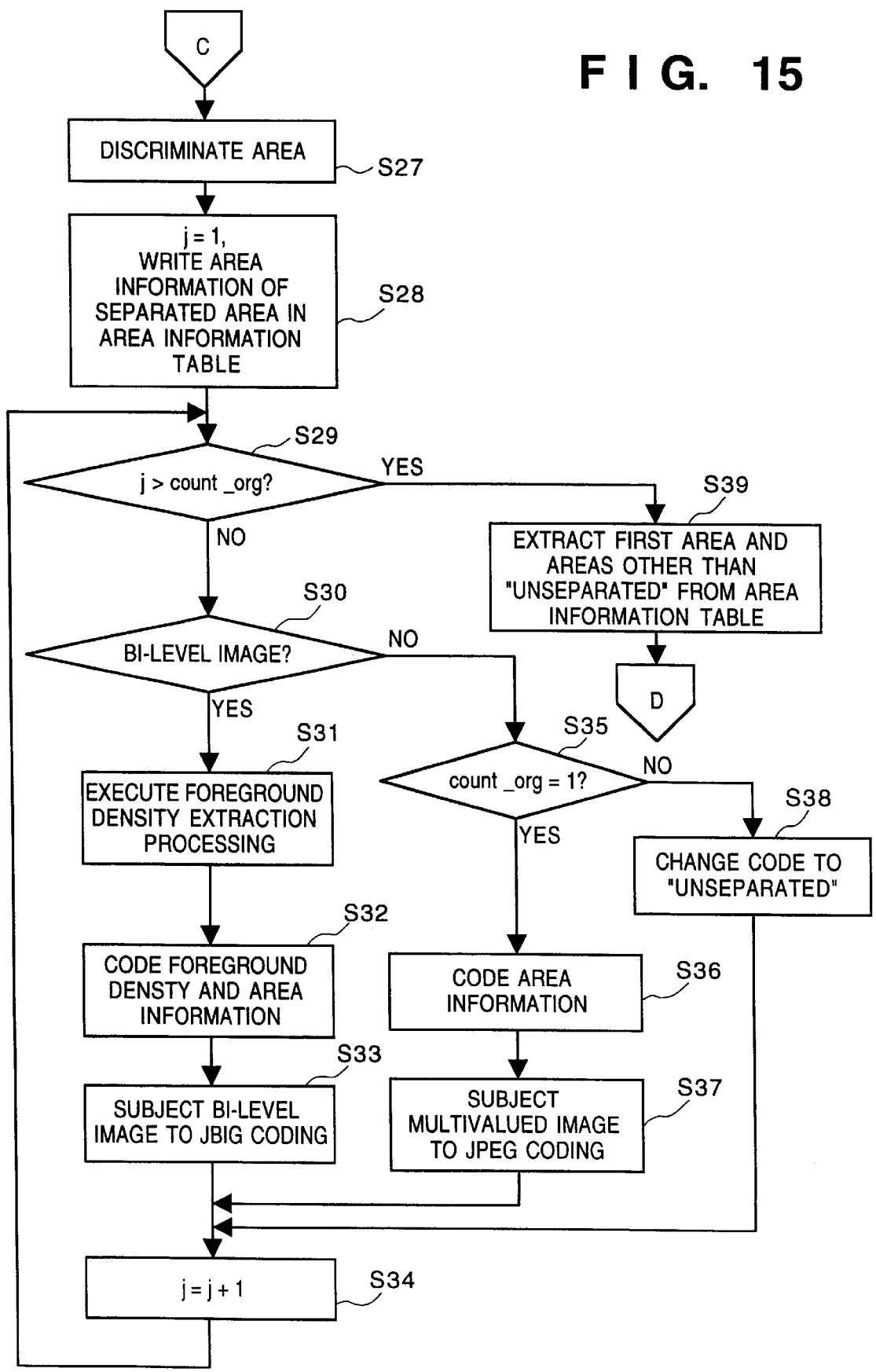

FIG. 11 is a block diagram illustrating an example in which an image processor according to the third embodiment of the invention is applied to an image transmitting apparatus.

According to this embodiment, coding processing described in the first and second embodiments is executed by software, which has been stored in the ROM 3$a$, based upon a command entered by the user employing a terminal 203. Furthermore, here the RAM 3$b$ has enough storage capacity to implement this coding processing.

It will be assumed in the description below that the input image is a monochromatic multivalued image of eight bits per pixel, that the method of coding the multivalued image is the JPEG coding method, and that the method of coding the bi-level image is the JBIG coding method. However, the present invention is not limited to such an arrangement.

[Processing Procedure]

FIGS. 12 through 15 are flowcharts showing coding processing according to the third embodiment. If coding has been designated using the terminal 203, the CPU 3 executes the processing of this flowchart in accordance with the program stored in the ROM 3a.

Initialization

The image data are read in from the storage unit 2 at step S1. When the reading in of one frame of image data ends, the program proceeds to step S2. Here the count of areas is made equal to one and the first record of an area information table is created. Specifically, (0,0) is stored as "Positional Coordinates" of the upper left-hand corner of the rectangular area, image size is stored as "Image Size" representing the size of the rectangular area, and a code corresponding to an as yet unseparated area is stored as a "Code" representing the result of discriminating the area. FIG. 16A illustrates an example of the content of the area information table when the processing of step S2 has been completed. This illustrates an example in which 3,072×4,096 pixels have been stored as "Area Size".

Next, at step S3, the value of the count is judged and, if count≠0 holds, the program proceeds to step S4, where the histogram table hist[i] (i=0~255) is cleared in its entirety.

Extraction of Flat Pixels

Extraction of flat pixels is performed next. First, at step S5, it is determined whether processing for extraction of flat pixels has been performed for all pixels in the rectangular area recorded in the area table according to the number of the count. If a pixel not yet processed still exists, the program proceeds to step S6, where the image data in the rectangular area recorded in the area information table according to the number of the count are read in successively and a value sm is obtained. The value sm is that at which the absolute value of the difference between a pixel of interest p and a neighboring pixel $x_i$ is maximum. Next, at step S7, the maximum difference value sm and a threshold value Th7 are compared. The program proceeds to step S9 if sm≧Th7 holds. If sm<Th7 holds, hist[p] in the histogram table is incremented at step S8 by reason of the fact that the pixel of interest p is a pixel forming a flat portion of the image. The pixel of interest is shifted to the next pixel at step S9, after which the program returns to step S5.

Extraction of Background

When the processing of steps S6~S9 ends with regard to all pixels in the area corresponding to the number of the count, the program proceeds to step S10. Here hist[i] indicating the maximum value (frequency of occurrence) is obtained in the histogram table and the parameter i is adopted as the value b of the background candidate. (In other words, hist[b] is the maximum value.) Next, at step S11, the lower-limit value bt0 of the background candidate and the upper-limit value bt1 of the background candidate are obtained and the background density width w is found in accordance with the following equation:

$$w = bt1 - bt0 \quad (1)$$

Next, at step S12, all hist[i] contained in the range of values from lower-limit value bt0 of the background candidate to upper-limit value bt1 of the background candidate are summed, the sum is divided by the number m of pixels in the area and background occupancy s is obtained as follows:

$$s = sum/m = \sum_{i=bt0}^{bt1} hist[i]/m \quad (2)$$

Next, at step S13, the background occupancy s is compared with the threshold value Th3 and the background density width w is compared with the threshold value Th2. If s>Th3 and w<Th2 hold, it is judged that the area has solid background and the program proceeds to step S16, where bt0 is substituted into the lower limit value b0 of background and bt1 is substituted into the upper limit b1 of background. Further, if the background occupancy s and background density width w do not satisfy the above-mentioned conditions, the area is judged not to have solid background and the program proceeds to step S14. Here the second lower-limit value bv0 of the background candidate and second upper-limit value bv1 of the background candidate are obtained from the minima of hist[i]. This is followed by step S15, at which bv0 is substituted into the lower limit value b0 of background and bv1 is substituted into the upper limit b1 of background.

Quantization

Adaptive quantization processing is executed next. First, at step S17, it is determined whether quantization processing has been performed for all pixels in the rectangular area recorded in the area table according to the number of the count. If a pixel not yet processed still exists, the program proceeds to step S18, where the image data in the rectangular area recorded in the area information table according to the number of the count are read in successively and the pixel of interest p is compared with the lower-limit value b0 and upper-limit value b1 of the background. If b0<p<b1 holds, the binarized result q is made "1" at step S20; otherwise, q is made "0" at step S19.

The pixel of interest is shifted to the next pixel at step S26, at which the program returns to step S17. The binarized result q obtained is stored in memory as a bi-level image.

Area Separation

When the processing of steps S18~S26 has ended for all pixels in the area according to the number of the count, the program proceeds to step S27, where the rectangular area, namely the character area, photographic area, line-drawing area or separator, are extracted, on the basis of the features of the image, from the bi-level image obtained by the quantized result q. Next, at a step S28, the variable j is set one and newly extracted area information of count_org-number of areas is written in the area information table as records from the (i+1)th onward. FIG. 16B illustrates the contents of the area information table when the processing of step S28 has been completed.

Coding

Coding processing is performed next. First, at step S29, it is determined whether coding of the extracted count_org-number of area items has been completed. If an unprocessed area exists, the program proceeds to step S30. If the code representing the result of discriminating the (count+j)th areas of the area information table represents the bi-level image of a character, separator, line drawing or table ("YES" at step S30), the program proceeds to step S31.

In a case where the area to be coded is a bi-level image, foreground-density extraction processing is executed at step S31. More specifically, a histogram table histfg[i] is cleared in its entirety, the bi-level image of this area is read in, the histogram table data (namely histhg[p]) of the pixel value p of a multivalued image corresponding to a pixel value of "0" in the bi-level image is incremented and the density at which the histogram table data indicates the maximum value is adopted as foreground density f.

Next, at step S32, the (count+j)th area information and the foreground density f are coded and sent to the communication line 13 via the communication interface 12. The bi-level image of this area is coded according to the JBIG standard at step S33 and then sent to the communication line 13 via the communication interface 12, after which the program proceeds to step S34.

In a case where the area to be coded is a multivalued image, it is determined at step S35 whether the number count_org of separated areas is one or not. If count_org≠1 holds, the code of the (count+j)th area is changed (step S38) to a code representing an as yet unseparated area (see record 4 in FIG. 16C) and the program proceeds to step S34.

If count_org=1 holds (i.e., if there are no separated areas), the program proceeds to step S36, where the (count+1)st area information is coded and then sent to the communication line 13 via the communication interface 12. The multivalued image of this area is subjected to JPEG coding at step S37 and the coded data is sent to the communication line 13 via the communication interface 12, after which the program proceeds to step S34.

Next, the variable j is incremented at step S34, after which the program returns to step S29. When the inequality j>count_org is established, the first record is deleted from the area information table and so is the record in which the code representing "Character", "Separator", "Line Drawing" and "Table" has been recorded. The area information table is then reconstituted (see FIG. 16D) while filling the spaces let blank by the deleted portions, and the area count is enumerated. (In case of FIG. 16D, count=1 is established.)

In other words, after the first record (area) for which an area has been separated and records (areas) having codes other than "Unseparated" have been deleted, the program returns to step S3. If count=0 holds (i.e., if there are no areas to be separated), all processing is terminated. In the example of FIG. 16D, an "Unseparated" area remains. Hence, the processing from step S4 onward is repeated.

[Summary]

In accordance with this embodiment, effects similar to those of the first embodiment can be obtained. Moreover, by separating areas repeatedly, binary coding is performed even with regard to flat areas in small sub-areas. As a result, coding efficiency is improved and, at the same time, characters and line drawings can be reproduced by binary values. Accordingly, characters and line drawings undergo no deterioration and the quality of a transmitted image can be improved.

Fourth Embodiment

An image processing apparatus according to a fourth embodiment of the present invention will now be described. In the fourth embodiment, only the architecture and operation of the adaptive quantizer 6 differ from those of the first embodiment. Accordingly, in the description below, only the adaptive quantizer 6 will be described. Elements in the fourth embodiment identical with those of the first embodiment are designated by like reference characters and need not be described again.

Figure 17:
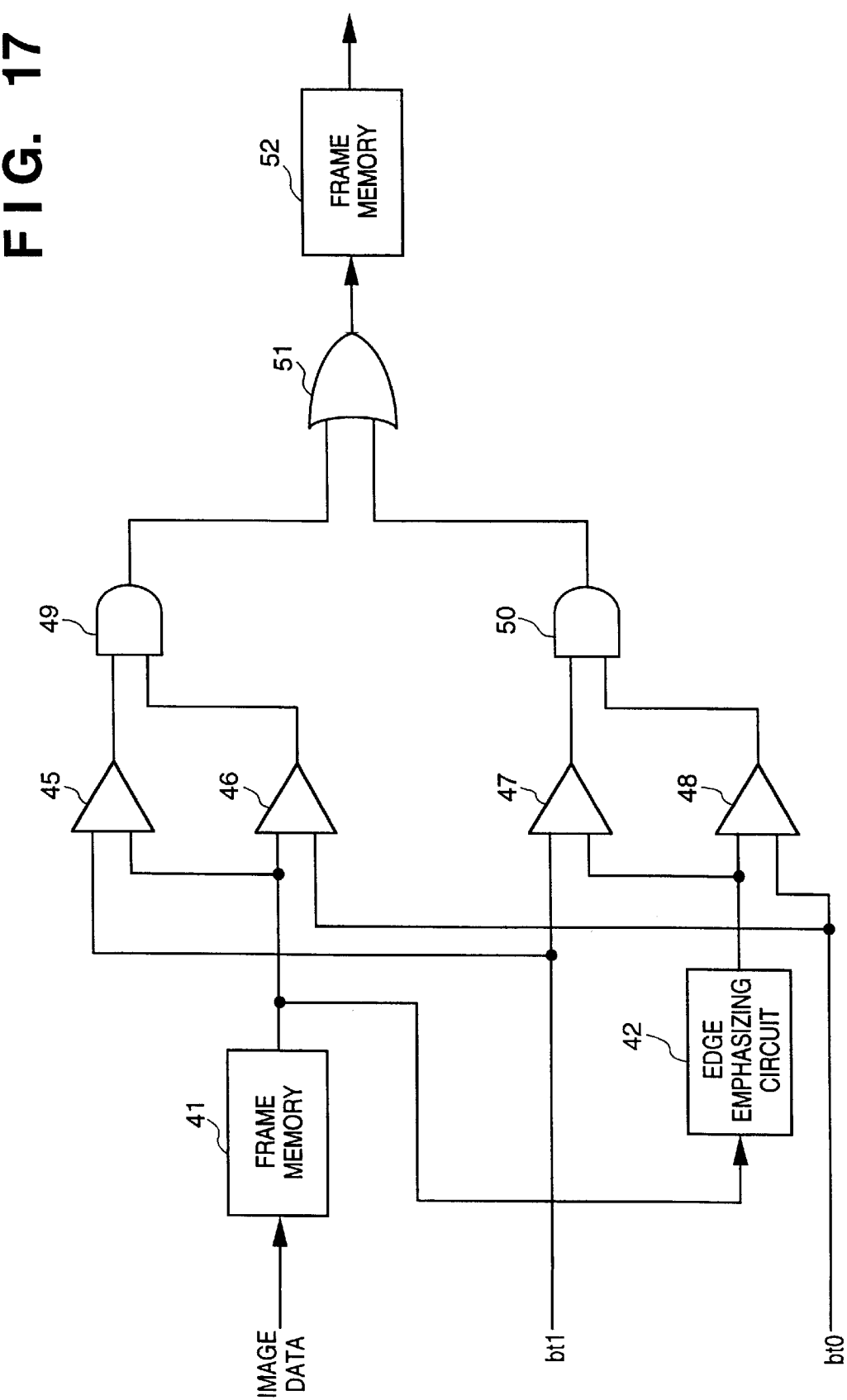
FIG. 17 is a block diagram showing the architecture of an adaptive quantizer according to a fourth embodiment of the present invention.

FIG. 17 is a block diagram showing the architecture of the adaptive quantizer 6 according to the fourth embodiment.

As shown in FIG. 17, the adaptive quantizer 6 includes a frame memory 41 for storing the input image, and an edge emphasizing circuit 42 for correcting the edge of an image. More specifically, the edge emphasizing circuit 42 performs edge emphasis based upon a pixel of interest and its neighboring pixels read out of the frame memory 41. If we let D' represent a pixel obtained by subjecting the pixel of interest D to edge emphasis processing, edge emphasis may be expressed by the following equation, by way of example:

$$D'=D+(4D-A1-A2-A3-A4) \qquad (3)$$

where $D=X(i,j)$
$A1=X(i-1,j-1)$
$A2=X(i+1,j-1)$
$A3=X(i-1,j+1)$
$A4=X(i+1,j+1)$
i,j: coordinate values The comparator 45 compares the pixel of interest D which has entered from the frame memory 41 with the upper-limit value bt1 of the background candidate which has entered from the background discriminator 5, outputs "1" if bt1>D holds and "0" otherwise. The comparator 46 compares the entered pixel of interest D with the lower-limit value bt0 of the background candidate, outputs "1" if D>bt0 holds and "0" otherwise. A comparator 47 compares the result D' of edge emphasis applied to the pixel of interest and entered from the edge emphasizing circuit 42 with the upper-limit value bt1 of the background candidate, outputs "1" if bt1>D' holds and "0" otherwise. A comparator 48 compares the result D' of edge emphasis with the lower-limit value bt0 of the background candidate, outputs "1" if D'>bt0 holds and "0" otherwise. The outputs of the comparators 45, 46 are applied to an AND gate 49, the outputs of the comparators 47, 48 are applied to an AND gate 50, the outputs of the AND gates 49, 50 are applied to an OR gate 51, and the output of the OR gate 51 is stored in the frame memory 52.

The operation of the adaptive quantizer 6 will now be described.

When processing by the background discriminator 5 ends, the CPU 3 reads image data out of the frame memory 21 of background discriminator 5 successively and stores the data in the frame memory 41. When one frame of image data has been stored, the CPU reads out pixels of interest successively and causes the comparators 45 and 46 to perform the above-mentioned comparison operations. The AND between the outputs of the two comparators 45, 46 is obtained by the AND gate 49. The output of the AND gate 49 is "1" if the pixel of interest D is between the upper-limit value bt1 of the background candidate and the lower-limit value bt0 of the background candidate and "0" otherwise.

The edge emphasizing circuit 42 applies the operation indicated by Equation (3) to the entered pixel of interest D and four neighboring pixels A1~A4 and outputs the result D' of edge emphasis. The result D' is entered into the comparators 47, 48, which compare D' with the upper-limit value bt1 of the background candidate and lower-limit value bt0 of the background candidate, respectively. The AND between the outputs of the two comparators 47, 48 is obtained by the AND gate 50, the output of which is "1" if pixel D' after edge emphasis is between the upper-limit value bt1 of the background candidate and the lower-limit value bt0 of the background candidate. Otherwise, the output of the AND gate 50 is "0".

The OR gate 51 obtains the OR between the outputs of the AND gates 49 and 50. More specifically, the OR gate 51 outputs data "1" if the pixel of interest D is bracketed by the lower-limit value bt0 of the background candidate and upper-limit value bt1 of the background candidate or if the result D' of edge emphasis is bracketed by bt0 and bt1. This result is stored in the frame memory 52. Accordingly, the bi-level image of the background represented by data "1" is stored in the frame memory 52.

Thus, according to this embodiment, background is discriminated based upon the frequency distribution of pixel values in an input image to be coded, the background is extracted and it is determined whether the background is solid background or patterned background, just as in the first embodiment. If the background of the input image is solid background, then, according to the fourth embodiment, a bi-level image is formed from the input image and the edge-emphasized input image based upon the density of the extracted background, areas such as character/line-drawing areas and photographic areas are separated from the bi-level image and image data in these separated areas are coded using a coding method suited to the area. If the background of the input image is patterned, the entire image is coded by multivalued-image coding without partitioning the image into areas, as set forth in the first embodiment. In accordance with this embodiment, therefore, the following effects can be obtained in addition to those provided by the first embodiment:

(1) A bi-level image is formed from the input image and the edge-corrected input image based upon the density of the extracted background, and the bi-level image is separated into areas. As a result, even low-contrast characters/line drawings and outline characters can be separated correctly. Moreover, even if the edges of characters, line drawings or the like are indistinct at the start, erroneous discrimination when areas are separated can be prevented without causing thickening in the images obtained by binarizing these edges.

Thus, an input image and an input image that has been subjected to an edge correction are each binarized and areas are extracted utilizing a bi-level image which combines the results of these binarizing operations. The method of extracting areas according to this embodiment of the invention makes it possible to discriminate areas with a high degree of precision and to extract character/line-drawing areas even in images that have undergone a negative/positive reversal.

Fifth Embodiment

An image processing apparatus according to a second embodiment of the present invention will now be described. In the fifth embodiment, only the architecture and operation of the adaptive quantizer 6 differ from those of the second and fourth embodiments. Accordingly, in the description below, only the adaptive quantizer 6 will be described. Elements in the fifth embodiment identical with those of the second and fourth embodiments are designated by like reference characters and need not be described again.

Figure 18:
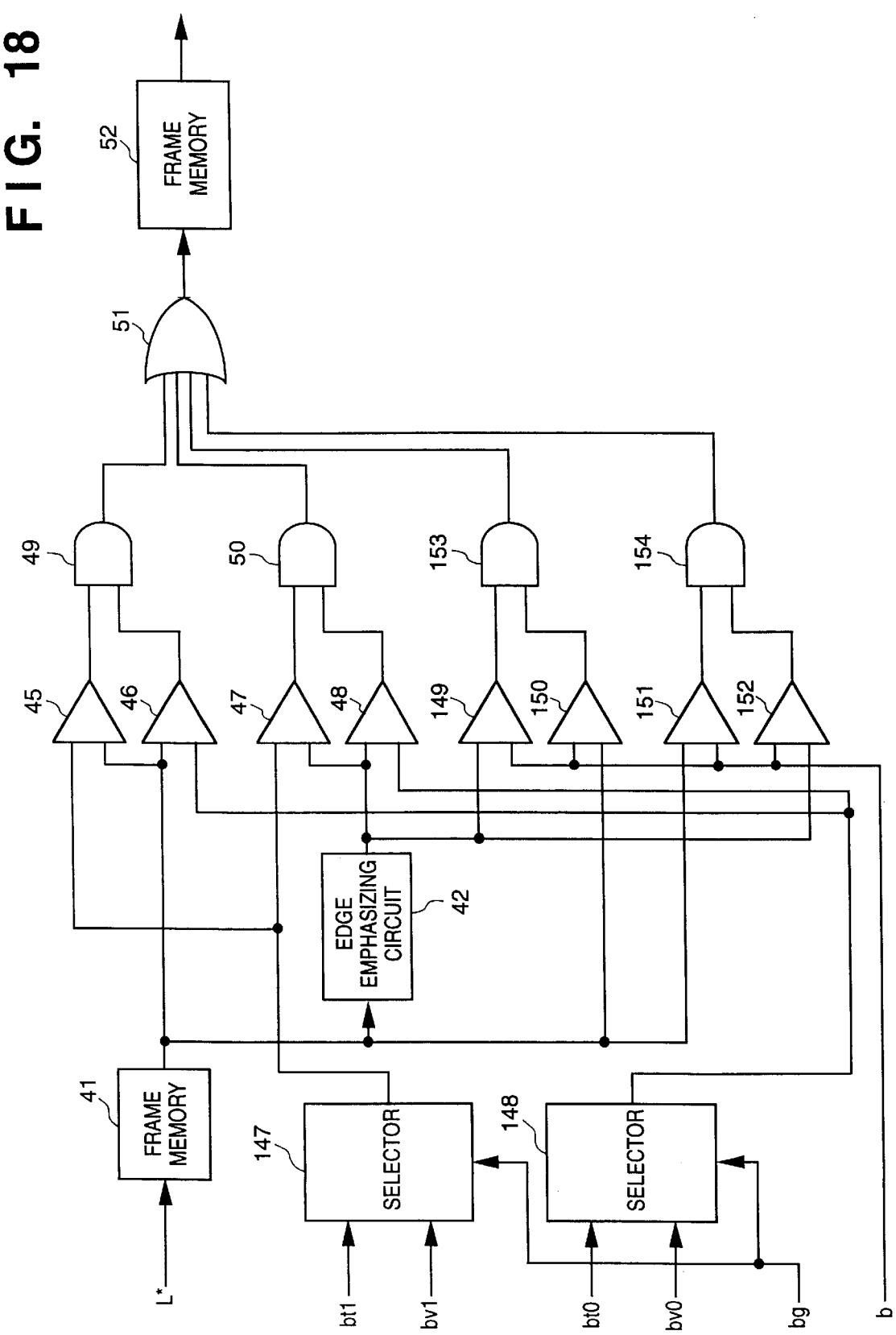
FIG. 18 is a block diagram showing the architecture of an adaptive quantizer according to a fifth embodiment of the present invention.

FIG. 18 is a block diagram showing the architecture of the adaptive quantizer 6 according to the fourth embodiment.

The adaptive quantizer 6 includes the selectors 147 and 148 for selecting and outputting inputs in accordance with the background discriminating flag bg. The selector 148 selects either the first or second lower-limit value of the background candidate and enters the selected lower-limit value of the background candidate into the comparators 46 and 48. The selector 147 selects either the first or second upper-limit value of the background candidate and enters the selected upper-limit value of the background candidate into the selector comparators 45 and 47.

The adaptive quantizer 6 further includes comparators 149~152. The comparator 149 compares the background-candidate value b with the edge-emphasized pixel value outputted by the edge emphasizing circuit 42, produces a "1" output if the edge-emphasized pixel value is greater than the background-candidate value b and produces a "0" output at all other times. The comparator 150 compares the background-candidate value b with the pixel value outputted by the frame memory 41, produces a "1" output if the background-candidate value b is greater than the pixel value and produces a "0" output at all other times. The comparator 151 compares the background-candidate value b with the pixel value outputted by the frame memory 41, produces a "1" output if the pixel value is greater than the background-candidate value b and produces a "0" output at all other times. The comparator 152 compares the background-candidate value b with the edge-emphasized pixel value, produces a "1" output if the background-candidate value b is greater than the edge-emphasized pixel value and produces a "0" output at all other times. An AND gate 153 takes the AND between the outputs of the comparators 149 and 150, an AND gate 154 takes the AND between the outputs of the comparators 151 and 152, and the OR gate 51 obtains the OR of the outputs from the AND gates 49, 50, 153 and 154.

The operation of the adaptive quantizer 6 will now be described mainly with regard to the features that distinguish it from that of the second and fourth embodiments.

When processing by the background discriminator 5 ends, the CPU 3 reads L* image data out of the frame memory 123 of background discriminator 5 successively and stores the data in the frame memory 41. When one frame of image data has been stored, the CPU 3 reads out pixels of interest successively and causes the comparators 45~48 and 149~152 to perform the above-mentioned comparison operations. The ANDs between the outputs of comparators 45, 46, comparators 47, 48, comparators 149, 150 and comparators 151, 152 are obtained by the AND gates 49, 50, 153 and 154, respectively, the OR of the outputs from these AND gates is obtained by the OR gate 51, and the output of the OR gate 51 is written in the frame memory 52.

When the background discrimination flag bg is "1" (which represents solid background), the selector 147 selects the first upper-limit value bt1 of the background candidate and the selector 148 selects the first lower-limit value bt0 of the background candidate. The operations of the comparators 45~48 are as described in the first embodiment. That is, if the pixel of interest D is between the first upper-limit value bt1 of the background candidate and the first lower-limit value bt0 of the background candidate, the output of the AND gate 49 is "1"; otherwise, the output of the AND gate 49 is "0". If the edge-emphasized pixel D' is between the upper-limit value bt1 of the background candidate and the lower-limit value bt0 of the background candidate, the output of the AND gate 50 is "1"; otherwise, the output is "0".

When the background discrimination flag bg is "0" (which represents patterned background), the selector 147 selects the second upper-limit value bv1 of the background candidate and the selector 148 selects the second lower-limit value bv0 of the background candidate. If the pixel of interest D is between the second upper-limit value bv1 of the background candidate and the second lower-limit value bv0 of the background candidate, the output of the AND gate 49 is "1"; otherwise, the output of the AND gate 49 is "0". If the edge-emphasized pixel D' is between the second upper-limit value bv1 of the background candidate and the second lower-limit value bv0 of the background candidate, the output of the AND gate 50 is "1"; otherwise, the output is "0".

Further, if the background-candidate value b is between the pixel of interest D and the edge-emphasized pixel D', the outputs of the AND gates 153, 154 are "1"; otherwise, the outputs of these AND gates are "0".

More specifically, the OR gate 51 outputs data "1" with regard to pixels bracketed by the upper-limit and lower-limit values of the background candidates and with regard to pixels for which the values before and after edge emphasis bracket the background-candidate value b. Accordingly, a bi-level image whose background is represented by data "1" is stored in the frame memory 52. In case of a patterned background, however, it is more difficult for a definite difference in frequency to be produced than in the case of solid background. When the minimum value is used, however, extraction of background can be carried out in optimum fashion even if the background is patterned.

In accordance with this embodiment, effects similar to those of the fourth embodiment can be obtained. Moreover, two sets of lower-limit values and upper-limit values of background densities are set. As a result, even if the background of an input image exhibits a pattern, the areas of the image can be discriminated precisely and coding suited to the characteristics of each separated area can be applied to each area.

Furthermore, in a case where pixel values bracketing a background-candidate value (background density) are corrected by edge emphasizing processing, e.g., in a case where an input pixel value is greater than the upper-limit value of a background candidate and the pixel value after edge emphasis is less than the lower-limit value of the background candidate, the input image can be binarized appropriately.

Modifications of First through Fifth Embodiments

In each embodiment set forth above, examples are described in which the image processor of this invention is applied to an image transmission apparatus for coding an input image and sending the coded image to a communication line. However, this does not impose a limitation upon the invention. The invention can also be applied to an image storage device in which a coded input image is stored on a storage medium such as a hard disk, optical disk, magneto-optical disk or CD-ROM, etc.

Further, the image space and number of bits in images to be coded according to present invention are not limited to those set forth in the foregoing embodiments. For example, any bit depth such as four bits or five bits may be adopted in each of such image spaces CIE1976 L*a*b*, YMCK, HSL, etc.

Further, adaptive quantization is not limited to binarization. Adaptive quantization into three levels also is possible.

Further, the coding methods are not limited to the foregoing embodiments. Coding such as MH (modified Huffman) coding may be used to obtain a bi-level image and fractal or vector quantization may be adopted to code a multivalued image.

Further, the foregoing embodiments make joint use of the background density width w and background occupancy s to detect the state of background. However, either one of these may be used.

In accordance with each of the foregoing embodiments, an image is entered, the state of the background of the input image is discriminated, the input image is subjected to optimum quantization based upon the state of the background, and area discrimination is carried out based upon the results of quantization. As a result, a plurality of coding means for performing coding that is best suited to the characteristics of the image are changed over accurately in accordance with the results from the area discriminating means. This makes possible highly efficient coding of images while the quality thereof is maintained.

Further, a pixel forming a flat portion is extracted from an image and the state of the background of the image is judged from the frequency distribution. This makes it possible to readily determine whether the background can be coded efficiently by bi-level image coding.

Further, by discriminating the background of an image from the frequency distribution of extracted background pixels, a wide view of the image can be taken of the image and areas to undergo bi-level image coding can be readily discriminated. At the same time, by using dynamic arithmetic coding, the area of the image can be enlarged. As a result, a better convergence rate is obtained.

In a case where image background is solid, quantization which takes background density into account is performed in order to extract the background density and discriminate areas to good effect. Therefore, by performing area discrimination based upon the results of area discrimination, information useful for image area separation can be provided.

Figure 8A:
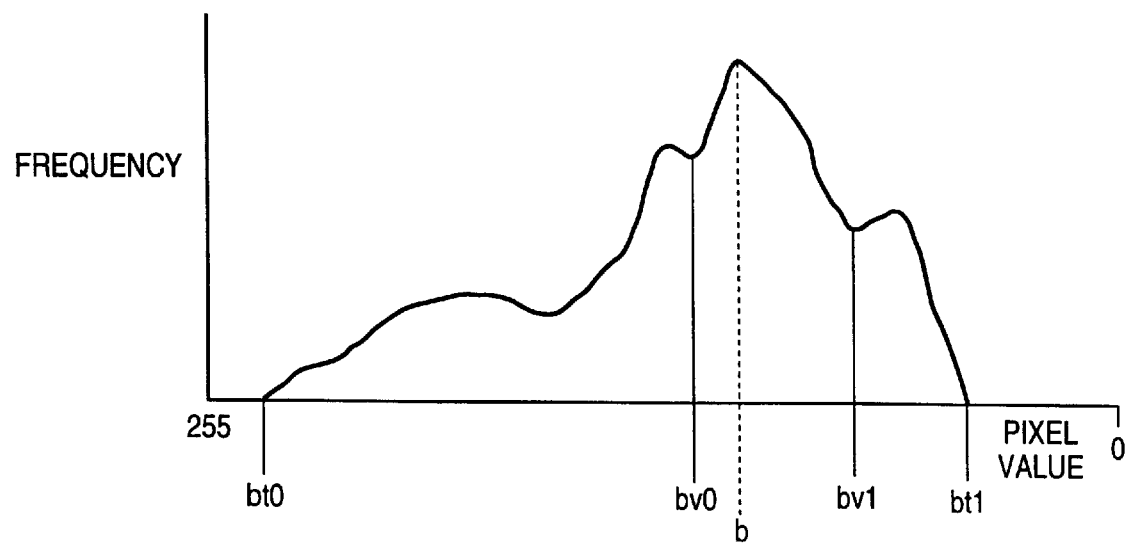
FIGS. 8A and 8B are diagrams for describing a method-of extracting a density width having the maximum frequency of occurrence.
Figure 8B:
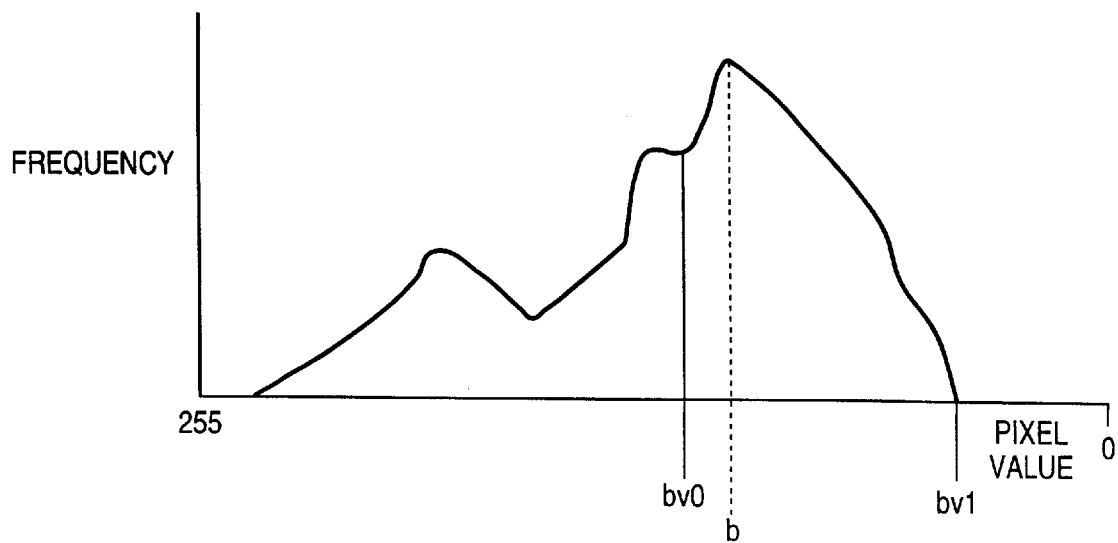

Further, if image background is patterned, quantization is carried out in such a manner that area discrimination can be performed. Area discrimination can be carried out even in a case where the distribution of pixel values is as shown in FIGS. 8A or FIG. 8B.

Further, using smoothing means makes it possible to efficiently extract pixels forming flat portions from an image while eliminating noise.

Further, areas can be subdivided by repeating the partitioning of the areas. This provides even higher coding efficiency and improves image quality.

Thus, a deterioration in high-frequency areas in character or line-drawing areas can be suppressed and it is possible to improve the quality of decoded images.

Sixth Embodiment

Figure 19:
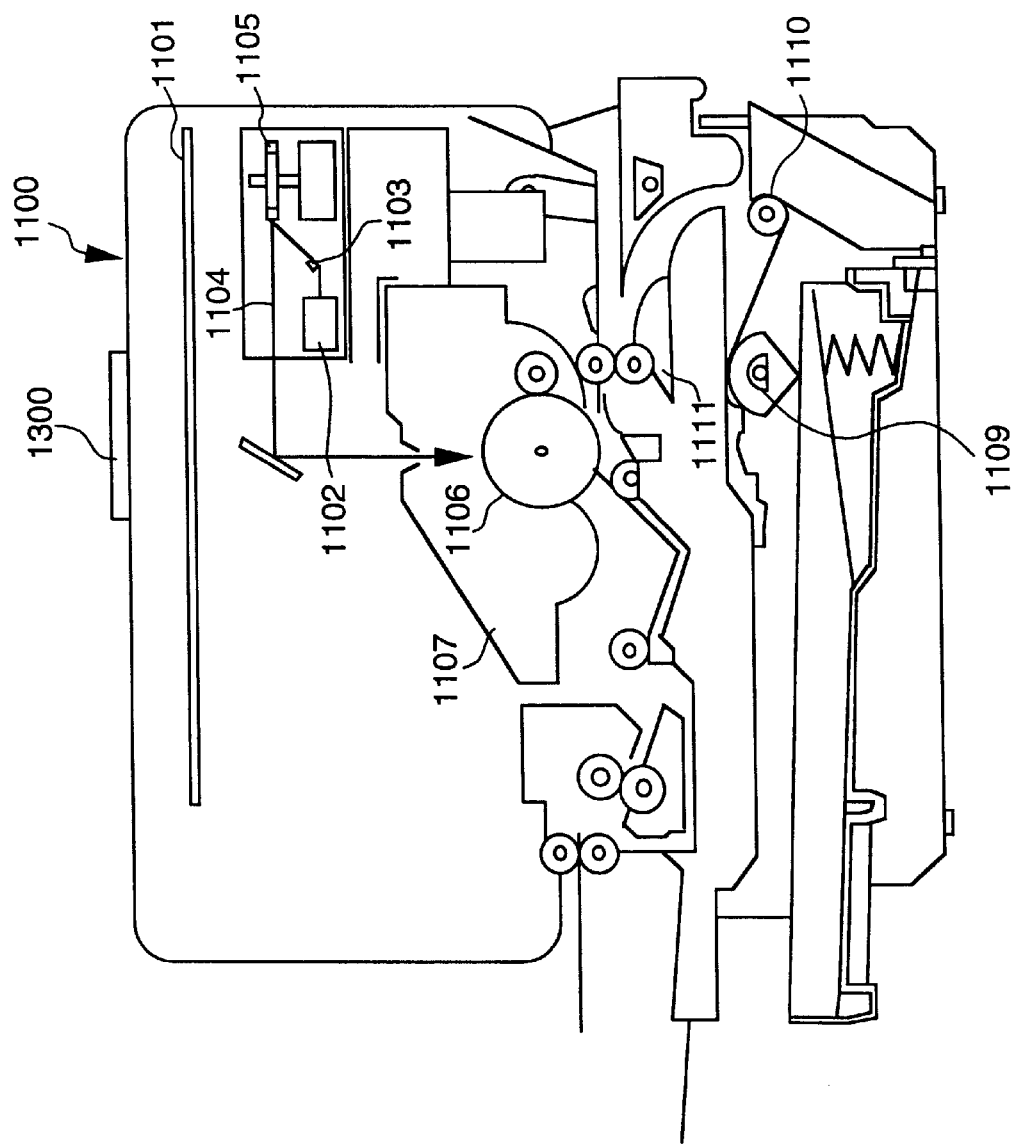
FIG. 19 is a sectional view showing the internal structure of a laser-beam printer according to a sixth embodiment of the present invention.

An example in which the image processor of the present invention is applied to an image forming apparatus will be described as a sixth embodiment of the invention.
[Architecture]
FIG. 19 is a sectional view showing the internal structure of a laser-beam printer (LBP) 1100 according to the sixth embodiment of the present invention. The LBP 1100 is so adapted as to record character patterns from a data source (host computer or the like), not shown, or standard forms (form data).

As shown in FIG. 19, printer has a main body 1100. Character information (character codes), form information or macro instructions, etc., supplied by an externally connected host computer are entered and stored, character patterns or form patterns are created in accordance with this information and the resulting images are stored on recording paper serving as the recording medium.

A control panel 1300 is provided with various switches and LED indicators. A printer control unit 1101 exercises overall control of the LBP 1100 and analyzes character information provided by the host computer. The printer control unit 1101 primarily converts character information to a video signal of the corresponding character pattern and outputs the video signal to a laser driver 1102. In addition, the printer control unit 1101 subjects entered image data to various image processing.

The laser driver 1102, which is a circuit for driving a semiconductor laser element 1103, turns the emission from the laser element 1103 on and off in dependence upon the entered video signal. A laser light beam 1104 produced by the laser element 1103 is swept to the left and right by a rotating polygonal mirror 1105 so as to scan a electrostatic drum 1106. As a result, an electrostatic latent image of a character pattern is formed on the electrostatic drum 1106.

The latent image is developed by a developing unit 1107 surrounding the electrostatic drum 1106, after which the developed image is transferred to recording paper. Cut sheets are used as the recording paper and are stored in a paper cassette that has been loaded in the LBP 1100. The recording paper is fed into the apparatus by a feed roller 1109 and conveyance rollers 1110, 1111 so as to be supplied to the electrostatic drum 1106.

This embodiment is characterized in that appropriate background recognition processing is capable of being performed in the printer control unit 1101. By executing appropriate background recognition processing, various subsequent image processing such as binarization can be executed in proper fashion in conformity with the background.

Figure 20:
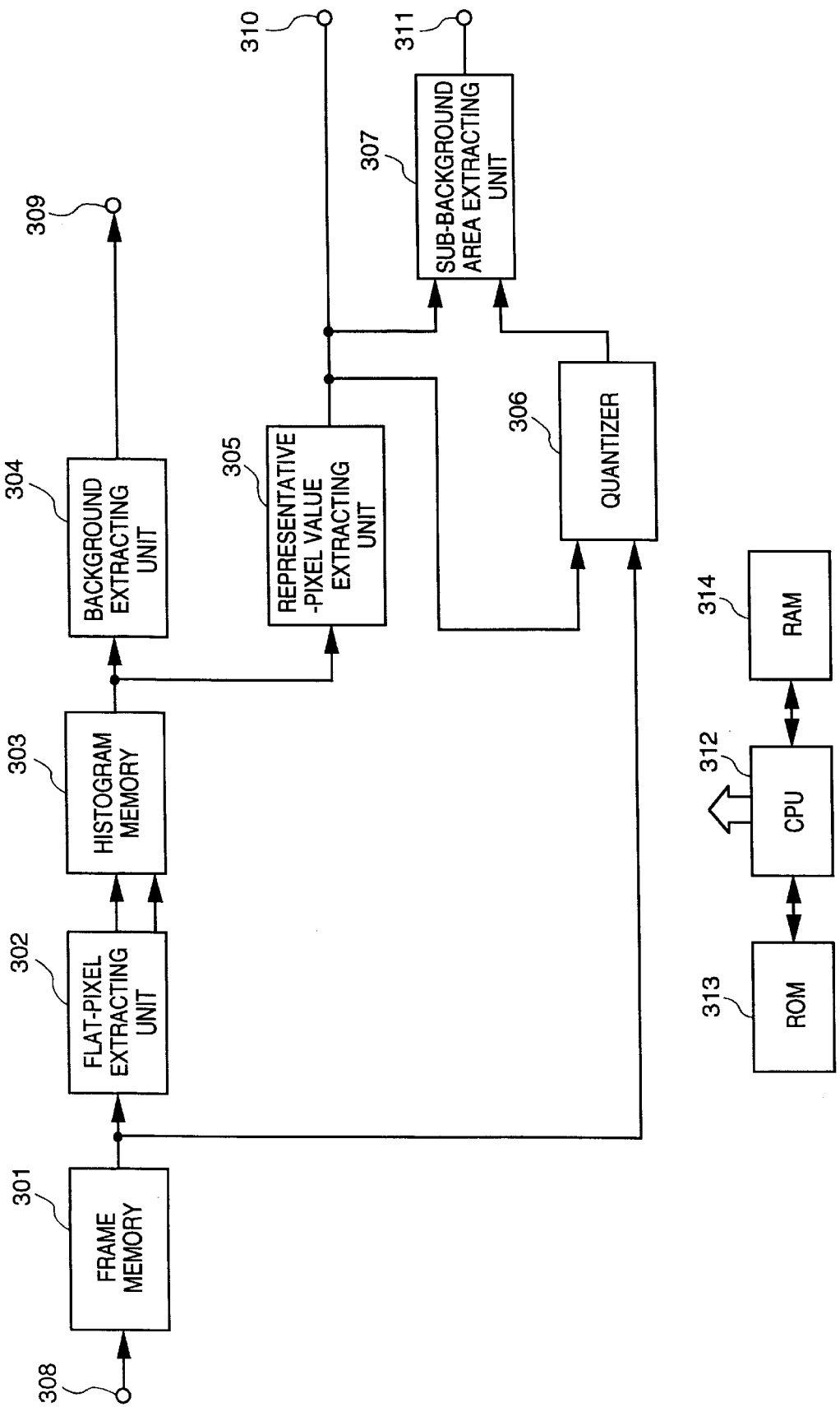
FIG. 20 is a block diagram showing an arrangement for executing background recognition processing according to this embodiment.

FIG. 20 illustrates an arrangement for executing background recognition processing in the printer control unit 1101.

As shown in FIG. 20, the arrangement includes a frame memory 301 for storing one frame of entered image data, a flat-pixel extracting unit 302 for extracting flat pixels, and a histogram memory 303 for storing a histogram. The histogram memory 303 has a write mode and a read mode. In the write mode, an entered value serves as an address and the data indicated by the address are incremented. In the read mode, the data indicated by the address are outputted.

A background extracting unit 304 reads the histogram out of the histogram memory 303, extracts background information and outputs this information. A representative-pixel extracting unit 305 reads the histogram out of the histogram memory 303, extracts information representing a representative-pixel value and outputs this information. A quantizer 306 quantizes entered image data based upon each representative pixel value. A sub-background area extracting unit 307 extracts information representing sub-background areas from image data quantized by the quantizer 306.

A terminal 308 is for entering image data. For example, the terminal 308 may be connected to a scanner or the like for entering image data read in by the scanner. A terminal 309 is for outputting background information, a terminal 310 is for outputting a representative-pixel value, and a terminal 311 is for outputting coordinates of a sub-background area and information relating to noise or the like.

A CPU 312 performs overall control of the components mentioned above. A ROM 313 stores an operation program (for processing indicated by the flowchart of FIG. 21, described below) executed by the CPU 312, and a RAM 314 is used as the working area of the CPU 312.

In order to simplify the description below, it will be assumed that image data entered from the terminal 308 is multivalued monochromatic image data in which one pixel is expressed by eight bits. (Specifically, a pixel can take on any value of 0 to 255, in which black is represented by 0).

[Background Recognition Processing]

Background recognition processing according to this embodiment will be described in detail with reference to the flowchart of FIG. 21.

Figure 21:
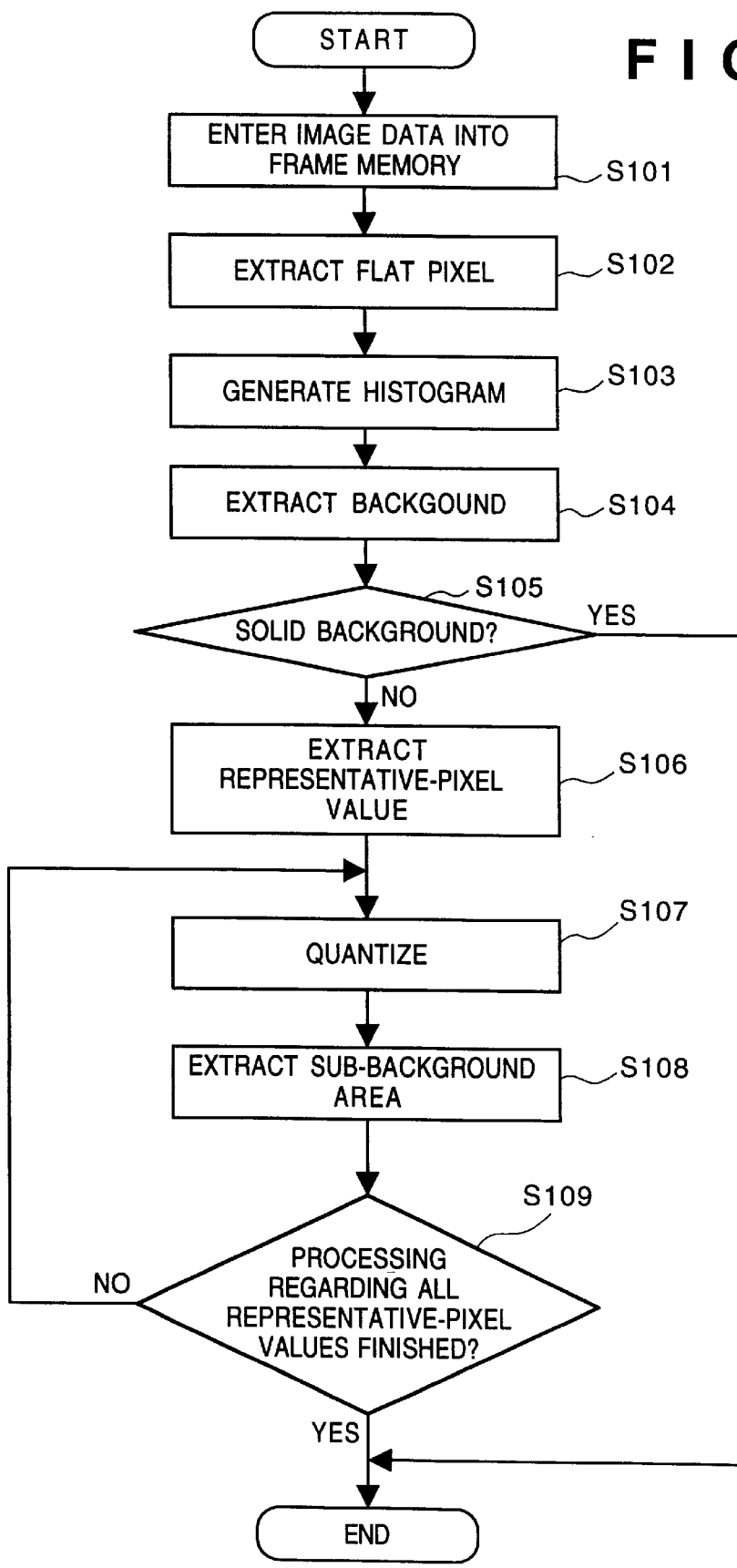
FIG. 21 is a flowchart showing background recognition processing according to this embodiment.

Image data entered from the terminal 308 is stored in the frame memory 301 at step S101 in FIG. 21. If one frame of image data has been stored in the frame memory 301, the CPU 312 clears the histogram memory 303 to zero and resets the other components of the apparatus. Furthermore, the histogram memory 303 is set to the write mode.

Pixel values are read in the flat-pixel extracting unit 302 from the frame memory 301 in order in the horizontal scanning direction at step S102. The flat-pixel extracting unit 302 determines whether a pixel that has been read in is a pixel forming a flat portion of the image. If the pixel is judged to be a flat pixel, the value of the pixel is outputted to generate a histogram in the histogram memory 303 (step S103).

Flat-pixel Extracting Unit

Figure 22:
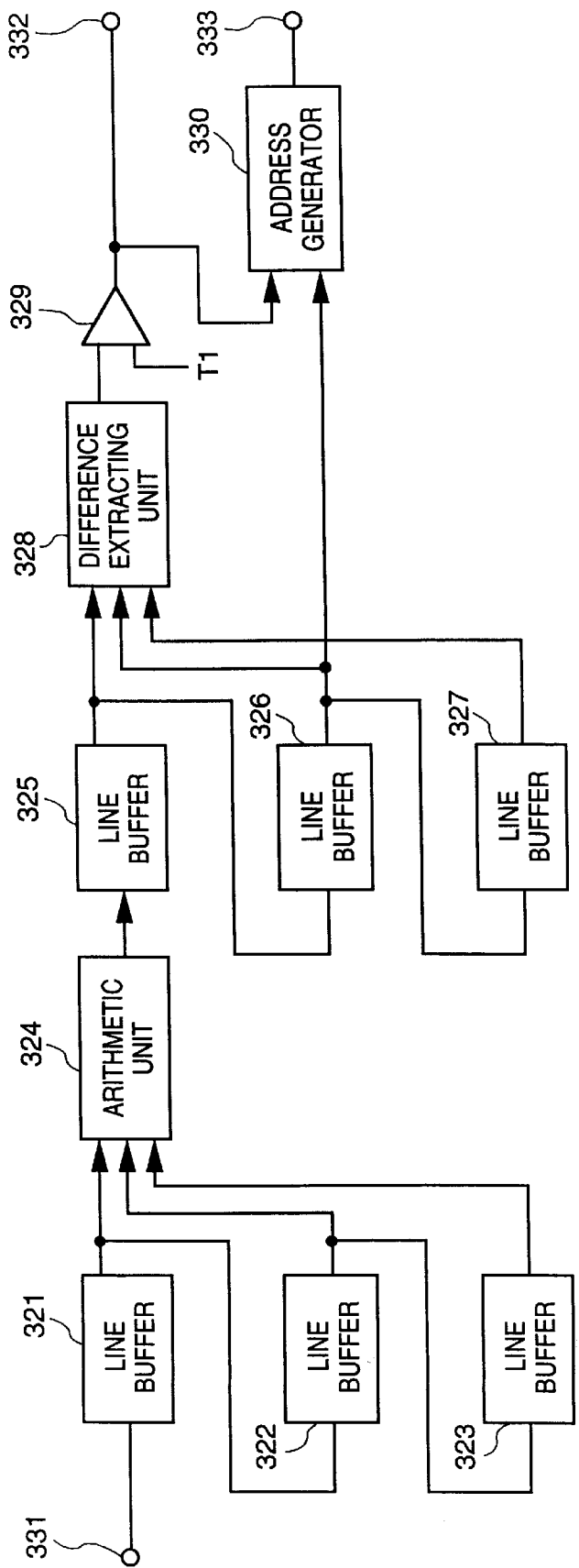
FIG. 22 is a block diagram showing the detailed architecture of a flat-pixel extracting unit depicted in FIG. 20.

FIG. 22 is a block diagram showing the detailed architecture of the flat-pixel extracting unit 302.

As shown in FIG. 22, the flat-pixel extracting unit 302 includes line buffers 321~323, which construct a FIFO memory, an arithmetic unit 324 for reading the values of pixels neighboring a pixel of interest out of the line buffers 321~323 and obtaining a mean value, line buffers 325~327 constructing a FIFO memory, and a difference extracting unit 328 for reading the mean values of pixels neighboring a pixel of interest out of the line buffers 325~327 and obtaining a difference value between maximum and minimum values of the mean values.

A comparator 329 compares an input value from the difference extracting unit 328 with a predetermined threshold value T1, outputs "1" if the input value is greater than the threshold value T1 and outputs "0" otherwise. An address generator 330 generates the address of the histogram memory 303, which is the next stage. A terminal 331 enters pixel values successively in the horizontal scanning direction, a terminal 332 delivers the output of the comparator 329 to the histogram memory 303, and a terminal 333 outputs the address to the histogram memory 303.

In the flat-pixel extracting unit 302 shown in FIG. 22, pixel values that have entered from the terminal 331 are applied to the line buffer 321. Three lines of pixel values are stored by the line buffers 321~323. By virtue of the line buffers 321~323, a block of 3×3 pixels of a mean value centered on the pixel of interest can be formed. These values enter the arithmetic unit 324 successively and the arithmetic unit 324 proceeds to obtain the mean value of the pixels in the block. The mean value obtained enters the line buffer 325. Three lines of mean values are stored by the line buffers 325~327. These line buffers form a block of 3×3 pixels of mean values centered on the pixel of interest. These values enter the difference extracting unit 328 successively.

Of the mean values in the 3×3 pixel block, the difference extracting unit 328 extracts the maximum and minimum values and finds the difference between them. The difference value obtained enters the comparator 329, which compares this value with the threshold value T1. The mean value of the pixel of interest enters the address generator 330. The latter generates the address of the histogram memory 303 from the mean value of the pixel of interest in line buffer 326 only when the output of the comparator 329 is "0". This address is outputted from the terminal 333. The terminal 332 delivers the output of the comparator 329 to the histogram memory 303.

With reference again to FIG. 20, the output of the comparator 329 and the output of the address generator 330 of FIG. 22 enter the histogram memory 303 in accordance with the timing of the pixels. When the output of the comparator 329 is "0", the histogram memory 303 adds one to the content of the address indicated by the address generator 330 and stores the result. In other words, data are written in the histogram memory 303 only if the difference between the maximum and minimum values in the mean-value block of pixels peripheral to the pixel of interest is less than the predetermined threshold value T1.

Examples of Histograms

Figure 23A:
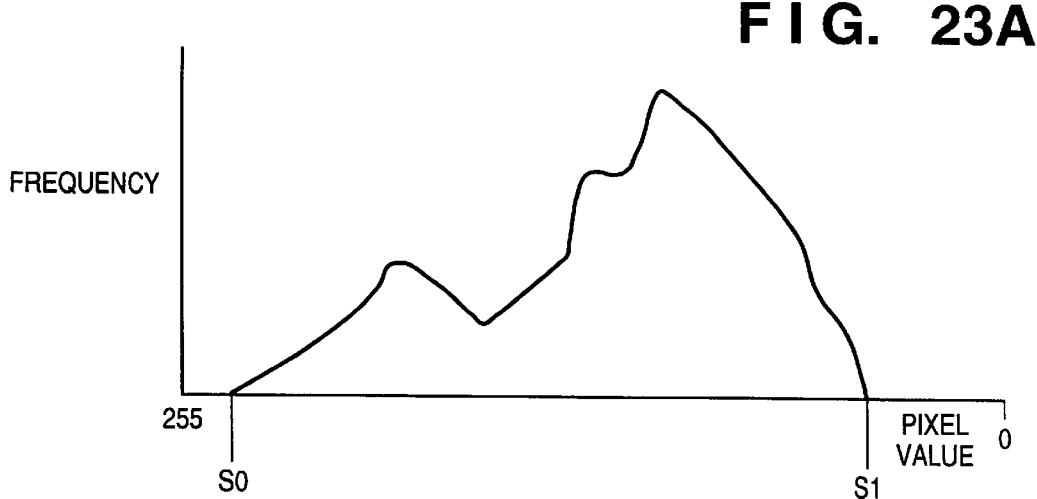
FIGS. 23A through 23C are diagrams showing typical examples of frequency distributions of pixel values.
Figure 23B:
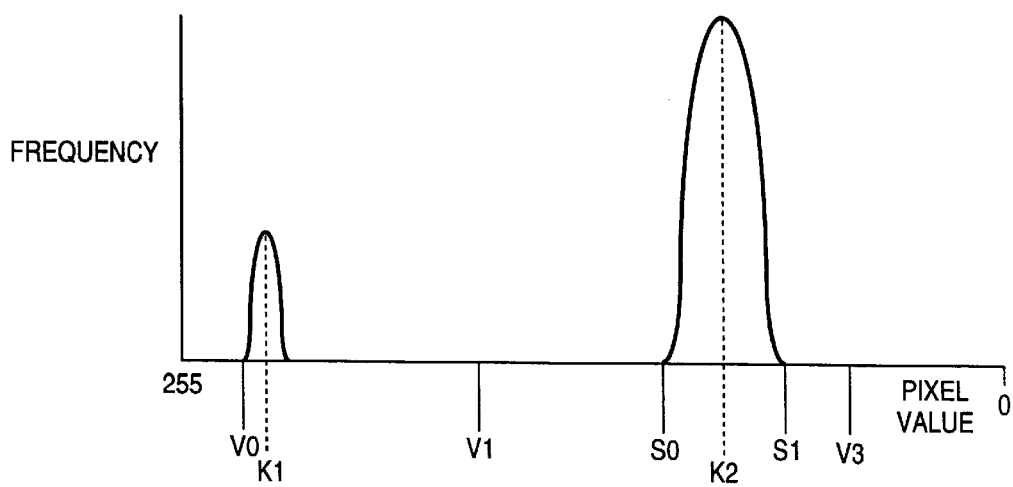
Figure 23C:
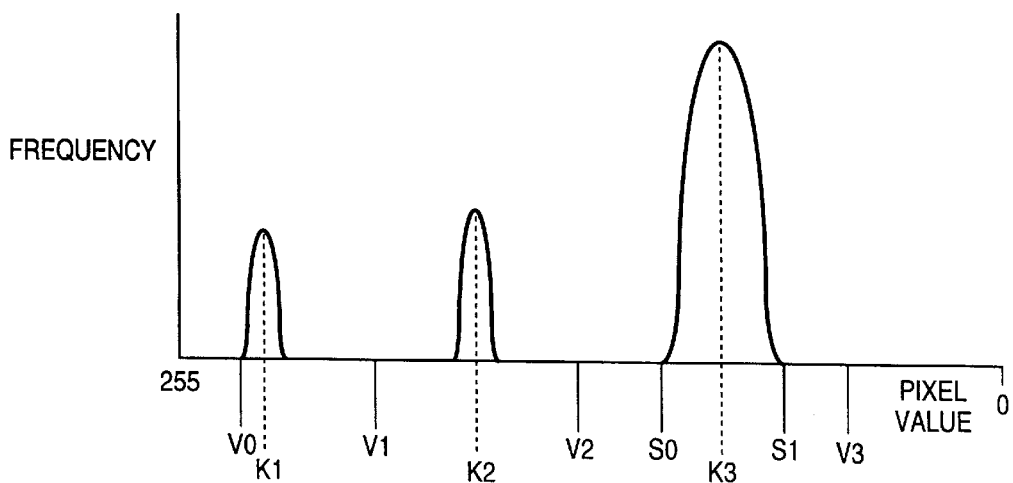

FIGS. 23A through 23C are diagrams showing typical examples of histograms created in this embodiment. FIG. 23A illustrates an example of a histogram of an image the entirety of which has a smooth grayscale, as in the case of a photograph, or of an image whose background exhibits a pattern of some kind. FIG. 23B illustrates an example of a histogram of an image in which a solid background (density K2) has a character or line drawing (density K1). FIG. 23C illustrates an example of a histogram of an image in which a solid background (density K3) has sub-area backgrounds (density K2) of different densities as well as a character or lien drawing (density K1).

Backaround Extracting Unit

When the above-described processing for creating a histogram has ended with regard to all pixels in one frame of image data stored in the frame memory 301, the program proceeds to step S104, at which the CPU 312 actuates the background extracting unit 304.

Figure 24:
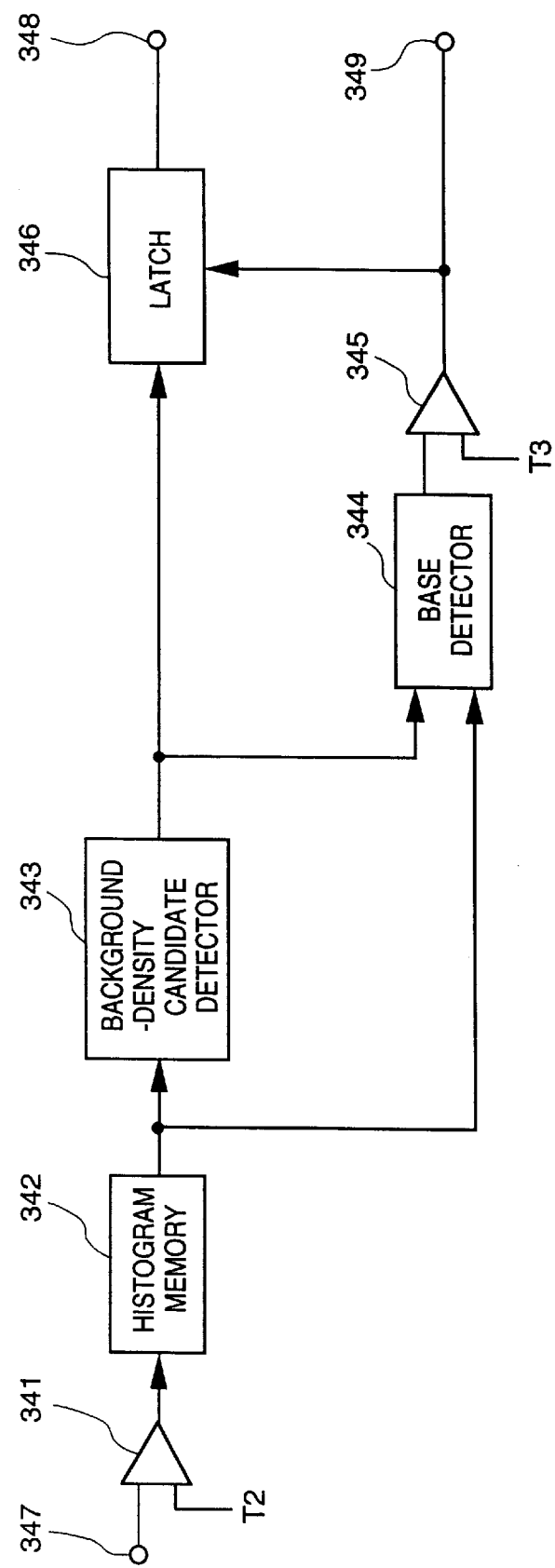
FIG. 24 is a block diagram showing the detailed architecture of a background extracting unit depicted in FIG. 20.

The details of the background extracting unit 304 are illustrated in FIG. 24.

As shown in FIG. 24, the background extracting unit 304 includes a special comparator 341 for comparing an input value with a predetermined threshold value T2. If the input value is greater than the threshold value T2, the comparator 341 outputs the input value as is; otherwise, zero is outputted. A histogram memory 342 stores the histogram outputted by the comparator 341. A background-density candidate detector 343 detects the maximum frequency of occurrence from the histogram stored in the histogram memory 342 and outputs the pixel value (background-density candidate value) that gives this maximum frequency.

From those pixel values for which the frequency of occurrence is zero in the histogram, a base detector 344 extracts two values nearest to the background-density candidate value (one value being less than the background-density candidate value and one value being greater) and obtains the difference between these two values. A comparator 345 compares its input value with a predetermined threshold value T3, outputs "1" if the input value is greater than the threshold value T3 and outputs "0" otherwise. A latch 346 stores the value of the background-density candidate. The data stored in the latch 346 are outputted only when the output of the comparator 345 is "0".

Starting from a pixel value 0, a terminal 347 reads in the corresponding frequency values from the histogram memory 303 in regular order. A terminal 348 outputs the data contained in the latch 346. A terminal 349 delivers the output of the comparator 345.

The corresponding frequency values are read in from the histogram memory 303 via the terminal 347 in regular order starting from pixel value 0, and these frequency values are entered into the comparator 341. The latter compares the frequency values with the predetermined threshold value T2, writes only the frequency values greater than T2 in the histogram memory 342 at the corresponding addresses and writes 0 in the histogram memory 342 in all other cases.

When comparison has been performed with regard to each of the frequency values of all 256 levels and the values have been written in the histogram memory 342 in this manner, the background-density candidate detector 343 goes to the histogram memory 342 to read out a pixel value having the highest frequency as a background-density candidate value and stores this value in the latch 346.

Thereafter, from those pixel values for which the frequency of occurrence is zero in the histogram, the base detector 344 extracts two values nearest to the background-density candidate value (one value being less than the background-density candidate value and one value being greater) and obtains the difference between these two values. For example, in the examples of the histograms shown in FIGS. 23A through 23c, the two values that are closest to the background-density candidate value are S0 and S1. Accordingly, the base detector 344 outputs (S0–S1).

The output of the base detector 344 enters the comparator 345, which compares this signal with the predetermined threshold value T3. The comparator 345 outputs "0" if its input value is less than the threshold value T3. When the output of the comparator 345 is "0", the latch 346 outputs its data from the terminal 348 as background density. The "0" output of the comparator 345, which indicates that the type of background is solid, is delivered from the terminal 349. When the output of the comparator 345 is "1", on the other hand, the data in the latch 346 is not outputted and the terminal 349 delivers logical "1", which indicates that the type of background is not solid and possesses a pattern of some kind. It should be noted that the threshold value T3 is decided by the precision with which the entered image is read. For example, the threshold value T3 is decided based upon a variance value or the like which prevails when the solid image is read.

With reference again to FIG. 20, the signal from the background extracting unit 304 representing the background density and the type of background is delivered from the terminal 309, as mentioned above.

In FIG. 21, the program proceeds to step S105, at which the signal representing the type of background outputted by the background extracting unit 304 is investigated by the CPU 312. The CPU 312 advances the program to step S106 to actuate the representative-pixel extracting unit 305 only when the type of background is solid background (i.e., only when the output of the comparator 345 is "0"). On the hand, when the type of background is not solid but possesses background of some sort (i.e., when the output of the comparator 345 is "1"), the CPU 312 terminates background recognition processing without actuating the representative-pixel extracting unit 305 and, hence, without actuating the quantizer 306 and sub-background area extracting unit 307.

Representative-pixel Extracting Unit

Figure 25:
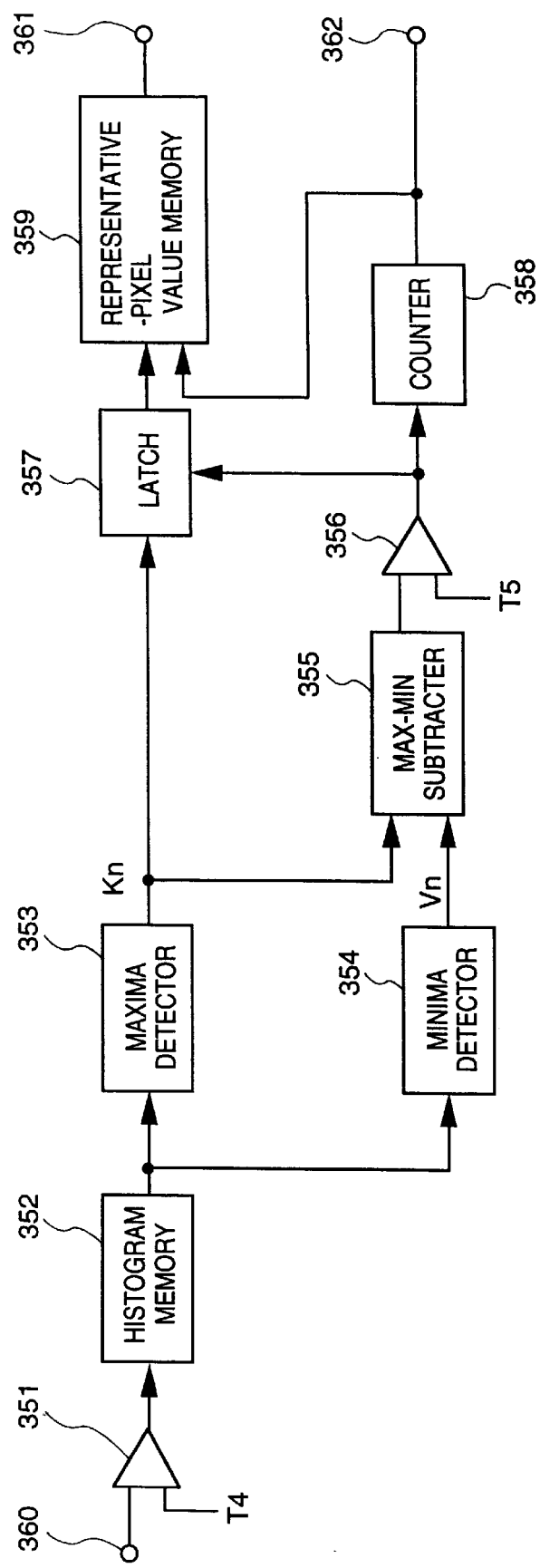
FIG. 25 is a block diagram showing the detailed architecture of a representative-pixel extracting unit depicted in FIG. 20.

FIG. 25 is a block diagram showing the detailed architecture of the representative-pixel extracting unit 305.

As shown in FIG. 25, the representative-pixel extracting unit 305 includes a special comparator 351 for comparing an input value with a predetermined threshold value T4. If the input value is greater than the threshold value T4 the comparator 351 outputs the input value as is; otherwise, zero is outputted. A histogram memory 352 stores the histogram outputted by the comparator 351.

Starting from a pixel value 0, a maxima detector 353 successively reads in corresponding frequency values from the histogram memory 352 in regular order, detects the maxima and successively outputs the maximal values that-are the pixels giving the maxima as well as the values of the frequency of occurrence thereof. Starting the pixel value 0, a minima detector 354 successively reads in corresponding frequency values from the histogram memory 352 in regular order, detects the minima and successively outputs the minimal values that are the pixels giving the minima as well as the values of the frequency of occurrence thereof. For example, in the examples of the histograms shown in FIGS. 23B and 23C, the maximal values are K1, K2 and K3, and the minimal values are V0, V1, V2 and V3.

A max-min subtractor 355 obtains the frequency difference between maxima and minima. More specifically, with regard to the frequency value at each maxima, the max-min subtractor 355 obtains the difference between this frequency value and the frequency values at the minima on either side of it and outputs the difference that is largest. A comparator 356 compares its input with a predetermined threshold value T5, outputs "1" if the input value is greater than the threshold value T5 and outputs "0" in all other cases.

A latch 357 stores the maximal value outputted by the maxima detector 353 and outputs its data only when the output of the comparator 356 is "1". A counter 358 is incremented whenever the output of the comparator 356 is "1". A representative-pixel memory 359 stores the value (a representative-pixel value) outputted by the latch 357.

Starting from a pixel value 0, a terminal 360 reads in the corresponding frequency values from the histogram memory 303 in regular order. A terminal 359 outputs the data contained in the representative-pixel memory 359. A terminal 362 delivers the count recorded in the counter 358.

The counter 358 in the representative-pixel extracting unit 305 is cleared to zero by the CPU 312 before operation starts. The corresponding frequency values are read in from the histogram memory 303 via the terminal 360 in regular order starting from pixel value 0, and these frequency values are entered into the comparator 351. The latter compares the frequency values with the predetermined threshold value T4, writes only the frequency values greater than T4 in the histogram memory 352 at the corresponding addresses and writes 0 in the histogram memory 352 in all other cases.

When comparison has been performed with regard to each of the frequency values of all 256 levels and the values have been written in the histogram memory 352 in this manner, the maxima detector 353 and the minima detector 354 go to the histogram memory 352 to read in, starting from pixel value 0, the corresponding frequency values in regular order and successively obtain maximal values Kn and minimal values Vn.

In the description that follows, it is assumed that H(x) indicates a frequency value at a pixel value x. A frequency value H(Kn) at a maxima obtained by the maxima detector 353 also is latched by the latch 357.

When, with regard to a certain maximal value Kn, the next maximal value Vn+1 has been obtained, the max-min subtractor 355 finds the differences [H(Kn)–H(Vn) and H(Kn)–H(Vn+1)] and outputs the larger different to the comparator 356. The latter compares this difference value with the predetermined threshold value T5 and outputs "1" if the input value is larger. The counter 358 is incremented when the comparator 356 produces a "1" output. With the count from the counter 358 serving as an address, the data latched by the latch 357 is written in the representative-pixel memory 359.

Accordingly, the maximal values K1, K2, K3 in FIGS. 23B and 23C, for example, are stored in the representative-pixel memory 359. The data in the representative-pixel memory 359 can be read out from the terminal 361 and the count (the number P of representative-pixel values) in counter 358 can be read out from terminal 362. It is possible to read these values out of the terminal 311 at the same time that they are entered into the quantizer 306 and sub-background area extracting unit 307 shown in FIG. 20.

When a representative-pixel value has thus been obtained, the program proceeds to step S107. The CPU 312 actuates the quantizer 306 and sub-background area extracting unit 307 for each representative-pixel value Qi (i=1~P) obtained (steps S107, S108).

At step S107, the quantizer 306 reads the representative-pixel value Qi out of the representative-pixel memory 359 shown in FIG. 25, reads out the pixel data from the frame memory 301 and performs quantization by assigning "1" to the value of a pixel whose value is between Qi–α and Qi+α and "0" to the values of all other pixels from among the pixels that have been read in from the frame memory 301. In other words, in FIGS. 23B and 23C, only pixels contained in a range having a width of 2 α centered on each of the maximal values K1, K2, K3 are quantized to "1"; all other pixels are quantized to "0". That is, quantization limits of Qi±α are decided by the typical pixel value Qi.

It should be noted that the width α is a predetermined value. For example, the value is decided based upon a variance value or the like which prevails when an image formed on recording paper having a solid background has been read.

Sub-background Area Extracting Unit

The program proceeds to step S108, at which the quantized image is entered into the sub-background area extracting unit 307. The latter extracts areas (pixel clusters) of continuous pixels for which the result of quantization is "1", extracts the rectangularity of each pixel cluster and determines whether the area is a sub-background area based upon the rectangularity.

Figure 26:
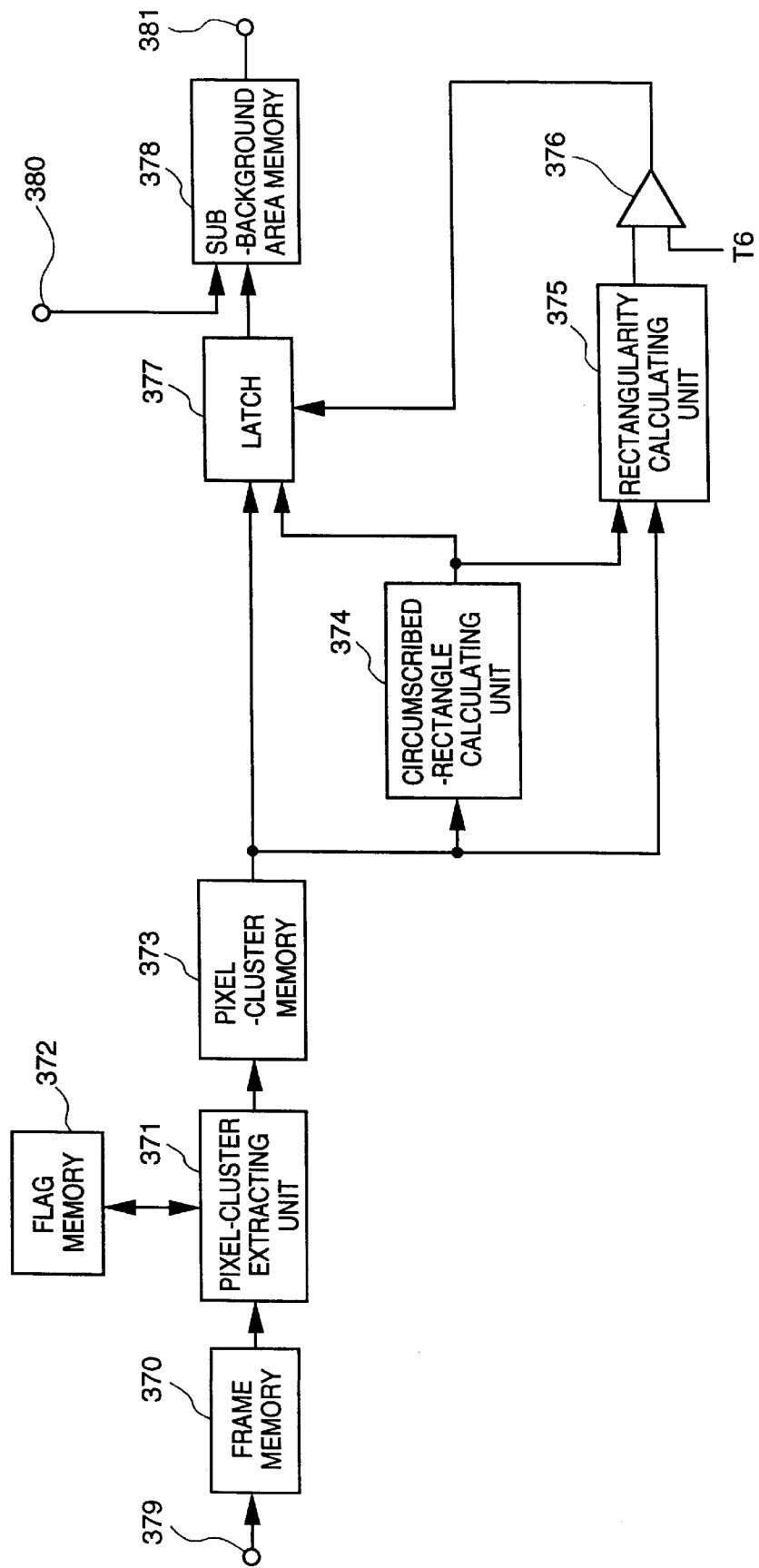
FIG. 26 is a block diagram showing the detailed architecture of a sub-background area extracting unit depicted in FIG. 20.

FIG. 26 is a block diagram showing the detailed architecture of the sub-background area extracting unit 307.

As shown in FIG. 26, the sub-background area extracting unit 307 has a frame memory 370 for storing a quantized image, a pixel-cluster extracting unit 371 for extracting a pixel cluster, a flag memory 372 and a pixel-cluster memory 373 for storing information representing a extracted pixel cluster. The flag memory 372 stores a flag indicating whether each pixel is contained in a pixel cluster. Accordingly, the frame memory 370 and flag memory 372 have identical storage capacities.

A circumscribed-rectangle calculating unit 374 calculates the circumscribed rectangle of a pixel cluster, and a rectangularity calculating unit 375 calculates the rectangularity of a pixel cluster. A comparator 376 compares its input value with a predetermined threshold value T6, outputs "1" if the input value is greater than the threshold value T6, and outputs "0" otherwise. A latch 377 stores coordinate and size information of the circumscribed rectangle of a pixel cluster. The latch 377 outputs its contents only when the output of the comparator 376 is "1". A sub-background area memory 378 stores a representative-pixel value and the circumscribed rectangle information from the latch 377.

A terminal 379 is for entering image data quantized by the quantizer 306, a terminal 380 is for reading in the representative-pixel value, which has been used by the quantizer 306, from the representative-pixel memory 359 of the representative-pixel extracting unit 305, and a terminal 381 is for outputting the contents of the sub-background area memory 378 to the terminal 311 shown in FIG. 20.

The flag memory 372 is reset to "0" by the CPU 312 before the sub-background area extracting unit 307 starts operating. The quantized image data are entered from the terminal 379 and stored in the frame memory 370. When one frame of image memory has been stored in the frame memory 370, the pixel-cluster extracting unit 371 scans the pixels of the frame memory 370 in the horizontal scanning direction, searches for a pixel whose pixel value is "1" and, when such a pixel is found, reads in the value (flag) of the corresponding address in the flag memory 372. If the flag is "1", then a search is made for the next pixel. If the flag is "0", then pixel-cluster extraction is carried out.

The method of extracting a pixel cluster is not limited to any particular method. For example, a technique similar to a method of calculating a chain code may be applied. In such case the shape of the extracted pixel cluster is represented by the form of the chain code and the cluster is stored in the pixel-cluster memory 373 successively together with the coordinates thereof. With regard to a pixel contained in an extracted pixel cluster, the value at the corresponding position in the flag memory 372 is made "1". Accordingly, it will suffice to extract a pixel cluster with respect solely to a pixel whose flag is "0" in the flag memory 372. This makes it possible to avoid re-processing contained in pixel cluster and already processed. The result is shorter processing time.

Figure 27:
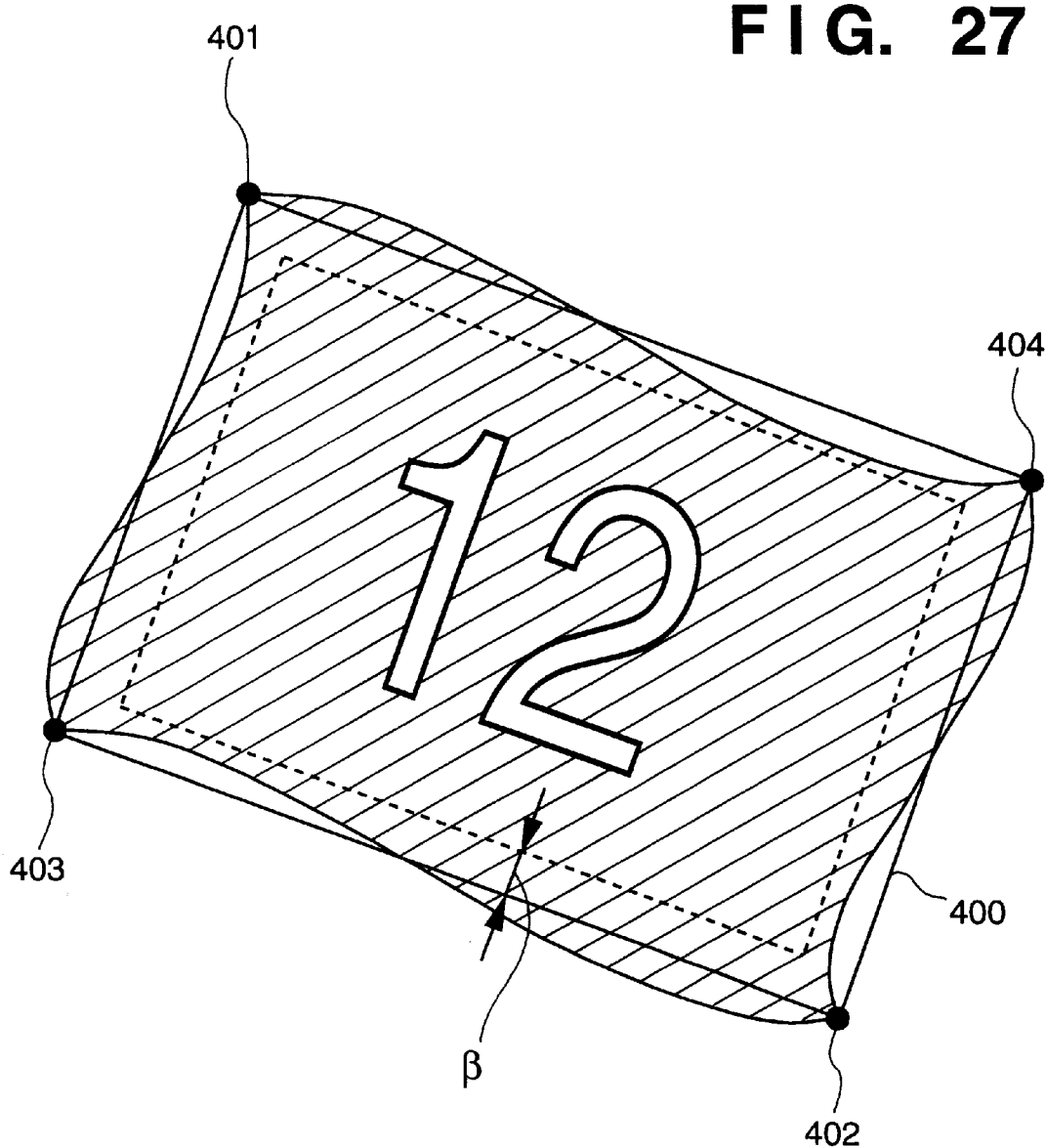
FIG. 27 is a diagram for describing processing executed by the sub-background area extracting unit depicted in FIG. 26.

When a pixel cluster contained in one frame of image data has been extracted in the pixel-cluster extracting unit 371 in the manner described above, the information representing the pixel cluster stored in the pixel-cluster memory 373 is read out successively and entered into the circumscribed-rectangle calculating unit 374. The latter obtains the uppermost pixel, lowermost pixel, rightmost pixel and leftmost pixel from the pixel-cluster information and generates a rectangle that contains these pixels. This is shown schematically in FIG. 27. The shaded portion in FIG. 27 is a pixel cluster having contiguous flat pixel values The uppermost, lowermost, rightmost and leftmost pixels of the pixel cluster are indicated at 401, 402, 403 and 404, respectively. A rectangle 400 containing the pixels 401, 402, 403 and 404 is generated.

The rectangularity calculating unit 375 reads in the pixel-cluster information from the pixel-cluster memory 373, obtains an area having a width of $\beta$ pixels (see FIG. 27) measured from the inner side of the circumscribed rectangle and counts the number of pixels belonging to the pixel cluster within this area. The rectangularity calculating unit 375 divides this count by the total number of pixels inside the area of $\beta$ pixel width, adopts the resulting value as rectangularity and outputs this to the comparator 376. In other words, if the percentage of pixels belonging to the pixel cluster inside the width of $\beta$ pixels is high, it is judged that there is a good possibility that the pixel cluster is rectangular, i.e., that the rectangularity is high. It will suffice if the value of $\beta$ is set to a suitable value in conformity with the particular apparatus.

The circumscribed-rectangle information and pixel-cluster position information enters from the circumscribed-rectangle calculating unit 374 and pixel-cluster memory 373 are is latched in the latch 377. The comparator 376 compares the calculated rectangularity with a threshold value T6 and outputs "1" if the rectangularity is greater than T6. As a result, the circumscribed-rectangle information and pixel-cluster position information latched in the latch 377 is stored as sub-background area information in the sub-background area memory 378 together with the representative-pixel value that has entered from the terminal 380. The sub-background area information stored in the sub-background area memory 378 is outputted from the terminal 381. In other words, this information can be outputted from the terminal 311 shown in FIG. 20.

Next, the program proceeds to step S109. Here it is determined whether the quantization at step S107 and the sub-background area extraction at step S108 have ended with regard to all representative-pixel values Qi. If the answer is "NO", then the program returns to step S107 and processing is repeated.

By repeating processing performed by the quantizer 306 and processing performed by the sub-background area extracting unit 307 a number of times (P times) equivalent to the number of representative-pixel values Qi, sub-background area information is extracted for each representative-pixel value Qi.

Accordingly, background information is outputted from the terminal 309 in FIG. 20, all representative-pixel values are outputted from the terminal 310 and sub-background area information is outputted, for each representative-pixel value, from the terminal 311.

[Utilization of Background Information]

The information obtained in this embodiment in the manner set forth above is useful in various types of image processing. An example in which this information is utilized will now be described.

Consider a case in which a binarizer is provided at the final stage of the arrangement for extracting background information described in connection with FIG. 20. If a pixel of interest is contained in a sub-background area outputted from the terminal 311, the binarizer compares this pixel with the corresponding representative-pixel value outputted from the terminal 310. If the pixel of interest is close enough to the representative-pixel value, i.e., within a predetermined distance from the representative-pixel value, the binarizer determines that the pixel of interest is background. Otherwise, the binarizer judges that the pixel of interest constitutes information representing a character or the like in a background area. Thus, binarization is performed. In a case where the pixel of interest does not reside in a sub-background area, the binarizer compares the pixel of interest with the background density outputted from the terminal 309. The binarizer performs binarization by judging that the pixel of interest is background if it is close to the background density and a pixel constituting character information or the like if the pixel of interest is not close to the background density.

Accordingly, if binarization processing is executed using background information obtained by this embodiment, it is possible to perform binarization that takes into account the background density in a sub-area.

Thus, in accordance with this embodiment as described above, background information, all representative-pixel values and a sub-background area composed of these representative-pixel values can be extracted by extracting flat pixels from image data and detecting a cluster of these pixels. Accordingly, in a case where sub-background area density within the cells of a table is changed at will, each cell can be properly recognized as rectangular information even if the ruled lines of the table are deleted.

This embodiment has been described for a case where the input image data are multivalued monochromatic image data in which each pixel is represented by eight bits. However, this does not impose a limitation upon the invention, for similar processing can be executed even with regard to color images. More specifically, background information and sub-background areas can be extracted by executing processing similar to the foregoing for each of the color components R, G, B or Y, M, C, K and comparing background areas.

Seventh Embodiment

A seventh embodiment of the invention will now be described. The architecture of the image processor to which the seventh embodiment is applied is similar to that of the sixth embodiment and need not be described again.

Figure 28:
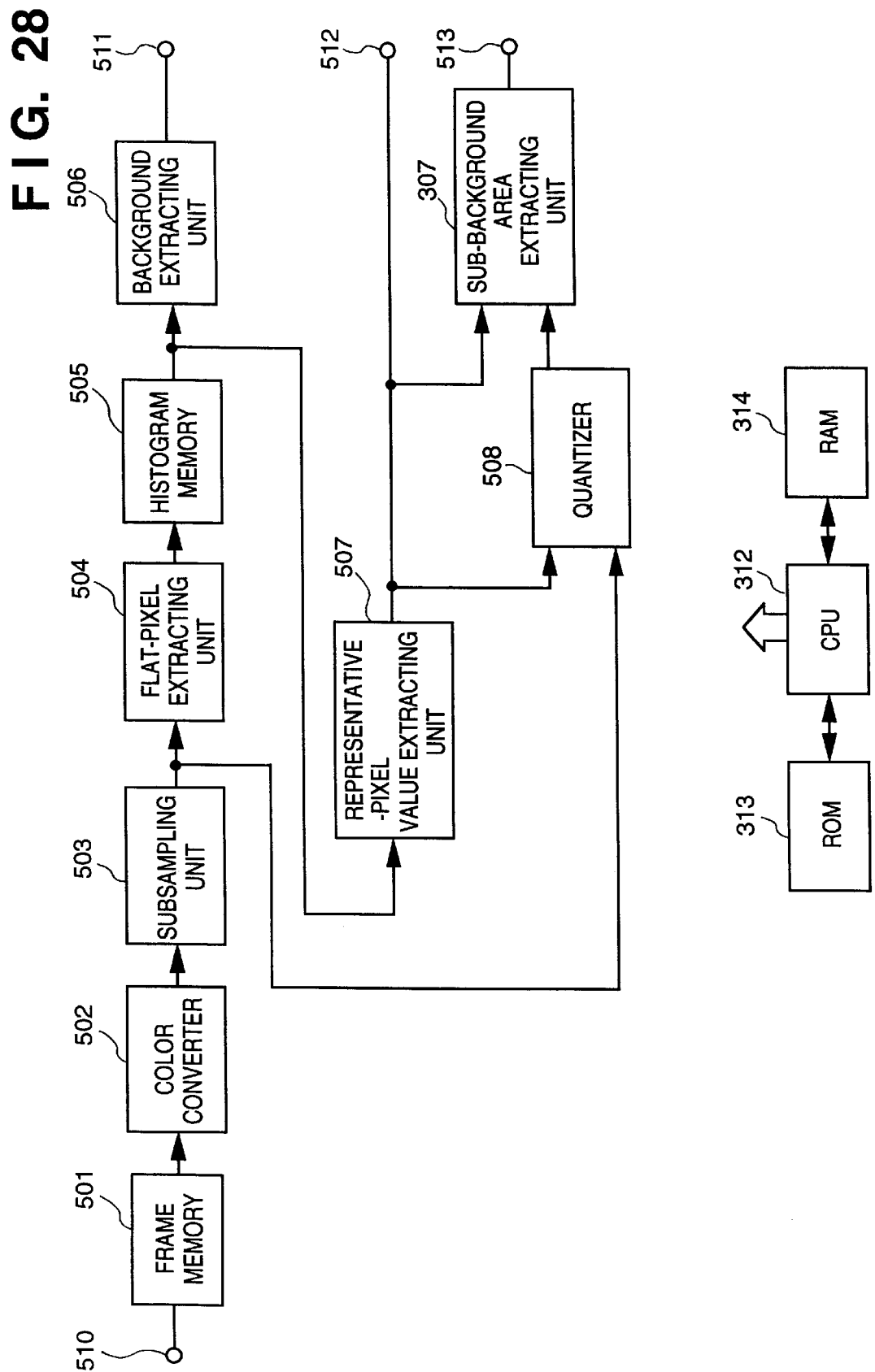
FIG. 28 is a block diagram showing an arrangement for executing background recognition processing in an image processor according to a seventh embodiment of the invention.

FIG. 28 illustrates an arrangement for executing background recognition processing in a printer control unit 1101 according to a seventh embodiment of the invention. Components identical with those of the sixth embodiment shown in FIG. 20 are designated by like reference characters and need not be described again.

As shown in FIG. 28, the arrangement includes a frame memory 501 for storing one frame of entered full-color RGB image data (24 bits per pixel), a color converter 502 for reading out pixels in order in the horizontal scanning direction and converting the RGB data to CIE1976 L*a*b*, which is uniform color space, a subsampling unit 503 for subsampling the entered L*a*b* values to 4:2:2, and a flat-pixel extracting unit 504 for extracting flat pixels.

A histogram memory 505 stores a histogram. This is a solid histogram comprising the L*, a*, b* axes. The histogram memory has a write mode and a read mode. In the write mode, an entered value serves as an address and the data indicated by the address are incremented. In the read mode, the data indicated by the address are outputted.

A background extracting unit 506 reads the histogram out of the histogram memory 505 and outputs background information. A representative-pixel extracting unit 507 reads the histogram out of the histogram memory 505, extracts information representing a representative-pixel value and outputs this information. A quantizer 508 quantizes entered image data based upon each representative pixel value.

A terminal 510 is for entering full-color RGB image data. For example, the terminal 510 may be connected to a scanner or the like for entering image data read in by the scanner. A terminal 511 is for outputting background information, a terminal 512 is for outputting a representative-pixel value, and a terminal 513 is for outputting coordinates of a sub-background area and information relating to size or the like.

The RGB image data that have entered from the terminal 510 are stored in the frame memory 501. When one frame of image data have been stored in the frame memory 501, the CPU 312 clears the histogram memory 505 to zero and resets the other components of the apparatus. Furthermore, the CPU 312 sets the histogram memory 505 to the write mode.

Pixel values are read in the color converter 502 from the frame memory 501 in order in the horizontal scanning direction. The values of R, G, B read in are converted to L*, a*, b*, which are outputted to the subsampling unit 503. The latter subsamples these data to 4:2:2 and outputs the result.

Flat-pixel extracting unit

The flat-pixel extracting unit 504 determines whether a pixel that has been read in is a pixel forming a flat portion of the image. If the pixel is a flat pixel, the unit 504 outputs the value. The details of the flat-pixel extracting unit 504 will be described with reference to FIG. 29.

Figure 29:
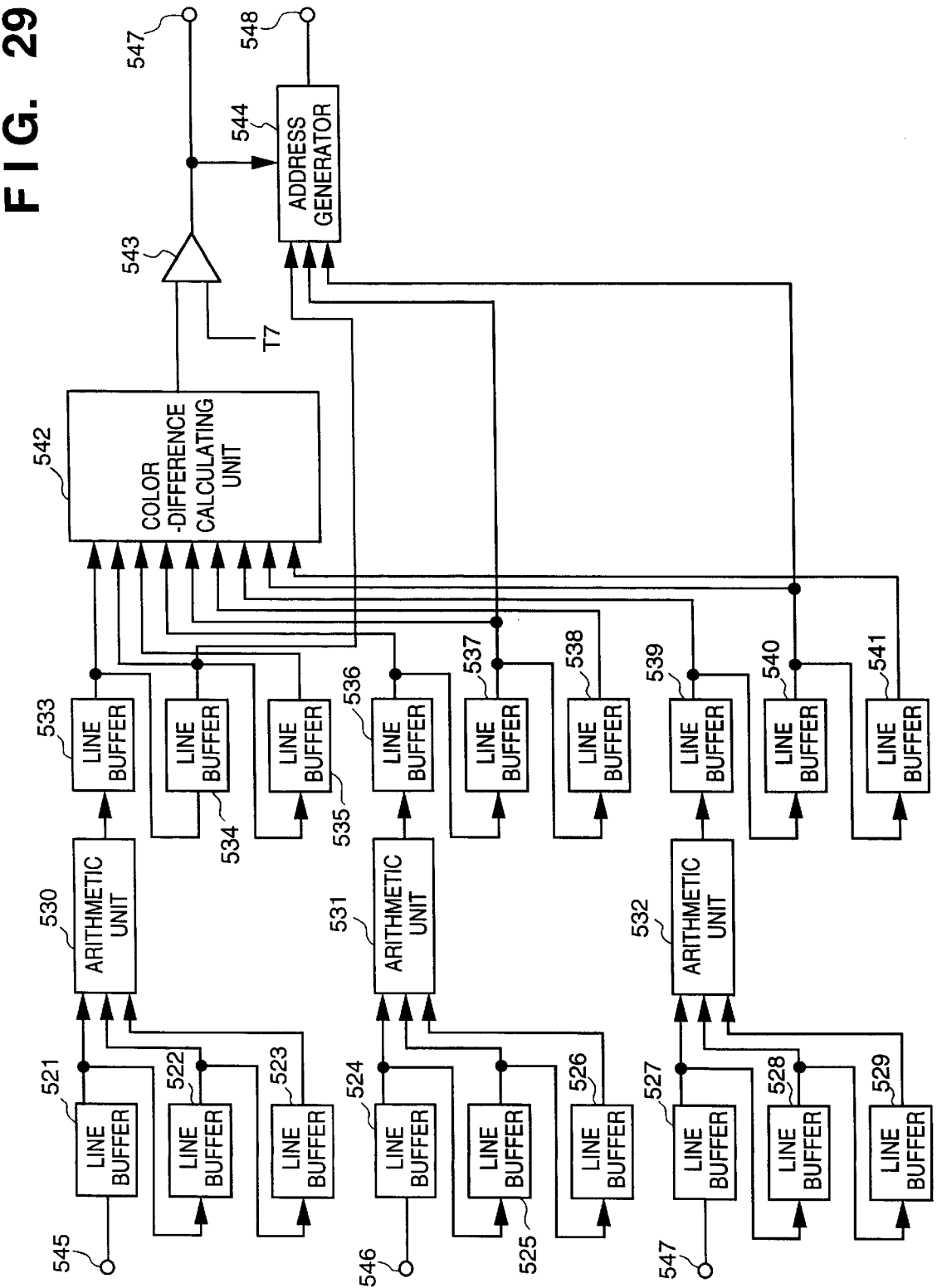
FIG. 29 is a block diagram showing the detailed architecture of a flat-pixel extracting unit depicted in FIG. 28.

As shown in FIG. 29, the flat-pixel extracting unit 504 includes terminals 545, 546, 547 for entering L*, a*, b* values, respectively, in order in the horizontal scanning direction, line buffers 521~529, which construct a FIFO memory, and arithmetic units 530, 531, 532 for reading the values of pixels neighboring a pixel of interest out of the line buffers 521~523, 524~526, 527~529, respectively, and obtaining the respective mean values. The arithmetic unit 530 calculates the mean value of lightness information L* from the line buffers 521~523, the arithmetic unit 531 calculates the mean value of chromaticity information a* from the line buffers 524~526, and the arithmetic unit 532 calculates the mean value of chromaticity information b* from the line buffers 527~529.

Further, line buffers 533~541 construct a FIFO memory. A color-difference calculating unit 542 reads the mean values of pixels neighboring a pixel of interest out of the line buffers 533~541, calculates the color difference and obtains the maximum color-difference value. A comparator 543 compares an input value from the color-difference calculating unit 542 with a predetermined threshold value T7, outputs "1" if the input value is greater than the threshold value T7 and outputs "0" otherwise. An address generator 544 generates the address of the histogram memory 504.

A terminal 547 delivers the output of the comparator 543 to the histogram memory 505, and a terminal 548 outputs the address, which has been generated by the address generator 544, to the histogram memory 505

In the flat-pixel extracting unit 504 shown in FIG. 29, pixel data that have entered from the terminals 545, 546, 547 are applied to the line buffers 521, 524, 527, respectively. Three lines of pixel value L* are stored by the line buffers 521~523, three lines of pixel value a* are stored by the line buffers 524~526, and three lines of pixel value b* are stored by the line buffers 527~529. By virtue of the line buffers 521~529, a block of 3×3 pixels centered on the pixel of interest is formed.

These values buffered by the line buffers 521~523, 524~526, 527~529 successively enter the arithmetic units 530~532, respectively, and the arithmetic units proceed to obtain the mean values. The mean values obtained by the arithmetic units 530, 531 532 enter the line buffers 533, 536, 539, respectively. Three lines of mean values are stored by the line buffers 533~541. These line buffers form a block of 3×3 pixels of mean values centered on the pixel of interest. These values enter the color-difference calculating unit 542 successively. The color-difference calculating unit 542 detects the color differences between the L*a*b* mean value at the pixel of interest in the above-mentioned 3×3 pixel block and the L*a*b* mean values at pixels neighboring the pixel of interest and obtained the maximum difference value.

Let (L*0, a*0, b*0) represent the L*a*b* mean value of the pixel of interest, and let (L*n, a*n, b*n) represent the L*a*b* mean values of pixels neighboring the pixel of interest. The difference e between these mean values is given by the following equation:

$$e = \sqrt{(L^*0 - L^*n)^2 + (a^*0 - a^*n)^2 + (b^*0 - b^*n)^2} \qquad (4)$$

The color-difference calculating unit 542 outputs the maximum value of the color differences obtained. The maximum value enters the comparator 543 and is compared with the threshold value T7. Meanwhile, the mean values of L*, a*, b* of the pixel of interest enter the address generator 544. The latter, which operates only if the output of the comparator 543 is "0", outputs an address of the histogram memory 505 from the terminal 548. Further, the terminal 547 delivers the output of the comparator 543 to the histogram memory 505.

With reference again to FIG. 28, the output of the comparator 543 and the output of the address generator 544 of FIG. 29 enter the histogram memory 505 in accordance with the timing of the pixels. When the output of the comparator 543 is "0", the histogram memory 505 adds one to the content of the address indicated by the address generator 544 and stores the result. In other words, data are written in the histogram memory 505 only if the maximum value of the color difference in the mean-value block of pixels peripheral to the pixel of interest is less than the predetermined threshold value T7.

Background Extracting Unit

When the above-described processing has ended with regard to all pixels in one frame of image data stored in the frame memory 501, the CPU 312 actuates the background extracting unit 506.

Figure 30:
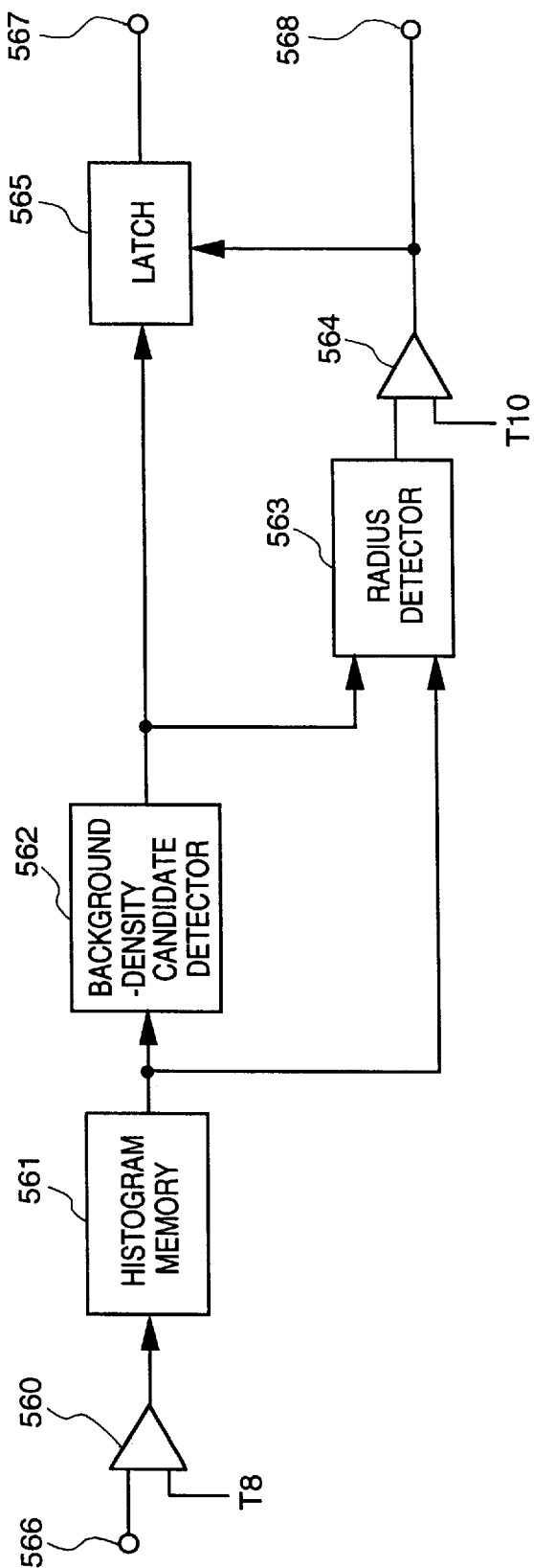
FIG. 30 is a block diagram showing the detailed architecture of a background extracting unit depicted in FIG. 28.

The details of the background extracting unit 506 are illustrated in FIG. 30.

As shown in FIG. 30, the background extracting unit 506 includes a special comparator 560 for comparing an input value with a predetermined threshold value T8. If the input value is greater than the threshold value T8, the comparator 560 outputs the input value as is; otherwise, zero is outputted. A histogram memory 561 stores the histogram outputted by the comparator 560. A background-density candidate detector 562 detects the maximum frequency of occurrence from the histogram stored in the histogram memory 561 and outputs the pixel value that gives this maximum frequency. This pixel value serves as the background-density candidate value.

A radius detector 563 refers to the histogram stored in the histogram memory 561. From those pixels, in the vicinity of the background-density candidate value, for which the frequency of occurrence is less than a predetermined threshold value T9, the radius detector 563 obtains the pixel that is farthest from the background-density candidate value. A latch 565 stores the background-density candidate value.

Starting from a pixel value 0, a terminal 566 reads in the corresponding frequency values from the histogram memory 505 in regular order. A terminal 567 outputs the data contained in the latch 565. A terminal 568 delivers the output of the comparator 564.

The corresponding frequency values are read in from the histogram memory 505 via the terminal 566 in regular order starting from pixel value 0, and these frequency values are entered into the comparator 560. The latter compares the frequency values with the predetermined threshold value T8, writes only the frequency values greater than T8 in the histogram memory 561 at the corresponding addresses and writes 0 in the histogram memory 561 in all other cases.

When comparison has been performed with regard to each of the frequency values of all 256 levels and the values have been written in the histogram memory 561 in this manner, the background-density candidate detector 562 goes to the histogram memory 561 to read out a pixel value having the highest frequency as a background-density candidate value and stores this value in the latch 565.

Thereafter, the radius detector 563 refers to the histogram. From those pixel values, in the vicinity of the background-density candidate value, for which the frequency of occurrence is less than a predetermined threshold value T10, the radius detector 563 obtains the pixel that is farthest from the background-density candidate value. If the output of the comparator 564 is "0", the latch 346 outputs its data from the terminal 567 as background density. The "0" output of the comparator 564, which indicates that the type of background is solid, is delivered from the terminal 568.

When the output of the comparator 564 is "1", on the other hand, the data in the latch 565 is not outputted and the terminal 568 delivers logical "1", which indicates that the type of background is not solid and possesses a pattern of some kind.

It should be noted that the threshold value T10 is decided by the precision with which the entered image is read. For example, the threshold value T10 is decided based upon a variance value or the like which prevails when the solid image is read.

With reference again to FIG. 28, the signal from the background extracting unit 506 representing the background density and the type of background is delivered from the terminal 511, as mentioned above. The signal representing the type of background outputted by the background is investigated by the CPU 312. The CPU 312 actuates the representative-pixel extracting unit 507 only when the type of background is solid background (i.e., only when the output of the comparator 564 is "0"). On the hand, when the type of background is not solid but possesses background of some sort (i.e., when the output of the comparator 564 is "1"), the CPU 312 does not actuate the representative-pixel extracting unit 507 and, hence, does not actuate the quantizer 508 and sub-background area extracting unit 307.

Representative-pixel Extracting Unit

Figure 31:
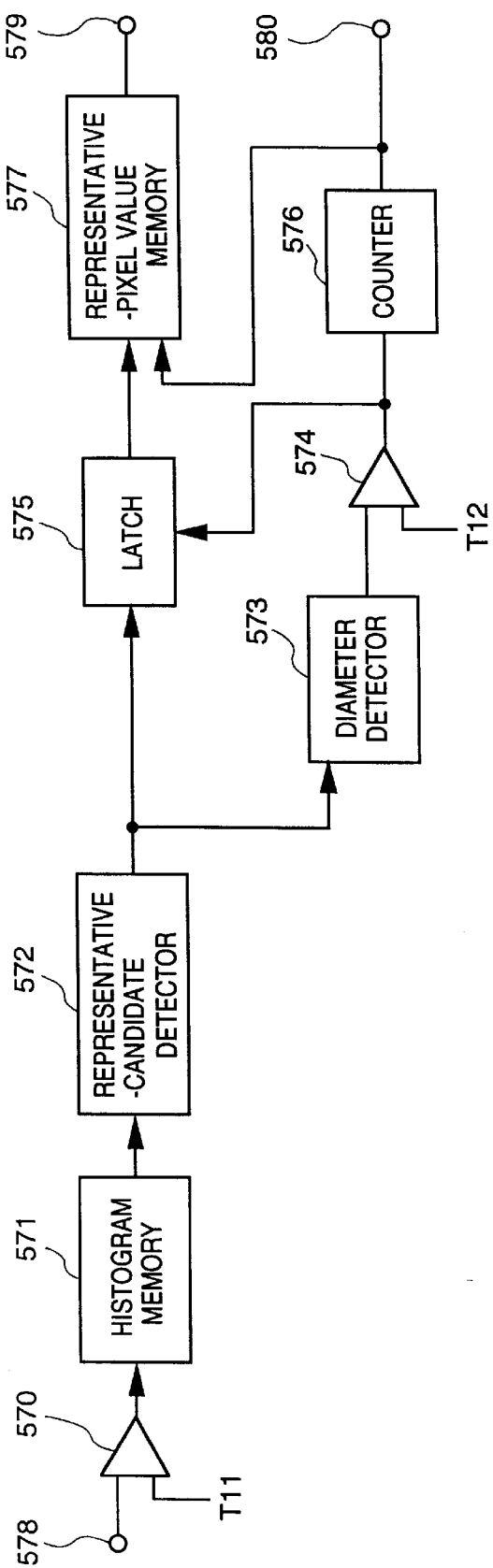
FIG. 31 is a block diagram showing the detailed architecture of representative-pixel extracting unit depicted in FIG. 28.

FIG. 31 is a block diagram showing the detailed architecture of the representative-pixel extracting unit 507.

As shown in FIG. 31, the representative-pixel extracting unit 507 includes a special comparator 570 for comparing an input value with a predetermined threshold value T11. If the input value is greater than the threshold value T11 the comparator 570 outputs the input value as is; otherwise, zero is outputted. A histogram memory 571 stores the histogram outputted by the comparator 570. Starting from a pixel value 0, a representative-candidate detector 572 successively reads in corresponding frequency values from the histogram memory 571 in regular order, extracts a group of pixel values for which the frequency is not zero and adopts the pixel value having the highest frequency of occurrence as a representative-candidate value. From among representative-candidate values extracted by the representative-candidate detector 572, a diameter detector 573 obtains representative-candidate values whose frequencies are less than the predetermined threshold value T9 and which are farthest apart. It should be noted that the threshold value T9 is equal to the threshold value used by the radius detector 363 in the background extracting unit 306 shown in FIG. 20.

A comparator 574 compares its input with a predetermined threshold value T12, outputs "1" if the input value is greater than a threshold value T12 and outputs "0" in all other cases. A latch 575 stores the representative-candidate value and outputs its data only when the output of the comparator 574 is "1". A counter 576 is incremented whenever the output of the comparator 574 is "1". A representative-pixel memory 577 stores the value (a representative-pixel value) outputted by the latch 575.

Starting from a pixel value 0, a terminal 578 reads in the corresponding frequency values from the histogram memory 505 in regular order. A terminal 579 outputs the data contained in the representative-pixel memory 577. A terminal 580 delivers the count recorded in the counter 576.

The counter 576 in the representative-pixel is reset to zero by the CPU 312 before operation of the representative-pixel extracting unit 507 starts. The corresponding frequency values are read in from the histogram memory 505 via the terminal 578 in regular order starting from pixel value 0, and these frequency values are entered into the comparator 570. The latter compares the frequency values with the predetermined threshold value T11, writes only the frequency values greater than T11 in the histogram memory 571 at the corresponding addresses and writes 0 in the histogram memory 571 in all other cases.

When comparison has been performed with regard to each of the frequency values of all 256 levels and the values have been written in the histogram memory 571 in this manner, the representative-candidate detector 572 goes to the histogram memory 571 to read in, starting from pixel value 0, the corresponding frequency values in regular order. When the representative-candidate detector 572 detects frequency values which are not zero and which do not belong to a group of frequency values already extracted, the detector 572 forms a group of values by extracting non-zero frequency values neighboring these detected values and outputs the pixel value having the highest frequency in this group. This pixel value serves as the representative-candidate value.

The comparator 574 compares this representative-candidate value with the threshold value T12. When the output of the comparator 574 is "1", the counter 576 is incremented. With the count from the counter 576 serving as an address, the data latched by the latch 575 is written in the representative-pixel memory 577. The data from the representative-pixel memory 577 are outputted from the terminal 579 and the count(the number P of representative-pixel values) in counter 576 is read out from terminal 580. It is possible to read these values out of the terminal 512 at the same time that they are entered into the quantizer 508 and sub-background area extracting unit 307 shown in FIG. 28.

When a representative-pixel value has thus been obtained, the CPU 312 actuates the quantizer 508 and sub-background area extracting unit 307 for each representative-pixel value Qi (i=1~P) obtained.

The quantizer 508 reads the representative-pixel value Qi out of the representative-pixel memory 577 shown in FIG. 31, reads out the pixel data from the subsampling unit 503 and performs quantization by assigning "1" to the value of a pixel whose value is between Qi−γ and Qi+γ and "0" to the values of all other pixels from among the pixels that have been read in from the subsampling unit 503. It should be noted that the width γ is a predetermined value. For example, the value is decided based upon a variance value or the like which prevails when an image having a solid background has been read.

The image quantized by the quantizer 508 enters the sub-background area extracting unit 307. In a manner similar to that of the sixth embodiment, the sub-background area extracting unit 307 extracts clusters of pixels for which the result of quantization is "1", extracts the rectangularity of each pixel cluster and determines whether the area is a sub-background area based upon the rectangularity.

By repeating processing performed by the quantizer 306 and processing performed by the sub-background area extracting unit 307 a number of times (P times) equivalent to the number of representative-pixel values Qi, sub-background area information is extracted for each representative-pixel value Qi. Accordingly, background information is outputted from the terminal 511 in FIG. 28, all representative-pixel values are outputted from the terminal 512 and sub-background area information is outputted, for each representative-pixel value, from the terminal 513.

Thus, in accordance with the seventh embodiment as described above, flat pixels are extracted after a color image is converted to uniform color space, and background information, all representative-pixel values and a sub-background area composed of these representative-pixel values can be extracted in conformity with the color difference. Accordingly, in a case where sub-background area density within the cells of a table is changed at will, each cell can be properly recognized as rectangular information even if the ruled lines of the table are deleted.

Eighth Embodiment

An eighth embodiment of the invention will now be described. The architecture of the image processor to which the eighth embodiment is applied is similar to that of the sixth embodiment and need not be described again.

Figure 32:
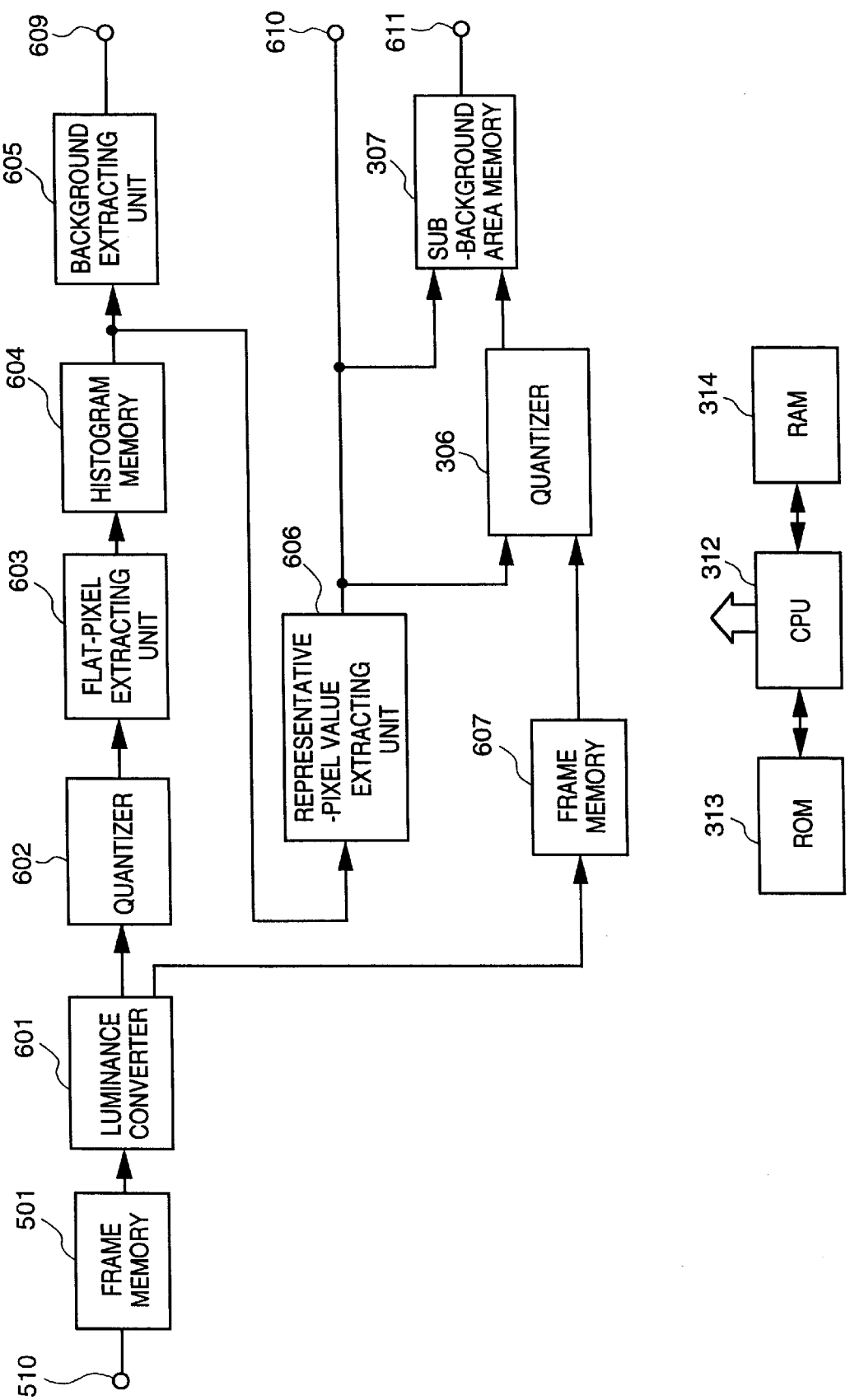
FIG. 32 is a block diagram showing an arrangement for executing background recognition processing in an image processor according to the eighth embodiment of the invention.

FIG. 32 illustrates an arrangement for executing background recognition processing in a printer control unit 1101 according to an eighth embodiment of the invention. Components identical with those of the sixth embodiment shown in FIG. 20 and the seventh embodiment shown in FIG. 28 are designated by like reference characters and need not be described again.

As shown in FIG. 32, the arrangement includes a luminance converter 601 for reading pixels out of the frame memory 501 in order in the horizontal scanning direction and converting the RGB data to lightness information L* of CIE1976 L*a*b*, which is uniform color space, a quantizer 602 for linearly quantizing the entered L* data of eight bits to six bits, and a flat-pixel extracting unit 603 for extracting flat pixels from the quantized L* data.

A histogram memory 604 stores a histogram the horizontal axis of which indicates six bits of the L* value. The histogram memory 604 has a write mode and a read mode. In the write mode, an entered value serves as an address and the data indicated by the address are incremented. In the read mode, the data indicated by the address are outputted.

A background extracting unit 605 reads the histogram out of the histogram memory 604 and outputs background information. A representative-pixel extracting unit 606 reads the histogram out of the histogram memory 604, extracts information representing a representative-pixel value and outputs this information upon expanding it to eight bits. A frame memory 607 stores one frame of L* data.

In FIG. 32, RGB image data expressed by eight bits that have entered from the terminal 510 are stored in the frame memory 501. When one frame of image data have been stored in the frame memory 501, the CPU 312 clears the histogram memory 604 to zero and resets the other components of the apparatus. Furthermore, the CPU 312 sets the histogram memory 604 to the write mode.

Pixel values are read in the luminance converter 601 from the frame memory 501 in order in the horizontal scanning direction. The values of R, G, B read in are converted to L* of eight bits, which are outputted. Each color-space converted pixel value of eight bits is converted to a value of six bits by the quantizer 602, whereby smoothing is performed.

The flat-pixel extracting unit 603 determines whether a pixel outputted by the quantizer 602 is a pixel forming a flat portion of the image. If the pixel is a flat pixel, the unit 603 outputs the value. The detailed construction of the flat-pixel extracting unit 603 is similar to that of the unit according to the sixth embodiment shown in FIG. 22. However, the bit length of the data to be processed in each block and the value of the threshold value T1 differ.

As in the sixth embodiment, data are written in the histogram memory 604 only if the difference between the maximum value and minimum value in each mean-value block of pixels surrounding the pixel of interest is less than the predetermined value (T1). It should be noted that the histogram memory 604 has frequency values corresponding to all 64 levels.

When the writing of data in the histogram memory 604 has ended for all pixels, the CPU actuates the background extracting unit 605. The construction of the background extracting unit 605 is similar to that shown in FIG. 24 according to the sixth embodiment. However, the bit length of the data to be processed in each block and the values of the threshold values T2, T3 differ. The background extracting unit 605 outputs the background density value and the type of background. The CPU 312 investigates the type of background and proceeds to control the operation of the blocks from the representative-pixel extracting unit 606 onward.

When the output from the background extracting unit 605 ends, the CPU 312 actuates the representative-pixel extracting unit 606 only if the type of background is solid. The construction of the representative-pixel extracting unit 606 is similar to that shown in FIG. 25 according to the sixth embodiment. However, the bit length of the data to be processed in each block and the values of the threshold values T4, T5 differ. By writing the extracted representative-pixel values at the six higher order bits of the representative-pixel memory 359 and writing "0" at the two lower order bits, the representative-pixel values are stored as eight-bit data.

When all representative-pixel values have been obtained in the manner described above, the CPU 312 actuates the quantizer 306 and the sub-background area extracting unit 307 for every representative-pixel value Qi (i=1~P).

The quantizer 306 reads the representative-pixel value Qi out of the representative-pixel memory 359 shown in FIG. 25, and performs quantization by assigning "1" to the value of a pixel whose value is between Qi−δ and Qi+δ and "0" to the values of all other pixels. It should be noted that the width δ is a predetermined value. For example, the value is decided based upon a variance value or the like which prevails when an image having a solid background has been read.

The quantized image enters the sub-background area extracting unit 307. In a manner similar to that of the sixth embodiment, the sub-background area extracting unit 307 extracts clusters of pixels for which the result of quantization is "1", extracts the rectangularity of each pixel cluster and determines whether the area is a sub-background area based upon the rectangularity.

Accordingly, background information is outputted from the terminal 609 in FIG. 32, all representative-pixel values are outputted from the terminal 610 and sub-background area information is outputted, for each representative-pixel value, from the terminal 611.

Thus, in accordance with the eighth embodiment as described above, an entered color image is smoothed after being subjected to a luminance conversion, and background information, all representative-pixel values and a sub-background area composed of these representative-pixel values can be extracted from the smoothed image. Accordingly, background recognition can be carried out after noise contained in the entered image data is suitably eliminated. This makes better recognition processing possible. Since the number of bits in image data to be processed is reduced, less memory capacity suffices and processing speed can be raised.

[Modifications of Sixth through Eighth Embodiments]

In each embodiment set forth above, it is described that an image signal is expressed by eight or six bits per pixel. However, this does not impose a limitation upon the invention, for 12-bit representation may be used as well. In addition, the signal after the color conversion may be YIQ of an NTSC signal or CIE1976 L*u*v*.

In other to expedite the description, arrangements using frame memories have been described. However, it is of course permissible to adopt a hardware configuration in which line buffers are used instead.

Further, the method of comparing rectangularity is not limited to the above-described example (in which a chain code is calculated). For example, it is permissible to count the directions of chain codes surrounding a pixel cluster, and it is permissible to judge rectangularity using a parameter such as the linearity of the periphery or the angle of the intersection of straight lines.

Further, the present invention is applied to an LBP in each of the foregoing embodiments. However, if the apparatus is one requiring processing for recognizing the background of an image, such as a copier, facsimile machine or scanner, the invention is applicable to any image processor.

In accordance with the present invention as described above, flat pixels are extracted from image data, a histogram thereof is created, the type of background of the entire image is judged based upon the histogram, background density is extracted and sub-background areas constituting sub-areas can be extracted efficiently. As a result, even if background is not white, a rectangular density portion at background such as a character of table can be subjected to ground recognition appropriately and it possible to perform proper image processing such as binarization or area separation that takes background density of rectangular information into account.

The above-mentioned effects can be obtained with regard to color images as well.

Further, by performing background recognition after image data are smoothed, noise can be eliminated and the amount of data processed can be suppressed. As a result, better background recognition can be carried out and, at the same time, less memory capacity suffices and processing speed can be raised.

OTHER EMBODIMENT

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

What is claimed is:

1. An image processing apparatus comprising:
    discriminating means for discriminating state of background of an input image;
    quantizing means for quantizing the input image based upon results of discrimination from said discriminating means;
    partitioning means for partitioning the input image into areas based upon results of quantization from said quantizing means; and
    coding means for coding each partitioned area in conformity with characteristics of the area,
    wherein said discrimination means comprises:
        extracting means for extracting, from the input image, pixels forming a flat portion of the image,
        counting means for counting frequency of occurrence of the value of each extracted flat pixel, and
        detecting means for detecting the state of the background of the input image from a distribution of frequencies obtained by said counting means.

2. The apparatus according to claim 1, wherein said detecting means detects a first density width of background from the frequency distribution and detects the state of the background based upon the first density width detected.

3. The apparatus according to claim 1, wherein said detecting means detects a first density width of background from the frequency distribution, calculates occupancy of the entire image by the background based upon the detected first density width, and detects the state of the background based upon at least one of the first density width and occupancy.

4. The apparatus according to claim 3, wherein said detecting means detects a second density width of background from the frequency distribution, said second density width being smaller than said first density width.

5. An image processing apparatus comprising:
    discriminating means for discriminating state of background of an input image;
    quantizing means for quantizing the input image based upon results of discrimination from said discriminating means;
    partitioning means for partitioning the input image into areas based upon results of quantization from said quantizing means; and
    coding means for coding each partitioned area in conformity with characteristics of the area,
    wherein said discriminating means comprises:
        smoothing means for smoothing the input image,
        extracting means for extracting, from the smoothed input image, pixels forming a flat portion of the image,
        counting means for counting frequency of occurrence of the value of each extracted flat pixel, and
        detecting means for detecting the state of the background of the input image from a distribution of frequencies obtained by said counting means.

6. The apparatus according to claim 5, wherein said detecting means detects a first density width of background from the frequency distribution and detects the state of the background based upon the first density width detected.

7. The apparatus according to claim 5, wherein said detecting means detects a first density width of background from the frequency distribution, calculates occupancy of the entire image by the background based upon the detected first density width, and detects the state of the background based upon at least one of the first density width and occupancy.

8. The apparatus according to claim 7, wherein said detecting means detects a second density width of background from the frequency distribution, said second density width being smaller than said first density width.

9. The apparatus according to claim 1, wherein said quantizing means forms a quantized image of the background by quantizing the input image based upon a density width of the background discriminated by said discriminating means.

10. The apparatus according to claim 1, wherein said partitioning means performs area partitioning repeatedly with respect to an area having characteristics of a multivalued image.

11. An image processing method comprising the steps of:
    discriminating state of background of an input image;
    quantizing the input image based upon results of discrimination obtained in the discriminating step;
    partitioning the input image into areas based upon results of quantization obtained in the quantizing step; and
    coding each partitioned area in conformity with characteristics of the area,
    wherein the discrimination step comprises the steps of:
        extracting, from the input image, pixels forming a flat portion of the image,
        counting frequency of occurrence of the value of each extracted flat pixels, and
        detecting the state of the background of the input image from a distribution of frequencies obtained in the counting step.

12. An image processing apparatus comprising:
    discriminating means for discriminating state of background of an input image;
    correcting means for correcting the input image;
    quantizing means for quantizing the input image based upon results of discrimination from said discriminating means, quantizing the image, which has been corrected by said correcting means, based upon the results of discrimination, and combining results of both quantizing operations;
    partitioning means for partitioning the input image into areas based upon the combined results of quantization; and
    coding means for coding each partitioned area in conformity with characteristics of the area,
    wherein said discrimination means comprises:
        extracting means for extracting, from the input image, pixels forming a flat portion of the image,
        counting means for counting frequency of occurrence of the value of each extracted flat pixel, and
        detecting means for detecting the state of the background of the input image from a distribution of frequencies obtained by said counting means.

13. An image processing apparatus comprising:
    discriminating means for discriminating state of background of an input image;
    correcting means for correcting the input image;
    quantizing means for quantizing the input image based upon results of discrimination from said discriminating means, quantizing the image, which has been corrected by said correcting means, based upon the results of discrimination, and combining results of both quantizing operations;

partitioning means for partitioning the input image into areas based upon the combined results of quantization; and coding means for coding each partitioned area in conformity with characteristics of the area, wherein said discriminating means comprises:
smoothing means for smoothing the input image,
extracting means for extracting, from the smoothed input image, pixels forming a flat portion of the image,
counting means for counting frequency of occurrence of the value of each extracted flat pixel, and
detecting means for detecting the state of the background of the input image from a distribution of frequencies obtained by said counting means.

14. The apparatus according to claim 13, wherein said detecting means detects a first density width of background from the frequency distribution and detects the state of the background based upon the first density width detected.

15. The apparatus according to claim 13, wherein said detecting means detects a first density width of background from the frequency distribution, calculates occupancy of the entire image by the background based upon the detected first density width, and detects the state of the background based upon at least one of the first density width and the occupancy.

16. The apparatus according to claim 15, wherein said detecting means detects a second density width of background from the frequency distribution, said second density width being smaller than said first density width.

17. The apparatus according to claim 12, wherein said correcting means applies edge emphasizing processing to the input image.

18. The apparatus according to claim 12, wherein said quantizing means forms a quantized image of the background by quantizing the input image and the corrected image based upon a density width of the background discriminated by said discriminating means.

19. The apparatus according to claim 12, wherein said partitioning means performs area partitioning repeatedly with respect to an area having characteristics of a multivalued image.

20. An image processing method comprising the steps of:
discriminating state of background of an input image;
correcting the input image;
quantizing the input image based upon results of discrimination obtained in the discriminating step;
quantizing the image, which has been corrected in the correcting step, based upon the results of discrimination;
combining results of quantization obtained in the quantizing steps;
partitioning the input image into areas based upon the combined results of quantization; and
coding each partitioned area in conformity with characteristics of the area,
wherein the discriminating step comprises the steps of:
extracting from the input image, pixels forming a flat portion the image,
counting frequency of occurrence of the value of each extracted flat pixel, and
detecting the state of the background of the input image from a distribution of frequencies obtained in the counting step.

21. An image processing apparatus comprising:
discriminating means for discriminating state of background of an input image;
correcting means for correcting the input image;
first quantizing means for quantizing the input image based upon results of discrimination from said discriminating means;
second quantizing means for quantizing the image, which has been corrected by said correcting means, based upon the results of discrimination;
third quantizing means for quantizing the input image based upon the results of discrimination, the input image and the input image corrected by said correcting means;
combining means for combining results of quantization obtained from said first, second and third quantizing means;
partitioning means for partitioning the input image into areas based upon the combined results of quantization; and
coding means for coding each partitioned area in conformity with characteristics of the area,
wherein said discrimination means comprises:
extracting means for extracting, from the input image, pixels forming a flat portion of the image,
counting means for counting frequency of occurrence of the value of each extracted flat pixel, and
detecting means for detecting the state of the background of the input image from a distribution of frequencies obtained by said counting means.

22. An image processing apparatus comprising;
discriminating means for discriminating state of background of an input image;
correcting means for correcting the input image;
first quantizing means for quantizing the input image based upon results of discrimination from said discriminating means;
second quantizing means for quantizing the image, which has been corrected by said correcting means, based upon the results of discrimination;
third quantizing means for quantizing the input image based upon the results of discrimination, said input image and the input image corrected by said correcting means;
combining means for combining results of quantization obtained from said first, second and third quantizing means;
partitioning means for partitioning the input image into areas based upon the combined results of quantization; and
coding means for coding each partitioned area in conformity with characteristics of the area,
wherein said discriminating means comprises:
smoothing means for smoothing the input image,
extracting means for extracting, from the smoothed input image pixels forming a flat portion of the image,
counting means for counting frequency of occurrence of the value of each extracted flat pixel, and
detecting means for detecting the state of the background of the input image from a distribution of frequencies obtained by said counting means.

23. The apparatus according to claim 22, wherein said detecting means detects a first density width of background from the frequency distribution and detects the state of the background based upon the first density width detected.

24. The apparatus according to claim 22, wherein said detecting means detects a first density width of background from the frequency distribution, calculates occupancy of the entire image by the background based upon the detected first density width, and detects the state of the background based upon at least one of the first density width and the occupancy.

25. The apparatus according to claim 24, wherein said detecting means detects a second density width of background from the frequency distribution, said second density width being smaller than said first density width.

26. The apparatus according to claim 21, wherein said correcting means applies edge emphasizing processing to the input image.

27. The apparatus according to claim 21, wherein said first and second quantizing means form a quantized image of the background by quantizing the input image and the corrected image based upon a density width of the background discriminated by said discriminating means.

28. The apparatus according to claim 27, wherein said first and second quantizing means select the first density width or the second density width in conformity with the state of the background and form a quantized image of the background by quantizing the input image and the corrected image based upon a density width selected.

29. The apparatus according to claim 21, wherein said third quantizing means forms a quantized image of the background by quantizing the input image based upon density of the background discriminated by said discriminating means, said input image and the corrected image.

30. The apparatus according to claim 29, wherein when the value of a pixel of interest in the input image and the value of a corrected pixel obtained by correcting the pixel of pixel of interest bracket the density of the background, said third quantizing means quantizes the pixel of interest as a pixel forming the background.

31. An image processing method comprising the steps of:
discriminating state of background of an input image;
correcting the input image;
quantizing the input image based upon results of discrimination obtained in the discriminating step;
quantizing the image, which has been corrected in the correcting step, based upon the results of discrimination;
quantizing the input image based upon the results of discrimination, the input image and the input image corrected in the correcting step;
combining of quantization obtained, in the quantizing steps;
partitioning the input image into areas based upon the combined results of quantization; and
coding each partitioned area in conformity with characteristics of the area,
wherein the discrimination step comprises the steps of:
extracting, from the input image, pixels forming a flat portion of the image,
counting frequency of occurrence of the value of each extracted flat pixel, and
detecting the state of the background of the input image from a distribution of frequencies obtained in the counting means.

32. An image processing method comprising the steps of:
discriminating state of background of an input image;
quantizing the input image based upon results of the discrimination;

partitioning the input image into areas based upon results of the quantization; and
coding each partitioned area in conformity with characteristics of the area,
wherein the discriminating step comprises the steps of:
smoothing the input image,
extracting, from the smoothed input image, pixels forming a flat portion of the image,
counting means for counting frequency of occurrence of the value of each extracted flat pixel, and
detecting the state of the background of the input image from a distribution of frequencies obtained in the counting step.

33. An image processing method comprising the steps of:
discriminating state of background of an input image;
correcting the input image;
quantizing the input image based upon results of the discrimination;
quantizing the image, which has been corrected in the correcting step, based upon the results of discrimination;
combining results of both quantizing operations;
partitioning the input image into areas based upon the combined results of quantization; and
coding each partitioned area in conformity with characteristics of the area,
wherein the discriminating step comprises the steps of:
smoothing the input image,
extracting, from the smoothed input image, pixels forming a flat portion of the image,
counting frequency of occurrence of the value of each extracted flat pixel, and
detecting the state of the background of the input image from a distribution of frequencies obtained in the counting step.

34. An image processing method comprising the steps of:
discriminating state of background of an input image;
correcting the input image;
quantizing the input image based upon results of discrimination from said discriminating means;
quantizing the image, which has been corrected by said correcting means, based upon the results of discrimination;
quantizing the input image based upon the results of discrimination, the input image and the corrected input image;
combining results of quantization obtained in the quantizing steps;
partitioning the input image into areas based upon the combined results of quantization; and
coding each partitioned area in conformity with characteristics of the area,
wherein the discriminating step comprises the steps of:
smoothing the input image,
extracting, from the smoothed input image, pixels forming a flat portion of the image,
counting frequency of occurrence of the value of each extracted flat pixel, and
detecting the state of the background of the input image from a distribution of frequencies obtained in the counting step.

* * * * *

UNITED STATES PATENT AND TRADEMARK OFFICE
CERTIFICATE OF CORRECTION

PATENT NO. : 5,995,665 Page 1 of 1
DATED : November 30, 1999
INVENTOR(S) : Mitsuru Maeda It is certified that error appears in the above-identified patent and that said Letters Patent is hereby corrected as shown below:

Column 12,
Line 17, "serves" should read -- serve -- .

Column 25,
Line 60, "different" should -- difference -- .

Column 27,
Line 38, "values" should read -- values. -- .

Column 36,
line 3, "other" should read -- oder -- .

Signed and Sealed this

Twenty-eighth Day of August, 2001

Attest:

NICHOLAS P. GODICI
Attesting Officer  Acting Director of the United States Patent and Trademark Office